United States Patent [19]
You

[11] Patent Number: 6,158,045
[45] Date of Patent: *Dec. 5, 2000

[54] PORTABLE DEBUGGING SERVICES UTILIZING A CLIENT DEBUGGER OBJECT AND A SERVER DEBUGGER OBJECT WITH FLEXIBLE ADDRESSING SUPPORT

[75] Inventor: Lawrence L. You, San Jose, Calif.

[73] Assignee: Object Technology Licensing Corporation, Cupertino, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/556,318

[22] Filed: Nov. 13, 1995

[51] Int. Cl.$^7$ ........................................ G06F 9/45
[52] U.S. Cl. ........................................ 717/4
[58] Field of Search .................. 395/683, 681, 395/682, 701, 702, 703, 704, 705; 717/6, 1, 2, 3, 4, 5

[56] References Cited

U.S. PATENT DOCUMENTS

| | | | |
|---|---|---|---|
| 4,589,068 | 5/1986 | Heinen, Jr. . | |
| 4,821,220 | 4/1989 | Duisberg | 364/578 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,063,494 | 11/1991 | Davidowski et al. | 709/246 |
| 5,075,847 | 12/1991 | Fromme | 395/700 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas et al. | 395/650 |
| 5,133,075 | 7/1992 | Risch | 395/800 |
| 5,140,671 | 8/1992 | Hayes et al. . | |
| 5,151,987 | 9/1992 | Abraham et al. | 395/575 |
| 5,181,162 | 1/1993 | Smith et al. | 364/419 |
| 5,228,137 | 7/1993 | Kleinerman et al. . | |
| 5,233,611 | 8/1993 | Triantafyllos et al. . | |
| 5,257,395 | 10/1993 | Li | 395/800.22 |
| 5,261,077 | 11/1993 | Duval et al. | 395/500 |
| 5,283,878 | 2/1994 | Murray | 395/425 |
| 5,295,222 | 3/1994 | Wadhwa et al. . | |
| 5,297,284 | 3/1994 | Jones et al. | 395/700 |
| 5,315,703 | 5/1994 | Matheny et al. | 395/164 |
| 5,317,741 | 5/1994 | Schwanke | 395/700 |
| 5,325,530 | 6/1994 | Mohrmann | 395/704 |
| 5,325,533 | 6/1994 | McInerney et al. | 395/700 |
| 5,327,562 | 7/1994 | Adcock | 395/700 |
| 5,329,619 | 7/1994 | Page et al. . | |
| 5,339,430 | 8/1994 | Lundin et al. | 395/700 |
| 5,339,438 | 8/1994 | Conner et al. | 395/700 |
| 5,361,351 | 11/1994 | Lenkov et al. | 395/704 |

(List continued on next page.)

OTHER PUBLICATIONS

Maybee, Paul, NED: The Network Extensible Debugger, *Summer '92 USENIX*; pp. 145–156, Jun. 8–Jun. 12, 1992.
Weissman, Ronald, Unleashing the Power of Client/Server Computing, *Object Magazine*, vol. A, No. 1, pp. 38–39, Mar.–Apr., 1994.

(List continued on next page.)

*Primary Examiner*—Majid A. Banankhah
*Assistant Examiner*—Peter Stecker
*Attorney, Agent, or Firm*—Kudirka & Jobse, LLP

[57] ABSTRACT

A set of portable services for debugging computer software programs is disclosed. The services provide an object-oriented programming framework which is portable to various hardware and operating system platforms. The framework consists primarily of a debugger server and a debugger client. Multiple debugger clients, which target multiple processes executing on heterogeneous systems, can be used concurrently from a single high-level debugger process. Clients can processes locally and remotely. An addressing abstraction is utilized to facilitate the use of target memory addresses in a portable fashion. The use of static compiler types such as void* in the C and C++ languages do not properly express this as a portable abstraction since they are limited to the static size as implemented by the compiler used to compile the debugger code. Two major classes are used to describe the abstraction itself; other subclasses are created to describe processor-specific addressing data.

12 Claims, 13 Drawing Sheets

U.S. PATENT DOCUMENTS

| | | | |
|---|---|---|---|
| 5,361,352 | 11/1994 | Iwasawa et al. . | |
| 5,371,746 | 12/1994 | Yamashita et al. . | |
| 5,421,016 | 5/1995 | Conner et al. | 395/700 |
| 5,423,023 | 6/1995 | Batch et al. | 395/500 |
| 5,428,792 | 6/1995 | Conner et al. | 395/700 |
| 5,432,925 | 7/1995 | Abraham et al. | 395/500 |
| 5,437,027 | 7/1995 | Bannon et al. | 395/600 |
| 5,446,900 | 8/1995 | Kimelman . | |
| 5,481,708 | 1/1996 | Kukol . | |
| 5,481,721 | 1/1996 | Serlet et al. | 395/683 |
| 5,499,343 | 3/1996 | Pettus . | |
| 5,524,253 | 6/1996 | Pham et al. . | |
| 5,533,192 | 7/1996 | Hawley et al. . | |
| 5,590,281 | 12/1996 | Stevens . | |
| 5,600,790 | 2/1997 | Barnstijn et al. . | |
| 5,613,090 | 3/1997 | Willems | 395/500 |

OTHER PUBLICATIONS

May, et al., Designing a Parallel Debugger for Portability, IEEE, 1994, pp 909–914, 1994.

Borland Int'l, Turbo C++, User's Guide, Version 3.0, pp 217–241, 1992.

Robert Hood et al, Accommodating Heterogeneity in a Debugger–A Client–Server Approach, IEEE, pp. 252–253, 1995.

Doreen Cheng et al., A Portable Debugger for Parallel and Distributed Programs, IEEE, pp. 723–732, 1994.

John May et al., Designing a Parallel Debugger for Portability, IEEE, pp. 909–914, 1994.

Dumas, Joseph and Paige Persons, "Discovering the Way Programmers Think: New Programming Environments." *Communication of the ACM*. Jun. 1995: pp. 45–56.

Pascoe, Geoffrey A. "Encapsulators: A New Software Paradigm in Smalltalk. 80." *OOPSLA '86 Proceedings*. Sep. 1986: pp. 341–346.

Purtilo, James M. and Joanne M. Atlee. "Module Reuse by Interface Adaptation." *Software—Practice and Experience*. Jun. 1991: pp. 539–556.

Lam, Siman S. "Protocol Conversion." *IEEE Transactions on Software Engineering*. Mar. 1988: pp. 353–362.

Thatte, Satish R. "Automated Synthesis of Interface Adapters for Reusable Classes." *POPL '94*, Jan. 1994: pp. 174–187.

Yellin, Daniel M. and Robert E. Strom. "Interfaces, Protocols, and the Semi–Automatic Construction of Software Adaptors." *OOPSLA '94*. Oct. 1994: pp. 176–190.

Jacobson, Ivar and Fredrik Lindstrom, "Re–engineering of old systems to an object–oriented architecture." *OOPSLA '91*. pp. 340–350.

Filman, Robert E. "Retrofitting Objects." *OOPSLA '87*. Oct. 1987: pp. 342–353.

Dietrich, Walter C., Lee R. Nackman and Franklin Gracer. "Saving a Legacy with Objects." *OOPSLA '89*. Oct. 1989: 77–83.

Dotts, Alan and Don Birkley. "Development of Reusable Test Equipment Software Using Smalltalk and C." *OOPSLA '92*. Oct. 1992: pp. 31–35.

Duntemann, Jeff and Chris Marinacci. "New Objects for Old Structures." *BYTE*. Apr. 1990: pp. 261–266.

Alabiso, Bruno. "Transformation of Data Flow Analysis Models to Object–Oriented Design." *OOPSLA '88*. Sep. 1988: pp. 335–353.

Madhavji, Nazim H., Jules Desharnais, Luc Pinsonneault, and Kamel Toubache, "Adapting Modules to an Integrated Programming Environment." *IEEE International Conference on Programming Languages*. 1988: pp. 364–371.

Dutt, Nikil D. "Legend: A Language for Generic Component Library Description." *IEEE International Conference on Computer Languages*. 1990: 198–207.

Cheng, D.; Hood, R., A Portable Debugger For Parallel and Distributed Programs, Supercomputing '94, IEEE Comput. Soc Press, pp. 723–732, Nov. 14, 1994.

Object and Nature Code Theol Mobility Among Heterogeneous Competes, Bjorne Stensgard Gene Jul, SIGOPS, ACM, pp. 68–77, Dec. 1995.

Designing A Parallel Debugger for Portability, May, J; Berman F. Parrallel Processing Symposium 1994, Proceedings, IEEE, pp. 909–914, Apr. 1994.

PDG: A Portable Process–Level Debuggers for CSP–Style Parrallel Programs, Lauwereins et al, System Sciences, 1994, vol. I, IEEE, pp. 634–643, Jan. 1994.

Accomodating Polymorphic Data Decomposition in Explicity Parrallel Programs, Lin et al. Parrallel Processing Symposium 1994, IEEE, pp. 68–74, Apr. 1994.

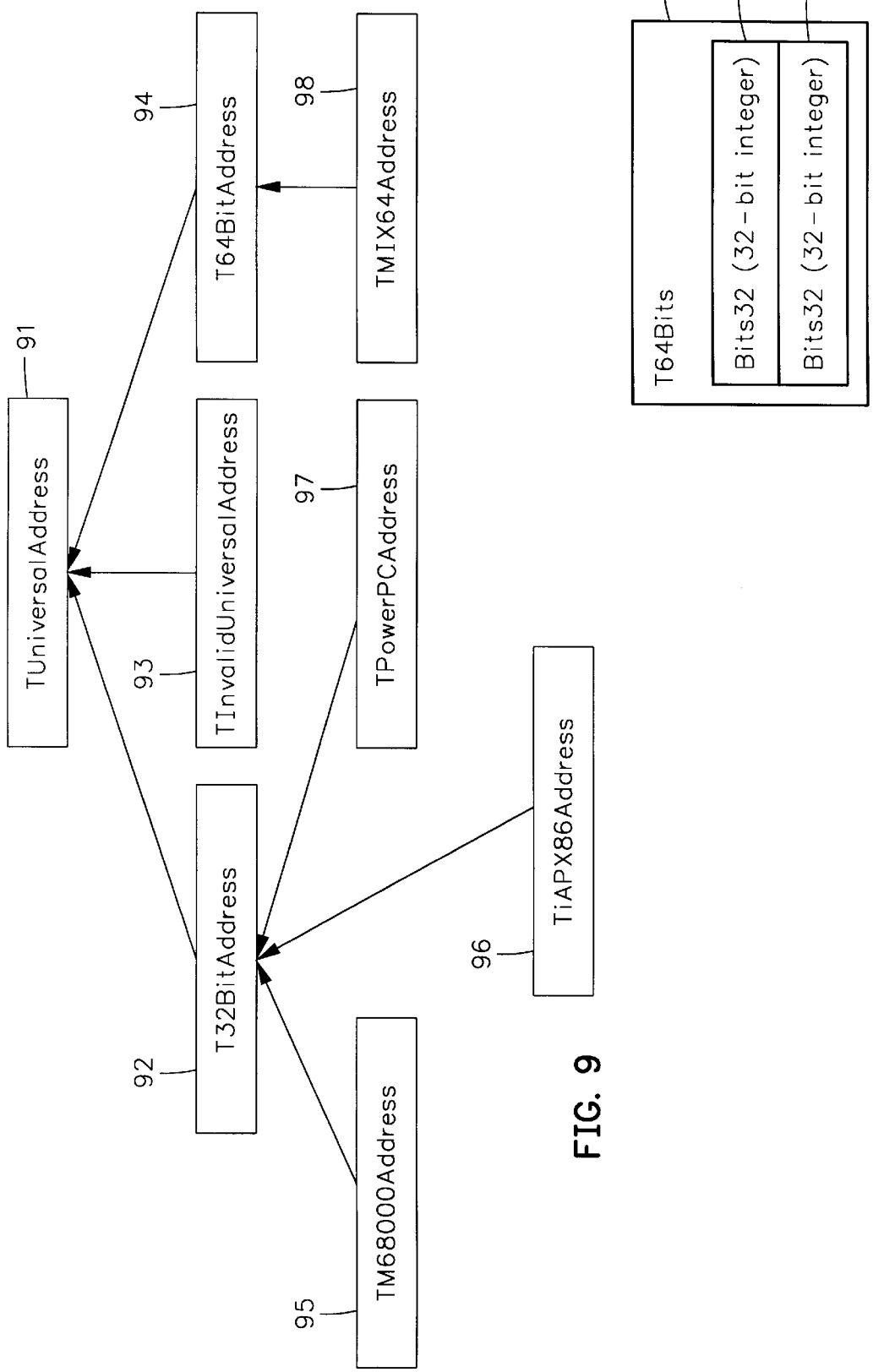

PORTABLE DEBUGGING SERVICES UTILIZING A CLIENT DEBUGGER OBJECT AND A SERVER DEBUGGER OBJECT WITH FLEXIBLE ADDRESSING SUPPORT

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to computer aided software engineering (CASE) and, more particularly, to program debugging in an interactive and dynamic environment for computer program building and debugging. The invention allows a programmer to cross-debug programs from an interactive programming environment to target execution environments. These target environments can differ from the programming environment by their computer processor architectures, by their operating systems, by their runtime environments, by their code formats, by their symbolic debugging information formats. In addition, the invention allows a programmer to simultaneously cross-debug programs on more than one target environment using a single debugger.

Debuggers are highly dependent on the details of target execution environments. Debugging services, when they are provided, differ widely in their features; they are highly non-portable in their interface and their semantics. The invention establishes a program framework from which to build a set of services; it also establishes a portable client interface and nonportable client interface extensions. Portable debugging services benefit developers of debuggers by providing a single programming interface and programming model. The portable services benefit software developers using a programming environment by enabling debuggers to target multiple programs on heterogeneous environments simultaneously, and by allowing remote as well as local debugging.

2. Description of the Prior Art

Object oriented programming (OOP) is the preferred environment for building user-friendly, intelligent computer software. Key elements of OOP are data encapsulation, inheritance and polymorphism. These elements may be used to create program frameworks, which define abstractions for software objects that can be reused as common program code, and augmented through customization. While these three key elements are common to OOP languages, most OOP languages implement the three key elements differently.

Examples of OOP languages are Smalltalk and C++. Smalltalk is actually more than a language; it might more accurately be characterized as a programming environment. Smalltalk was developed in the Learning Research Group at Xerox's Palo Alto Research Center (PARC) in the early 1970s. In Smalltalk, a message is sent to an object to evaluate the object itself. Messages perform a task similar to that of function calls in conventional programming languages. The programmer does not need to be concerned with the type of data; rather, the programmer need only be concerned with creating the right order of a message and using the right message. C++ was developed by Bjarne Stroustrup at the AT&T Bell Laboratories in 1983 as an extension of C. The key concept of C++ is class, which is a user-defined type. Classes provide object oriented programming features. C++ modules are compatible with C modules and can be linked freely so that existing C libraries may be used with C++ programs.

The complete process of running a computer program involves translation of the source code written by the programmer to machine executable form, referred to as object code, and then execution of the object code. The process of translation is performed by an interpreter or a compiler. In the case of an interpreter, the translation is made at the time the program is run, whereas in the case of a compiler, the translation is made and stored as object code prior to running the program. That is, in the usual compile and execute system, the two phases of translation and execution are separate, the compilation being done only once. In an interpretive system, such as the Smalltalk interpreter, the two phases are performed in sequence. An interpreter is required for Smalltalk since the nature of that programming environment does not permit designation of specific registers or an address space until an object is implemented.

A compiler translates the information into machine instructions, which are defined by the processor architecture of the machine which will execute the program. The translation process varies based on the compiler program itself, the processor architecture, the target runtime execution environment, compiler options, target operating system, and on programming interfaces which define services or features available in software packages or libraries. These factors can prevent software portability due to incompatibilities including differences in language syntax, compiler features, compiler options, from ambiguities in the computer language definition, from freedom in the compiler's interpretation in the language, in processor memory addressing modes and ranges, in ordering of memory (byte ordering), and a lack of programming interfaces or features on a target machine. Software portability is a goal for programmers who desire that their software execute on a variety of target platforms. Nonportable programming interfaces hinder the porting process.

Once a program has been compiled and linked, it is executed and then debugged. Because logical errors, also known as "bugs," are introduced by programmers, they will want to detect and understand the errors, using a program debugger. After correcting the errors and recompiling, they use the debugger to confirm that those errors have been eliminated. Other uses for the debugger include inspecting executing programs in order to understand their operation, monitoring memory usage, instrumenting and testing programs, verifying the correctness of program translation by the compiler, verifying the correctness of operation of other dependent programs, and verifying the operation of computer hardware.

Debuggers provide the program with information about the execution state of the running program as well as control of it. Program state includes program and data memory; hardware registers; program stacks; and operating system objects such as queues, synchronization objects, and program accounting information. Debuggers control programs with operations to start, stop, suspend, terminate, step over instructions, step into branches, step over statements, step through subroutine calls, stop at breakpoints, and stop at data watchpoints. Source-level, or symbolic debuggers present the state of executing programs at a high-level of abstraction, closely representing the execution of the program as if the source code were native computer operations.

Noninteractive debuggers usually lack the ability to control programs. They often only allow the programmer to inspect the state after a program has terminated. These are generally called "postmortem debuggers."

Interactive debuggers provide the programmer access to the state of programs while they are running. They allow the programmer to interact with the running program and control its execution.

Hardware debuggers are another class of debuggers which are used to check the operation of programs at a primitive level. For instance, they allow a programmer to view the operation of the CPU as it executes each instruction, or to view data in memory with a limited presentation such as a binary or hexadecimal output. These debuggers are not usually useful to programmers using high-level languages such as C++ because the type of data they provide is highly mismatched with the source code a programmer is debugging.

High-level symbolic debuggers attempt to let a programmer view running programs with the same level of abstraction as the original source code. Because the source code is compiled into machine instructions, the running programs are not actually being executed in the CPU itself. Instead, machine code translations execute "as if" the source code were real operations that could be carried out by the CPU. In order to present the programmer with a view of their program that closely matches their own perception of how the program is operating, high-level symbolic debuggers must use symbolic debugging information provided by the compiler which let the debugger, in essence, perform a reverse translation from the machine instructions and binary data, back into the source code.

The symbolic information used to perform this translation exists in the form of maps which allow the debugger to translate addresses of machine instructions back into source code locations, or to translate data on a CPU program stack back into the local variables declared in the source code.

Traditional program debuggers are limited in many aspects. Some debuggers are dedicated to debug programs generated by a particular development environment. Others may be semiportable but may not be able to target more than one environment at a time. Still others can only debug single process programs, and are not truly interactive.

The difficulty for interactive software debuggers is providing a programmer with the ability to inspect and control all aspects of executing and nonexecuting software computer programs. Debuggers extract information from the host computer system. The host computer system often only provides this information in the form of operating system calls, low-level driver subroutines, memory, hardware registers, or through a wide range of services. Unfortunately, because engineering designs are not driven by a unifying debugging design, the services are often developed ad hoc, simply revealing the data in any manner that is convenient, or by defining control interfaces to executing programs that are convenient to the implementor of the operating system services. And although a general hardware design may consist of a CPU, memory, and I/O or peripheral devices, similarity in computer design may end there. Because of the extent of such disparity in design, very few debuggers have been designed with portability in mind.

Some debuggers, such as gdb or dbx, are said to be "portable" in that some common source code is shared among implementations of debuggers that target heterogeneous platforms. This category of program debuggers are limited for several reasons: they are designed to only allow debugging of a single target environment at a time; they do not have necessary features to support interactive debugging through asynchronous user operations; program reuse is limited in that abstractions created for one target environment cannot always be used widely across a wide host of target systems; and they require extensive configuration of the program source code before building.

The Portable Debugging Services approach solves these problems by specifying an architecture for the services, an implementation for the framework expressing the design and protocol of the architecture, and by using extensions to the framework via inheritance and polymorphism, two features of object-oriented programming principles.

The Pi debugger, by Thomas Cargill at AT&T Bell Labs, is implemented using object-oriented techniques, but not for the purposes of developing portable debugging services. Instead, Cargill created a set of programming abstractions which could be used to represent class and data structures of programs. The Pi debugger does not have abstractions to support debugging multiple target environments concurrently.

Program debuggers are often used for local debugging, meaning that the development programming environment running the full debugger is the same host running the target program. Some program debuggers allow remote debugging, but do not use a uniform communication model for both. The Portable Debugging Services approach is to use a unified model of client-server debugger communication. This mechanism does not only work on homogeneous environments, but it also functions transparently on heterogeneous environments.

SUMMARY OF THE INVENTION

It is therefore an object of the present invention to provide a portable and dynamic process for the debugging of computer programs which promotes better developer focus and concentration, and hence greater productivity.

The portable debugging system is composed of a client debugger object, a connection object and a server debugger object. Each server debugger object is responsible for a particular debug environment. The client debugger object is designed to execute in any client debugger environment. The connection object facilitates communication between a client debugger object and a server debugger object. The client debugger object transmits debug requests to a target server debugger object. The connection object is responsible for routing the request to the target server debugger object.

An addressing abstraction is utilized to facilitate the use of target memory addresses in a portable fashion. The use of static compiler types such as void* in the C and C++ languages do not properly express this as a portable abstraction since they are limited to the static size as implemented by the compiler used to compile the debugger code. Two major classes are used to describe the abstraction itself; other subclasses are created to describe processor-specific addressing data.

BRIEF DESCRIPTION OF THE DRAWINGS

FIG. 9 shows the inheritance graph for sample classes in accordance with a preferred embodiment;

FIG. 10 shows the structure for a 64-bit address object in accordance with a preferred embodiment;

DETAILED DESCRIPTION OF A PREFERRED EMBODIMENT OF THE INVENTION

Definitions

Portable Debugging Services

Figure 1:
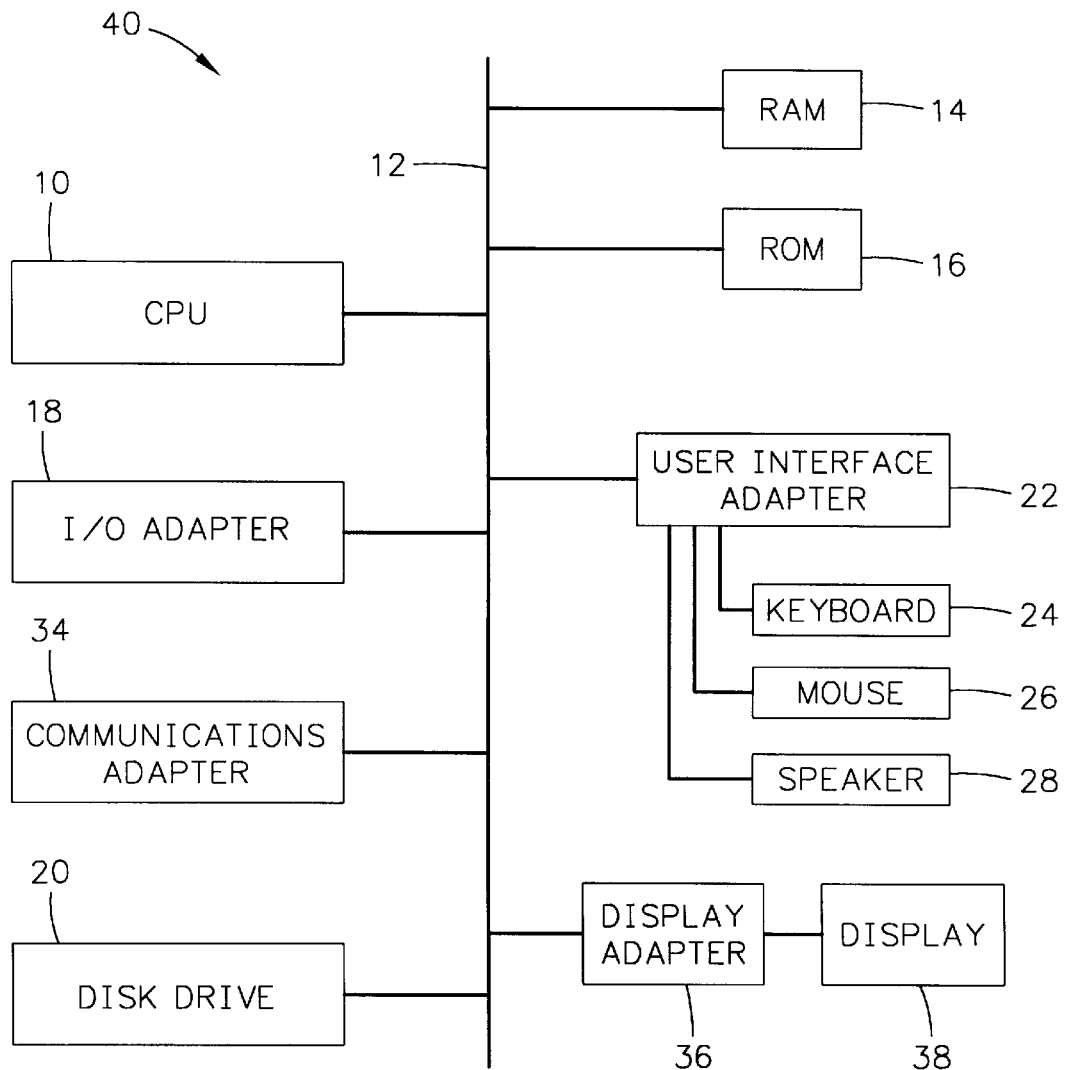
FIG. 1 illustrates a typical hardware configuration of a computer in accordance with the subject invention.

The Portable Debugging Services, hereafter called PDS, is made up of a programming architecture and implementations of the architecture.

The PDS architecture defines structure and protocol, but not the implementation of the debugging services. The architecture defines the abstractions of the individual object-oriented classes, the abstraction of the debugging services architecture, configuration, organization, and interaction of the instances of objects used within the program architecture. The architecture is portable and designed to serve the needs of a wide range of program analysis and debugging tools.

The implementations are concrete manifestations of the debugging services. An individual implementation of the debugging services is composed of the framework and target-specific code.

Object-Oriented Program Framework

The object-oriented program framework, or framework, is a single, primitive, and portable implementation of the abstractions that express program code that can be reused within the domain of a program that is specific to a particular problem. In this case, the individual problem domains are the target execution environments in which programs execute.

Debugger

A debugger, or interactive program debugger, is a programming tool which is instrumental in allowing a programmer to inspect and control the execution of a program. It is a programming tool that has many features and many uses; some example uses include:

A programmer may use the tool to gather information about the logical execution of an algorithm by watching the locations of code being executed during the prototyping stages of development. The debugger can provide information about the program, showing the lines or statements of source code being executed or program variables and their values. It can also be controlled through commands which let the programmer set breakpoints in memory such that the program will stop at those locations.

A program exhibits an error and is terminated abnormally. A programmer can use a debugger to inspect the state of the program.

A program built on top of a primitive debugger can exploit the capabilities of the debugger to gather dynamic information about the program. When a target program is instrumented in this fashion, a programmer can determine the number or frequency of program calls, subroutine calling patterns in the program, and other information which is not available statically. Further uses of dynamic analysis allows a programmer to determine memory usage, performance bottlenecks, and code coverage; this data is used to improve code quality.

Noninteractive Program Debuggers

Noninteractive program debuggers are used to analyze the programs without controlling their execution. One class of these debuggers are postmortem debuggers which allow a programmer to inspect the state of a program after its termination.

Interactive Program Debuggers

Interactive program debuggers allow the user to inspect and control the execution of programs. They may also allow the user to modify the program's state and change the program's execution to behavior that is different from the semantics of the original source programs. Interactive debuggers may have textual or graphical user interfaces.

Symbolic Debuggers

Symbolic Debuggers are a class of debuggers which allow a programmer to view his program through the representation of program symbols. The program symbols are typically the names of subroutines, classes, types, variables, and other program constructs as defined by a high-level programming language. The symbolic debugger typically allows a programmer to watch the correlation between their original source code and compiled code.

Source-Level Debuggers

The term source-level debugger is used interchangeably with symbolic debugger.

Machine Language

The machine language is composed of the instructions defined by a computer microprocessor. These instructions are the most primitive instructions and only true operations that can occur on the microprocessor.

Assembly Language

Assembly languages map directly to the machine language. They are generally defined in terms of mnemonics, which are names for individual machine language instructions; macros, which allow an assembly language programmers to compose their programs using groups of mnemonics. It is a low-level programming language which is useful in creating programs where the programmer selects individual instructions and their ordering.

High-Level Language

High-level programming languages are an improvement over machine or assembly language in their level of expression, readability and abstraction, whereby the syntax and semantics of the language may represent many machine language instructions with individual program statement. Additionally, data structures and algorithms are more clearly represented using the constructs of the language.

Source Code

The source code is the original data created by a programmer representing his program in any language. The source code is used as a starting point from which programs are built.

Object Code

When programs are compiled or assembled, i.e. they are translated from their original source code, the end result is the object code, or executable code. In some cases, programs may execute without ever being translated into object code, for example, interpreted programs.

Linker

Object code from individual pieces of source code may be combined to form subroutine and class libraries or they may be combined to form executable programs. This step is done by a program linker.

Compiler

A program compiler translates a programmer's source code into executable object code. The compiler interprets the source code, which is often text entered by a program editor by the programmer, using the rules of a language. The language defines the syntax and the semantics of the language; the compiler translates the code, which follows the syntax, into an executable program which exhibits behavior following the semantics. Because the translation process is inherently a modifying process, the compiler also generates symbolic debugging information, which is used by a symbolic debugger to interpret the executing program, thereby displaying program state and controlling program execution.

Interpreter

A program may be interpreted instead of compiled. The program interpreter will read the source code, and execute it as it reads it. This form of program execution is dynamic, in that binding of variables to their locations, binding callers of subroutines to the subroutines themselves, and other interpretation of the program occurs as the program is being executed, and not statically, as a compiler will do before a program starts execution.

Target

The target is a shorthand term for target process, target host or machine, target processor, or anything related to the execution of a debugged program.

Target Host

The target host is the CPU on which the target program and debugger server execute.

Target Execution Environment

When a program is executing, it exists within a target execution environment. The environment includes the hardware, operating system, runtime environment, and any other aspects of the computer on which a target process executes.

Client Debugger

A debugger can be composed of many pieces. In a separated client-server debugger architecture, the debugger server executes as a process on the target machine. The client of the debugger server, or client debugger, which is a part of the high-level debugger, is separated logically from the server. Location of this client debugger does not necessarily have to be executing on the same host as the server.

Client Debugger Execution Environment

When a client debugger is executing, it exists within a client debugger execution environment. The environment includes the hardware, operating system, runtime environment, and any other aspects of the computer on which a client debugger executes Runtime Environment The runtime environment is made up of resources and services available to the execution of a program. The environment exists within a process and may include a program heap for dynamic memory storage, a runtime type system for determining object types, shared libraries which contain code that can be used across address spaces, and other services specific to that particular instance of program execution.

Debugger Client

In the client-server debugger architecture, the debugger client is a set of programming interfaces which define the services provided by the server. The debugger client may also be the program which uses those interfaces.

Debugger Server

The major functionality in the portable debugging services are provided by a debugger server which is a process that executes on the target host. The server accepts requests from a debugger client, subsequently processing the request and replying to the request.

Synchronous Debugger

Program debuggers may be fully synchronized with the target programs they execute. These are called synchronous debuggers. When these debuggers execute, they are in one of two modes: an interactive mode, or a mode suspended until the target processes' changes their execution mode. When these debuggers execute, they may only debug a single target program at a time because they can only issue a single operation to start a target program at a time. In this mode of synchronous debugging, the operations are limited because the user of the debugger may not change the state or control flow of the target program without first stopping the program. It is also limited in its ability to debug multithreaded programs in as much as it prevents multithreaded programs to stop one thread at a time. Synchronous debuggers are generally not designed to be asynchronous debuggers.

Asynchronous Events

When an event occurs and is communicated without respect to the execution state of another process or thread, it is said to be an asynchronous event. For such a condition to occur, a system must be concurrent, in which there are multiple CPUs executing concurrently, or through simulated concurrency in which threads are switched during the program's execution. Multiple threads can execute concurrently or through simulated concurrency in separate processes.

Asynchronous Debugger

A program debugger that can process events from multiple target programs is said to be an asynchronous debugger. This model of debugging differs from synchronous debugging because multiple processes and threads can be executing under the control of a single debugger. Each thread or process can cause events which the asynchronous debugger processes. An asynchronous debugger is free to execute while a target thread or process is executing. Multithreaded programs can be debugged so that some threads may be stopped and others remain executing while the debugger is also executing. Synchronous debugging then is a subset of functionality provided by asynchronous debugging. The PDS is an asynchronous debugger.

Streaming

An object-oriented abstraction for reading and writing data is called streaming. A stream is an object that can be written into or read from; its protocol is ultimately made up of reading and writing primitive language types and blocks of data. A well-specified programming interface convention allows arbitrary objects to write their internal state into a stream. This process is called streaming out, as in "streaming out an object to a file-based stream." Conversely, another programming interface convention allows those objects to read their state from a stream. This process is called streaming in, as in "streaming in an object from a network-based stream."

OVERVIEW OF THE INVENTION

PDS is an architecture for debugging services that can be used for debugging. It is portable in that a single architecture and single framework can be executed on a wide variety of platforms, which may vary in their microprocessor family, number of processors, processor register sizes, numbers of processor registers, memory addressing, operating system, communication models, hardware debugging support, operating system debugging support, software and exception handling, runtime library and loader models, executable file formats, compilers, and a multitude of other parameters.

Client-Server Overview

The portable debugging services (PDS) architecture is composed of a client-server program model. In this model, a single debugger server executes on the target host. A host-specific implementation which uses the PDS framework uses features in the host operating system for determining debugging information.

The client debugger may execute in any client debugger execution environment provided there are connection objects supporting the client-server connection.

Connection objects are objects that allow a client and server to communicate. They are also used on a "reverse connection" which is used by a server to initiate delivery of notification messages to the client debugger.

Figure 2:
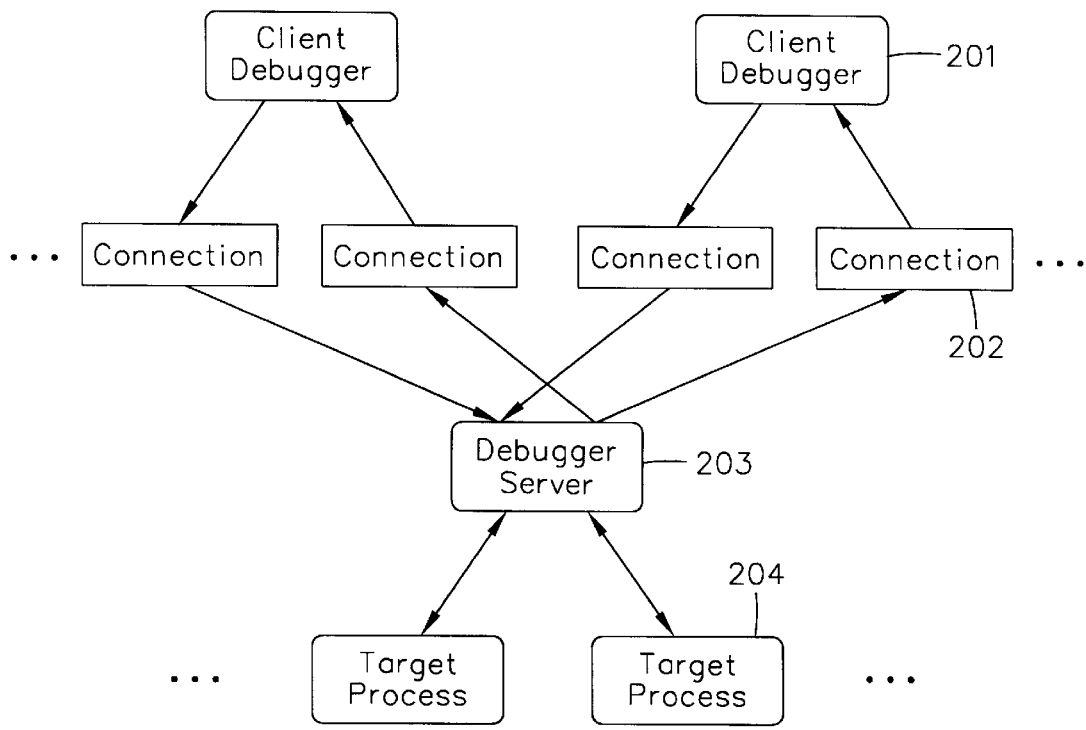
FIG. 2 is a block diagram showing a client/server connecting through a debugger server to target processes in accordance with a preferred embodiment.

FIG. 2 illustrates a client-server debugging system in accordance with a preferred embodiment. The client debugger user interface 201, provides a window into the target process 204 controlled by the debugger server 203 via the connection object 202.

The client and server communicate with these connection objects. The communication protocol allows primitive objects to stream themselves across from a sender side of the connection object across to the receiver side. The client and server use many abstractions to encapsulate various information about process state, thread state, execution state, and so on.

The client-server model typically operates under a common pattern: the client initiates a request to a server, the server services the request, and the server replies to the request. In the PDS client-server model, the client may be registered for notification, in which case the server may handle events asynchronously with respect to client requests. These events, such as a target program stopping at a breakpoint, can be sent back to the client on a "reverse connection." This allows the debugger to be asynchronous at the client as well as the server. The information sent from server to client are notification objects.

Client-Server Abstractions

The primitive objects containing the data that are exchanged between the client and server encapsulate a wide range of information which describe the state of the target host and server, the target processes, the target threads, runtime information, breakpoint and watchpoint descriptions, client identification, stacks and register values, and software and hardware exception handling parameters.

Collections

A basic object-oriented construct is the collection. This object is used as a container for other objects. The method for storage and retrieval is dependent on the uses for the objects and the common modes of access. A method call template classes is used to reuse code which is defined by template, i.e. a set of C++ code which can be used to operate on generic or parameterized types. This mechanism for reuse in the language differs from the polymorphic reuse. Instead of defining a function interface that is shared over many subclasses, the template class reuses interfaces by effectively substituting the parameterized type classes directly into the code, compiling instances of the template class.

MDebuggerCollectible

A primitive base class, used by many classes that are stored in collections, is the MDebuggerCollectible class. This class defines a protocol for streaming and storage in collections.

```
class MDebuggerCollectible {
public:
                                    MDebuggerCollectible();
    virtual                         MDebuggerCollectible();
    virtual TDebuggerStream&        operator>>=(TDebuggerStream&) const;
    virtual TDebuggerStream&        operator<<=(TDebuggerStream&);
    virtual MDebuggerCollectible*   X_Clone() const;
    virtual long                    Hash() const;
    virtual bool                    IsEqual (const MDebuggerCollectible*)
                                        const;
    virtual bool                    IsSame(const MDebuggerCollectible*)
                                        const;
    bool                            operator==(const
MDebuggerCollectible&)
                                        const;
    bool                            operator!=(const
MDebuggerCollectible&)
                                        const;
};
```

The abstract base class defines no data members. The operator>>= streaming function allows the object to stream itself out into the provided stream parameter. Likewise, the operator<<= streaming function allows the object to stream itself in from the provided stream parameter.

The X_Clone function is used to create copies of the object being used. The implementation of this clone requires macros to perform the mechanical work of instantiating a copy of the object.

The Hash member function allows the object to describe itself in terms of a scalar hash value.

The IsEqual function allows comparison of objects. The test will return true if equal and false if not.

Another function, IsSame, is called for testing identity, meaning that if the object specified as the parameter is the same as the one whose IsSame function is being called, the result will be true. Otherwise, the result is false.

The member function operator== is provided for testing equality (which calls the IsEqual function). Similarly, the member function operator!= is provided for testing inequality.

TPDCollection

The abstract base class used to define collections is called TPDCollection. This class defines protocol which is common to all collection classes.

In the following example C++ class interface, the collection class has a parameterized type named AObject. As defined by the C++ language standard, when the template class is instantiated, the compiler will pick up a parameterized type, inserting the formal type as necessary where the AObject symbol is used.

Figure 4:
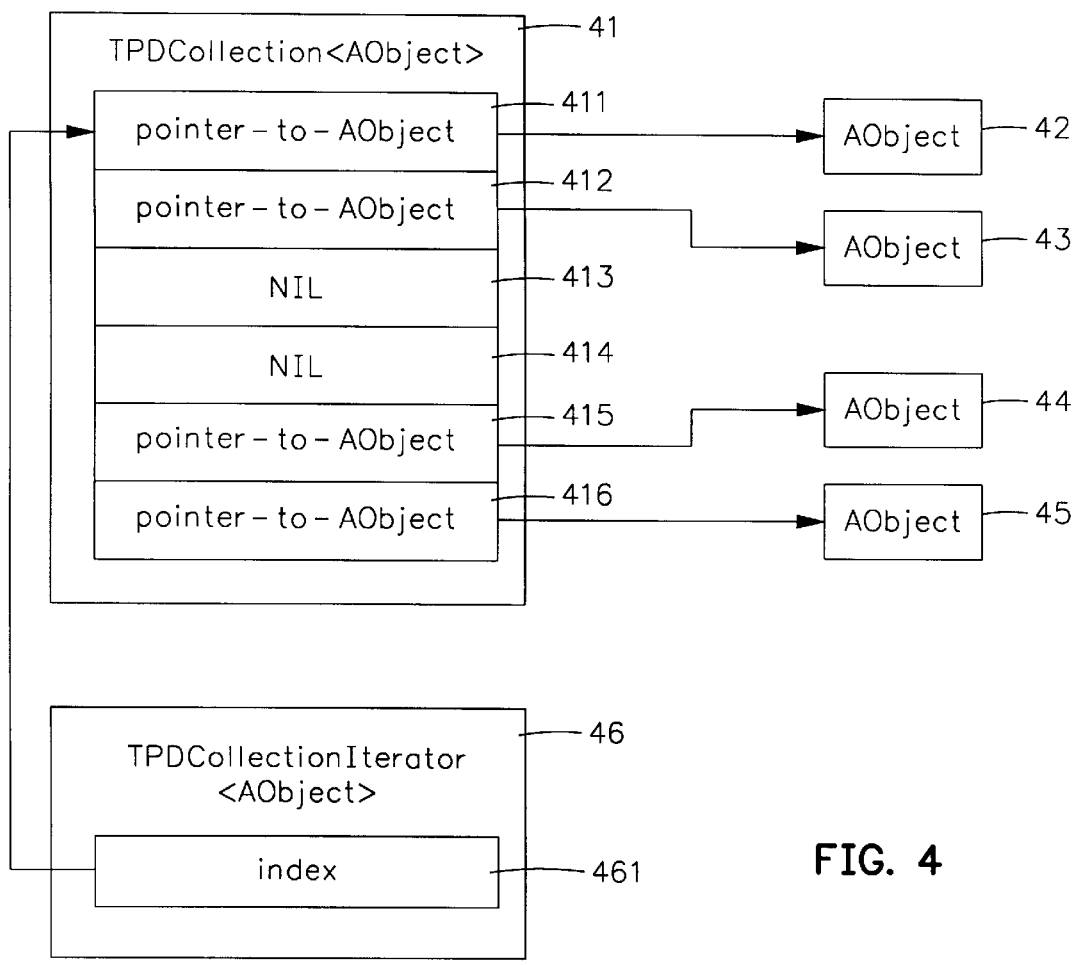
FIG. 4 is a block diagram of portable collection objects in accordance with a preferred embodiment.

In FIG. 4, the collection 41 represents a possible layout for the memory locations in which pointers to the objects of type AObject are stored. Memory locations 411, 412, 413, 414, 415, and 416 contain pointers to the individual objects that are stored in the collection class. The actual implementation of the class is dependent on the type of class. The base class TPDCollection only specifies the protocol for access, metrics for sizing, and iteration. In FIG. 4, memory location 411 points to an object 42 which is said to be stored or owned by the collection class. Likewise, memory location 412 points to an object 43 and memory location 415 points to an object 44.

The TPDCollection class can be constructed by default or by copying another TPDCollection class (also parameterized over the same type). The latter of these guarantees deep-copy semantics.

The operator>>= streaming function allows the object to stream itself out into the provided stream parameter. Likewise, the operator<<= streaming function allows the object to stream itself in from the provided stream parameter. The contained objects (of the parameterized type AObject) are streamed out monomorphically.

To determine the number of objects stored in the collection, a program would call the GetCount member function. To determine the effective storage size of the collection, i.e. the allocated space used by the collection, the GetSize function would be called.

Figure 3:
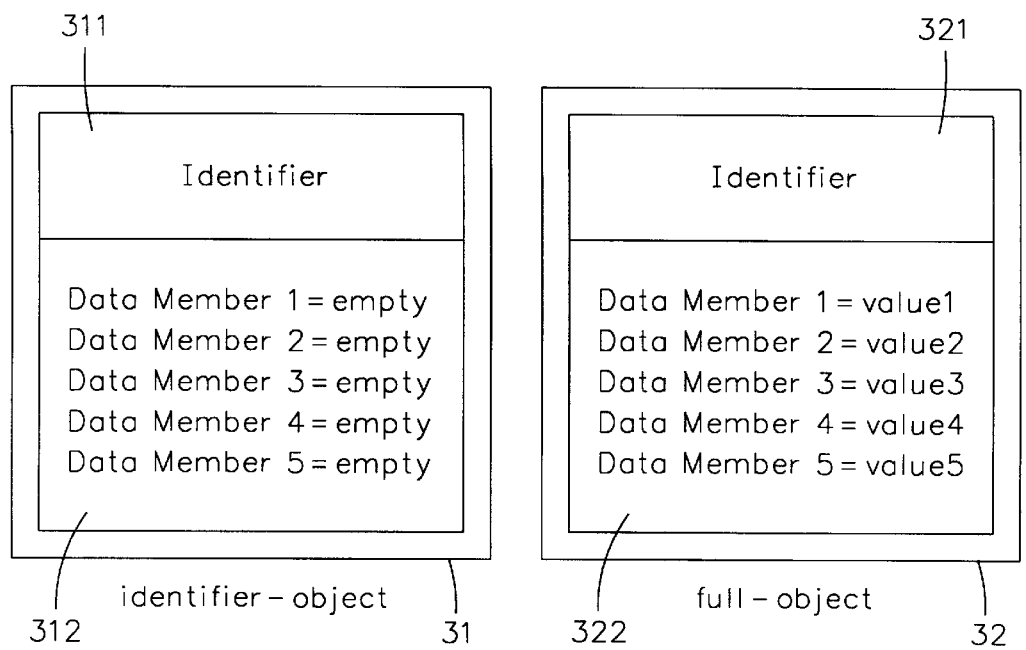
FIG. 3 is a block diagram of an identifier-object and a full-object in accordance with a preferred embodiment.

Retrieval from the collection has a uniform, polymorphic interface. This is achieved by calling the Get function which takes an object of the parameterized type. FIG. 3 includes a description of two objects with the same structure containing differing amouts of data. Depending on the subclass, a mechanism is used whereby objects are constructed in one of two ways: an "identifier" style object 31 and a "full" style object 32. The "identifier" style of object contains an identification information 311 necessary to test that the object 31 being retrieved is the same as the one that is stored 32. In object 31, there may be no data stored. However in object 32, the data members stored as instance data is stored in the remainder of the object 322.

An object can be removed by specifying an identification object and passing it to the function Remove.

When the objects held by the collection class need to be deleted from memory, the DeleteAll member function is called. This deallocates and destructs each AObject object stored by the collection class and any pointer memory or storage that refers to the objects are also marked as empty.

Finally, the CreateIterator function polymorphically creates an iterator which is specific to the class and instance of collection class.

TPDCollectionIterator

```
template<class AObject>
class TPDCollectionIterator {
public:
                                TPDCollectionIterator(
                                        TPDCollection<AObject>*);
```

```
template<class AObject>
class TPDCollection {
public:
                                        TPDCollection();
                                        TPDCollection (const
                                                TPDCollection<AObject>& source);
        virtual                         ~TPDCollection();
        virtual TDebuggerStream& operator>>=(TDebuggerStream& dstStream)
                                                const = 0;
        virtual TDebuggerStream& operator<<=(TDebuggerStream& srcStream)
                                                = 0;
        virtual PrimitiveDbgCollCount   GetCount() const = 0;
        virtual PrimitiveDbgCollCount   GetSize() const = 0;
        virtual AObject*                Get(const AObject&) const = 0;
        virtual AObject*                Remove(const AObject&) = 0;
        virtual void                    DeleteAll() = 0;
        virtual TPDCollectionIterator<AObject>*  CreateIterator() = 0;
};
```

-continued

```
    virtual              ~TPDCollectionIterator();
    virtual AObject*     Next() = 0;
    virtual AObject*     First() = 0;
  protected:
                         TPDCollectionIterator();
    TPDCollection<AObject>*  GetCollection();
  private:
    TPDCollection<AObject>*  fCollection;
};
```

The PDS uses the collections to store, retrieve, and iterate through data. The act of iteration requires creating an iterator which is bound specifically to an instance of a collection class. Accordingly, the iterator must be created with the correct type. The AObject type for the iterator class must be the same as the AObject type specified for a collection class whose objects are to be iterated over.

The pointer to the collection over which iteration is to occur is specified when the iterator is constructed.

After construction, the owner of the iterator may call the First function, which returns a pointer to the first object in the list. It is not required that the iterator return objects in any particular order unless the contract of the collection class with the client of the class specifies one. For instance, an ordered set class may require that individual objects returned by the iterator are in a particular order but a set class would not. Whenever it is required that the iteration is to start over again, the First function is called again.

After receiving a pointer to the first iterated object, the client may call the Next function which will return the next object after the last one returned. Subsequent calls will return objects to subsequent objects in the collection.

The data member fCollection is a pointer to the collection over which is being iterated.

In FIG. 4, an example of an iterator is shown by iterator object 6, which contains an index to the memory locations which contain pointers to the objects 42, 43, 44 and 45. As the iterator walks through the data structure, first 411, then 412, then 415, and so on until 416, it will only return when it returns values which contain non-NIL values.

TPDSet

One concrete implementation of the TPDCollection abstract base class is the TPDSet class. This is a very generic class which is also used to support storage of a wide variety of types. Objects can be of any type and are stored in an unordered manner.

```
template<class AObject>
class TPDSet : public TPDCollection<AObject> {
public:
    friend class TPDSetIterator<AObject>;
                         TPDSet();
    virtual              TPDSet();
    TPDSet<AObject>&     operator=(const
TPDSet<AObject>&);
    virtual TDebuggerStream&  operator>>=(TDebuggerStream&
                                  dstStream) const;
    virtual TDebuggerStream&  operator<<=(TDebuggerStream&
                                  srcStream);
    PrimitiveDbgCollCount     GetCount() const;
    PrimitiveDbgCollCount     GetSize() const;
    virtual void         Add(const AObject&);
    virtual void         Adopt(AObject*);
    virtual AObject*     Get(const AObject&) const;
    virtual AObject*     Remove(const AObject&);
    virtual void         Delete(const AObject&);
```

-continued

```
    virtual void                 DeleteAll();
    virtual TPDSetIterator<AObject>*  CreateIterator();
  protected:
    PrimitiveDbgCollCount        FindEmptySlot() const;
    PrimitiveDbgCollCount        FindObject(const AObject&)
  const;
  private:
    PrimitiveDbgCollCount        fCount;
    PrimitiveDbgCollCount        fCollectionSize;
    AObject**                    fObjectList;
};
```

This simple implementation is constructed with no arguments.

A set can be copied in whole using deep-copy semantics using the operator= member function.

The operator>>= streaming function allows the object to stream itself out into the provided stream parameter. Likewise, the operator<<= streaming function allows the object to stream itself in from the provided stream parameter. The contained objects (of the parameterized type AObject) are streamed out monomorphically.

To determine the number of objects stored in the set, a program would call the GetCount member function. To determine the effective storage size of the set, i.e. the allocated space used by the collection, the GetSize function would be called.

When an object is to be stored in the collection, the Add function is used. It will make a copy of the object which is passed in as a parameter and store the copy in the collection. Similarly, the Adopt function will take the object itself and store it directly into the collection, but without first making a copy.

Retrieval from the collection has a uniform, polymorphic interface. This is achieved by calling the Get function which takes an object of the parameterized type.

An object can be removed by specifying an identification object and passing it to the function Remove.

When the objects held by the collection class need to be deleted from memory, the DeleteAll member function is called. This deallocates and destructs each AObject object stored by the collection class and any pointer memory or storage that refers to the objects are also marked as empty.

Finally, the CreateIterator function polymorphically creates a TPDSetIterator (below).

The actual implementation of the set varies. The underlying implementation may use an array or a hash table.

TPDSetIterator

```
template<class AObject>
class TPDSetIterator : public TPDCollectionIterator<AObject>
public:
    TPDSetIterator(TPDSet<AObject>*);
    virtual              ~TPDSetIterator();
    virtual AObject*     Next();
    virtual AObject*     First();
  private:
    void                 Reset();
  private:
    PrimitiveDbgCollCount  fIndex;
};
```

The TPDSetIterator class derives from the TPDCollectionIterator class and uses an index into a hash table or array, stored in the fIndex data member.

The pointer to the TPDSet over which iteration is to occur is specified when the iterator is constructed.

After construction, the owner of the iterator may call the First function, which returns a pointer to the first object in the list. It is not required that the iterator return objects in any particular order. Whenever it is required that the iteration is to start over again, the First function is called again.

After receiving a pointer to the first iterated object, the client may call the Next function which will return the next object after the last one returned. Subsequent calls will return objects to subsequent objects in the collection.

The Reset function is incidental to this particular implementation of the TPDSetIterator class and is called to reset the internal index before the First member function is called.
TScalarKeyValuePair Although collections only store individual objects within them, the objects can be composed of multiple objects themselves.

Figure 5:
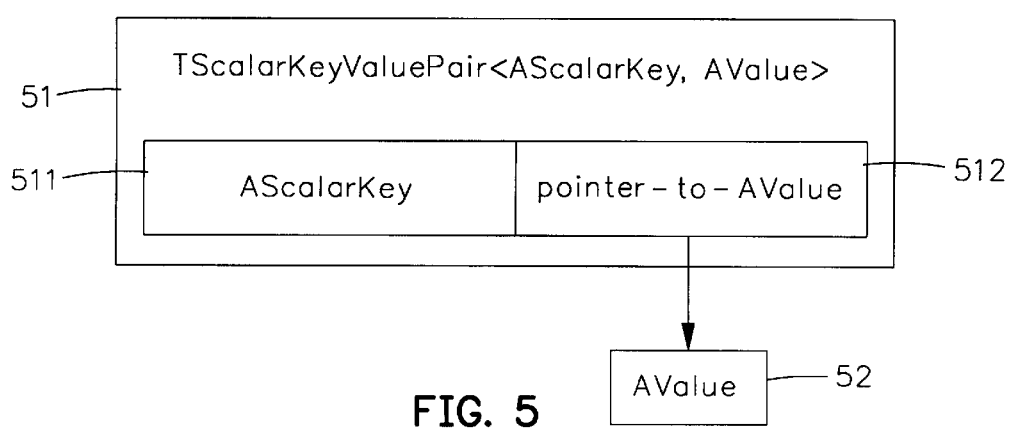
FIG. 5 is a block diagram of templatized class object and the scalar object in accordance with a preferred embodiment.

One such class that describes this is the TScalarKeyValuePair, which contains a scalar identifier, or key, and a pointer to a value object. In FIG. 5, storage is allocated in this templatized class object 51 for the AScalarKey identifier 511, and the pointer to AValue, item 512. Elsewhere in memory is the actual object 52 which 512 refers to.

The C++ class interface for TScalarKeyValuePair is defined as:

which takes both these values. And finally, it takes a copy constructor which deep-copies another TScalarKeyValuePair object.

The standard operator=, Hash, IsEqual functions are defined as specified by the base class protocol. The Hash function returns a value based on the fKey. The IsEqual function only tests the fKey for equality; the fValue portion is not tested as described above because only the identifier portion of the object is tested.

This class can be used when objects are not streamable. Because this class deviates from the base protocol, the operator>>= and operator<<= functions do not actually stream any objects.

Another function, IsSame, is called for testing identity, meaning that if the object specified as the parameter is the same as the one whose IsSame function is being called, the result will be true. Otherwise, the result is false.

To access the data within the object, the GetKey function returns the scalar value. To return a pointer to the value, the GetValue function is returned.
TStreamableScalarKeyValuePair The TStreamableScalarKeyValuePair class is identical to the TScalarKeyValuePair class except that the objects stored within are streamable.

```
template<class AScalarKey, class AValue>
class TScalarKeyValuePair : public MDebuggerCollectible {
public:
                                        TScalarKeyValuePair ();
                                        TScalarKeyValuePair (AScalarKey,
                                            AValue*);
                                        TScalarKeyValuePair (const
                                            TScalarKeyValuePair<
                                            AScalarKey, AValue>&);
  virtual                               ~TScalarKeyValuePair();
  TScalarKeyValuePair<AScalarKey, AValue>&  operator=(
                                            const TScalarKeyValuePair<
                                            AScalarKey,
AValue>&);
  virtual TDebuggerStream&              operator>>=(TDebuggerStream&)
const;
  virtual TDebuggerStream&              operator<<=(TDebuggerStream&);
  virtual long                          Hash() const;
  virtual bool                          IsEqual(const
MDebuggerCollectible*)
                                            const;
  virtual bool                          IsSame(const
MDebuggerCollectible*)
                                            const;
  AScalarKey                            GetKey() const;
  AValue*                               GetValue() const;
protected:
  AScalarKey                            fKey;
  AValue*                               fValue;
};
```

The constructor provides default construction, in which no key or value is specified. It also provides a constructor

```
template <class AScalarKey, class AValue>
class TStreamableScalarKeyValuePair
   public TScalarKeyValuePair<ScalarKey, AValue> {
   public:
                                        TStreamableScalarKeyValuePair();
                                        TStreamableScalarKeyValuePair(
                                            AScalarKey, AValue*);
```

```
TStreamableScalarKeyValuePair (const
TStreamableScalarKeyValuePair<
                                      AScalarKey, AValue>&);
    virtual
    ~TStreamableScalarKeyValuePair();
    TDebuggerStream&               operator>>=(TDebuggerStream&)
const;
    TDebuggerStream&               operator<<=(TDebuggerStream&);
};
```

TPDIDCollection

The server ensures uniqueness of the identifiers of objects stored in some of its data structures. To guarantee this uniqueness, the TPDIDCollection class specifies storage for an identifier and a function for generating new, unique identifiers.

In all respects, the TPDIDCollection is identical to the TPDSet class. An additional data member, fNextID, of templatized type AScalar, contains a scalar value which is initialized in the collections construction.

When the MintID function is called, an new identifier is generated and returned to the caller.

TPDArray

A simple collection for storing objects is the TPDArray class. It is used to easily access individual objects in the array. The array can grow as necessary, as more objects are added to the collection.

An initial size is specified by default:

```
template <class AObject, class AScalar>
class TPDIDCollection : public TPDSet<AObject> {
public:
                                   TPDIDCollection();
                                   TPDIDCollection (const
                                   TPDIDCollection<
                                      AObject, AScalar>&);
    virtual                        ~TPDIDCollection ();
    TPDIDCollection<AObject, AScalar>&  operator=(const
                                   TPDIDCollection<
                                      AObject, AScalar>&);
    virtual AScalar                MintID();
private:
    AScalar                        fNextID;
};
```

```
const  PrimitiveDbgCollCount  kInitialPrimitiveArraySize = 20;
```

The C++ class interface for the TPDArray class is defined as follows:

```
template<class AObject>
class TPDArray : public TPDCollection<AObject> {
public:
    friend class TPDArrayIterator<AObject>;
                                   TPDArray (PrimitiveDbgCollCount
                                      initialSize =
       kInitialPrimitiveArraySize);
                                   TPDArray(const
TPDArray<AObject>&);
    virtual                        ~TPDArray();
    TPDArray<AObject>&             operator=(const
TPDArray<AObject>&);
    virtual TDebuggerStream&       operator>>=(TDebuggerStream&)
const;
    virtual TDebuggerStream&       operator<<=(TDebuggerStream&);
    PrimitiveDbgCollCount          GetCount() const;
    PrimitiveDbgCollCount          GetSize() const;
    virtual AObject*               Get(const AObject&) const;
    virtual AObject*               Remove(const AObject&);
    virtual void                   DeleteAll();
    virtual AObject*               At(PrimitiveDbgCollCount index)
                                      const;
    virtual void                   AtPut (PrimitiveDbgCollCount
index,
                                      AObject&);
    virtual void                   AtAdopt (PrimitiveDbgCollCount
index,
                                      AObject*);
    virtual TPDArrayIterator<AObject>*  CreateIterator ();
protected:
    PrimitiveDbgCollCount          FindObject(const AObject&)
const;
    AObject**                      Reallocate(
```

-continued

```
                            PrimitiveDbgCollCount
newSize
                            AObject* currentList[],
                            PrimitiveDbgCollCount
oldSize);
private:
    PrimitiveDbgCollCount   fSize;
    AObject**               fObjectList;
};
```

All functions are implemented according to the base lass protocol. Access to the objects within the TPDArray class an be achieved using the Get function, or the At function which specifies an index into the array.

To store an object of type AObject, the pointer to the object is passed into the AtAdopt function, storing the pointer at the index specified. Similarly, to copy an object first before storing, the AtPut function is called with an index and a pointer to the object.

Protected member function FindObject simply searches through the array of pointers to objects.

The Reallocate function will reallocate a pointer to the memory block containing the pointers to objects that are stored in fObjectList.

TPDArrayIterator

The TPDArrayIterator class derives from the TPDCollectionIterator class and uses an index into a hash table or array, stored in the fIndex data member.

The pointer to the TPDArray over which iteration is to occur is specified when the iterator is constructed.

After construction, the owner of the iterator may call the First function, which returns a pointer to the first object in the list. It is required that the iterator return objects in order of the array. Whenever it is required that the iteration is to start over again, the First function is called again.

After receiving a pointer to the first iterated object, the client may call the Next function which will return the next object after the last one returned. Subsequent calls will return objects to subsequent objects in the collection.

The Reset function is incidental to this particular implementation of the TPDArrayIterator class and is called to reset the internal index before the First member function is called.

```
template<class AObject>
class TPDArrayIterator : public TPDCollectionIterator<AObject> {
public:
    TPDArrayIterator (TPDArray<AObject>*);
    virtual                     ~TPDArrayIterator();
    virtual AObject*            Next();
    virtual AObject*            First();
private:
                                TPDArrayIterator();
    void                        Reset();
private:
    PrimitiveDbgCollCount       fIndex;
};
```

Linked Lists

A primitive linked list class is used by the debugger framework. The MDebuggerLinkable base class provides functionality which is similar to the MLinkable class found in the CommonPoint class frameworks. Objects that are required to be stored in linked list data structures derive from the MDebuggerLinkable class. A linked list class, TPDLinkedList contains the head of the linked list object that derives from MDebuggerLinkable. To iterate over all of the objects in a linked list, the TPDLinkedListIterator is used.

MDebuggerLinkable

Any object whose use requires storage within a linked list must derive from MDebuggerLinkable. This class provides, as data members fNext and fPrevious, pointers to the next and previous elements in the linked list.

The C++ class interface for the MDebuggerLinkable class follows:

```
class MDebuggerLinkable : public MDebuggerCollectible {
public:
                                MDebuggerLinkable();
    MDebuggerLinkable*          Next() const;
    void                        SetNext (MDebuggerLinkable*
                                    next);
    MDebuggerLinkable*          Previous() const;
    void                        SetPrevious (MDebuggerLinkable*
                                    previous);
private:
    MDebuggerLinkable*          tNext;
    MDebuggerLinkable*          tPrevious;
};
```

Figure 6:
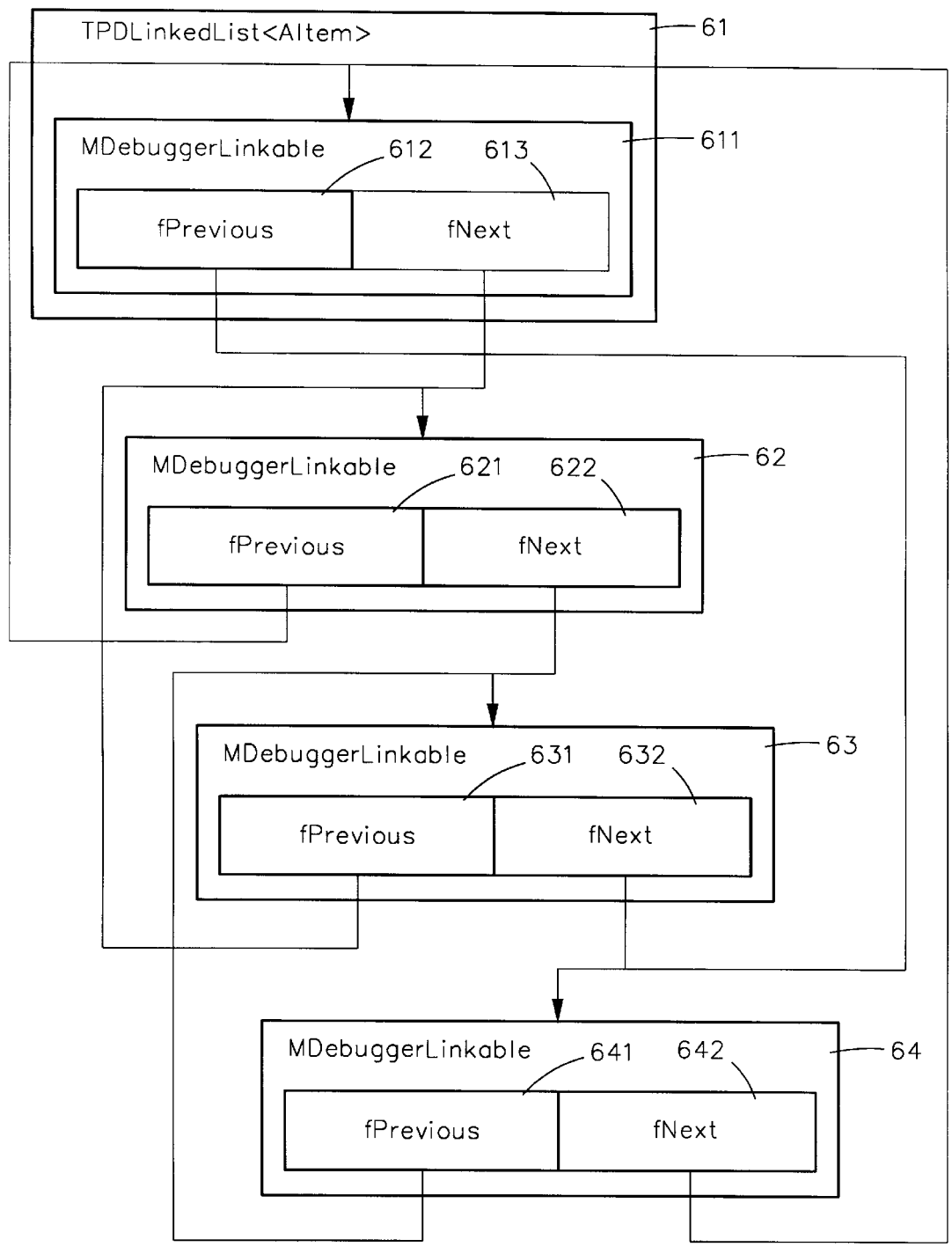
FIG. 6 is a linked list of linkable objects in accordance with a preferred embodiment of the invention.

In FIG. 6 the data structures for an example linked list are shown. Linkable objects 611, 62, 63, and 64 contain fPrevious data members 612, 621, 631, and 641, respectively. They also contain fNext data members 613, 622, 632, and 642, respectively. Each pointer for fprevious points to the previous linked object in the list, and vice versa for fNext.

To traverse from one MDebuggerLinkable object to the next, the Next function is called, returning a pointer to the next object. Conversely, to get to the previous object, the Previous function is called.

When an MDebuggerLinkable object is being added within a linked list, the SetNext function is called to add a new object after the object whose function is being called. And of course, in reverse, the SetPrevious function is called when an object is inserted in the list before the current object whose function is being called.

TPDLinkedList

The templatized TPDLinkedList class is itself implemented as a single MDebuggerLinkable data member as well as a comparison function from which to use for comparison. Its C++ class interface is defined as follows:

```
template<class AItem>
class TPDLinkedList {
public:
                                           TPDLinkedList();
                                           TPDLinkedList (const
                                               TPDLinkedList<AItem>&);
                                           TPDLinkedList(
    MDebuggerCollectibleCompareFn);
    virtual                                ~TPDLinkedList();
    TPDLinkedList<AItem>&                  operator=(const
                                               TPDLinkedList<AItem>&);
    bool                                   operator==(const
                                               TPDLinkedList<AItem>&);
    virtual void                           DeleteAll();
    virtual void                           RemoveAll();
    virtual void                           AddLast(AItem*);
    AItem*                                 First() const;
    AItem*                                 Last() const;
    virtual AItem*                         Find(const AItem&) const;
    virtual AItem*                         Remove(const AItem& key);
    virtual AItem*                         Remove(AItem*);
    TPDLinkedListIterator<class AItem>*    CreateIterator();
private;
    MDebuggerCollectibleCompareFn          fTestFn;
    MDebuggerLinkable                      fSentinel;
    friend class TPDLinkedListIterator<AItem>;
};
```

The linked list provides functions for removing all elements out of the list, e.g. RemoveAll, as well as for deleting all elements out of the list, e.g. DeleteAll.

To add a new linkable item to the end of the list, the AddLast function is called with the object to be added.

The first item in the list is returned by the First function; the last item by the Last function.

To search for a specific object in the linked list, using an identifier object, the Find function is called. Items whose identifiers are specified by the key passed into the Remove function can be removed from the list; if the object is found in the list, it is returned otherwise a NIL pointer is returned.

The polymorphic CreateIterator creates an TPDLinkedListIterator<class AItem> object which can be used by the caller to iterate over all items in the linked list.
TPDLinkedListIterator As with other iterator classes as defined above, the TPDLinkedListIterator templatized class also follows the same semantics of the TPDCollectionIterator class.

```
template<class AItem>
class TPDLinkedListIterator {
public:
                              TPDLinkedListIterator
                                  TPDLinkedList<AItem>*);
    virtual                   ~TPDLinkedListIterator();
    AItem*                    First();
    AItem*                    Next();
private:
                              TPDLinkedListIterator();
    TPDLinkedList<AItem>*     fLinkedList;
    AItem*                    fCurrent;
    MDebuggerLinkable*        fSentinel;
};
```

A pointer to a linked list is used to construct an iterator object; it is stored in the fLinkedList data member.

When the First function is called, the first item in the linked list is returned. A pointer to the object being returned is stored in the data member fCurrent. To maintain currency checks, the fSentinel points to the same internal MDebuggerLinkable object stored in the TPDLinkedList object being iterated over. When the pointer to the fCurrent matches pointer in the fSentinel object, the Next function returns NIL.

Addressing

An addressing abstraction is presented which allows the use of target memory addresses in a portable fashion. The use of static compiler types such as void* in the C and C++ languages do not properly express this as a portable abstraction since they are limited to the static size as implemented by the compiler used to compile the debugger code.

Two major classes are used to describe the abstraction itself; other subclasses are created to describe processor-specific addressing data. The first class, a monomorphic class called TDebuggerAddress, represents a single target address. It does not restrict the size of addressing to an arbitrary size such as 32 bits, nor does it restrict the mode of addressing to a particular memory model such as a flat 32-bit address space. It is defined to be a statically fixed-sized object, encapsulating a polymorphic implementation whose size varies. This allows static allocation of the TDebuggerAddress object in fixed-size data structures or stack-based allocation.

Bits16 and Bits32

Two types are defined to provide an exact size of 16 and 32 bits. These data types depend on the compiler being used since languages such as C and C++ do not specify exact sizes of scalar types. By defining these types, the following address class are ensured of a guarantee that the data is ordered correctly.

TDebuggerAddress

Following is the C++ class interface to an embodiment of the TDebuggerAddress abstraction.

```
class TDebuggerAddress : public MDebuggerCollectible {
public:
                                    TDebuggerAddress();
                                    TDebuggerAddress (const
    TDebuggerAddress&);
                                    TDebuggerAddress (const
    TUniversalAddress& address);
        virtual                         // not adopted
        virtual                     ~TDebuggerAddress();
        virtual TDebuggerStream&    operator>>=(TDebuggerStream&) const;
        virtual TDebuggerStream&    operator<<=(TDebuggerStream&);
        virtual long                Hash() const;
        virtual bool                IsEqual(const MDebuggerCollectible*)
    const;
        virtual int                 GetWidthInBytes()
        inline int                  GetWidthInBits() const;
        virtual int                 GetDataWidthInBytes() const;
        inline int                  GetDataWidthInBits() const;
        virtual ByteOrder           GetByteOrder() const;
        virtual Segmentation        GetSegmentation()
        virtual void*               GetStorage() const;
        inline bool                 IsntNil() const;
        virtual bool                IsNil() const;
        virtual                     operator Bits16() const;
        virtual                     operator Bits32()
        TDebuggerAddress&           operator=(const TDebuggerAddress&
    source);
        virtual TDebuggerAddress&   operator+=(const TDebuggerAddress&
    operand);
        virtual TDebuggerAddress&   operator-=(const TDebuggerAddress&
    operand);
        virtual TDebuggerAddress    operator+(const TDebuggerAddress&
    source);
        virtual TDebuggerAddress    operator-(const TDebuggerAddress&
    source);
        TUniversalAddress*          GetUniversalAddress() const;
    protected:
        virtual TUniversalAddress*  InstantiateByType (long
    universalAddressType);
public:
        static const TDebuggerAddress&  fgInvalidAddress;
protected:
        TUniversalAddress*          fAddress;
};
```

Figure 18:
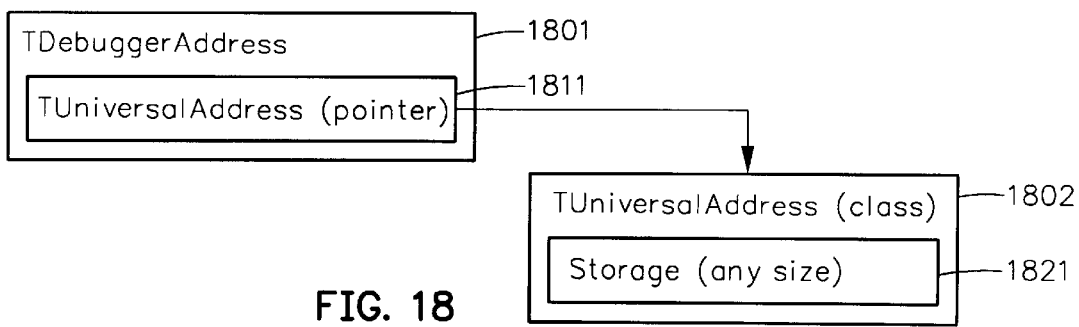
FIG. 18 is a linked list diagram of debug address and its associated universal address in accordance with a preferred embodiment.

FIG. 18 shows the object relationship between the TDebuggerAddress object and the TUniversalAddress it contains. The monomorphic TDebuggerAddress contains a pointer 1811 to a polymorphic TUniversalAddress 1802 which can define storage 1821 of any size. This affords unlimited flexibility in the ability to represent any address.

The object can be constructed with no parameters (default constructor), with a copy constructor, in which case it completely deep-copies the copy constructor parameter, or using a TUniversalAddress to create the object from a platform-specific debugger class.

The operator>>= streaming function allows the object to stream itself out into the provided stream parameter. Likewise, the operator<<= streaming function allows the object to stream itself in from the provided stream parameter. These operations provide polymorphic streaming such that in the operator>>= function the polymorphic TUniversalAddress object will write its own type out into the stream using, allowing the corresponding object read in during the operator<<= function to recreate the same type.

Figure 7:
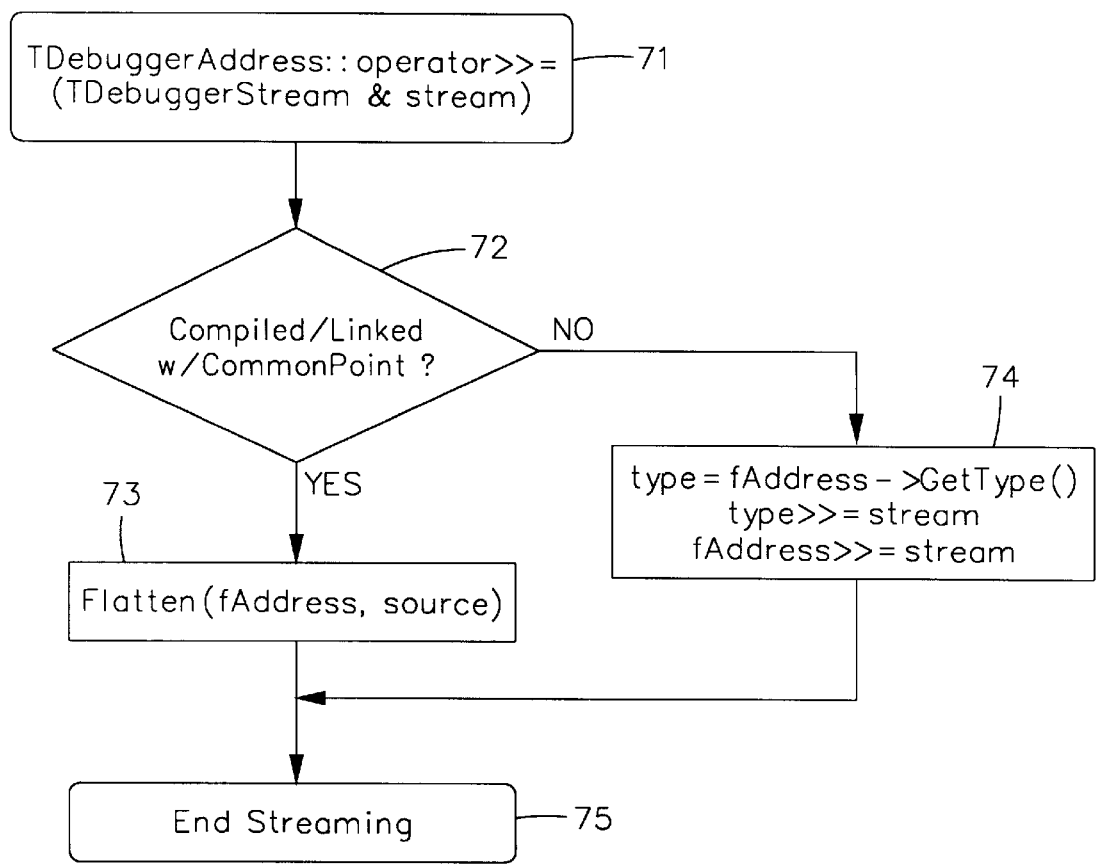
FIG. 7 presents the control flow for two different cases of streaming in accordance with a preferred embodiment.

The mechanism to do this can be implemented in two ways. FIG. 7 describes the control flow for the two different cases of streaming. Streaming starts with a function call to the operator>>= 71. When using the Taligent CommonPoint system, the operator>>= function will call Flatten 73, which will write an encoded class name and library name into the stream. This case is shown in FIG. 7, number 72 "compiled/linked with CommonPoint is true." On the reading (operator<<=) side, the encoded class name and library name will be read out before the TUniversalAddress. An object is dynamically constructed using the library name and class name using the default constructor and the data is filled in.

The second method to achieve this in a manner that does not use the Taligent CommonPoint system is to encode a scalar value that corresponds to the type that is assigned to the particular TUniversalAddress class. This case is shown in FIG. 7, number 72 "compiled/linked with CommonPoint is false." Each TuniversalAddress subclass will have its GetType function which is called in 74 return a different scalar value based on its type. Each value is unique.

Figure 8:
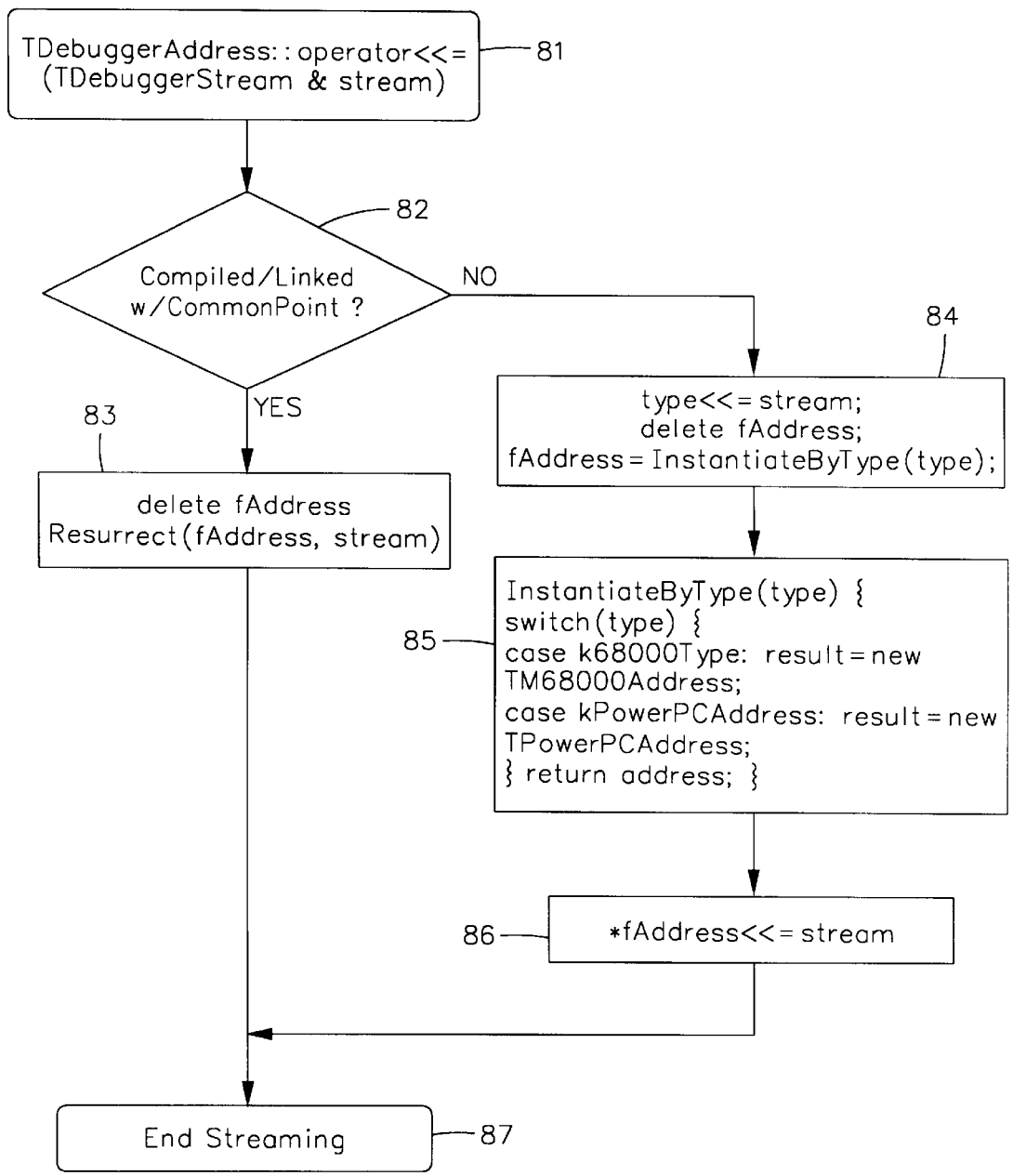
FIG. 8 shows the receiver side of connection processing in accordance with a preferred embodiment.

On the receiver side of the connection, the object is read out of the stream in FIG. 8. The two different cases, compiling with the CommonPoint system 83 which causes objects to be resurrected with their dynamic type; and without the CommonPoint system 84, 85, and 86 which show how to simulate this feature without using the Resurrect funcion.

The streaming class, TDebuggerStream, ensures scalar values are maintained correctly on different platforms. Even though a pointer class on one platform may exist in big-endian ordering, it will be correctly interpreted as a portable scalar value on all platforms.

The Hash member function allows the object to describe itself in terms of a scalar hash value. This is used when storing the addresses in collection classes which use the hashing function. The hash function uses a 32-bit scalar value which is returned by the fDebuggerAddress data member.

The IsEqual function allows comparison of objects. The test will return true if equal and false if not.

To determine the actual size of the underlying addressing width, the GetWidthInBytes returns a scalar value equivalent to the number of bytes (an 8-bit datum) used to form the address. Likewise, the number of bits are also returned by the GetWidthInBits function.

Addresses point to blocks of data. Each block of data, or the addressable unit, is determined by a processor architecture. The GetDataWidthInBytes function will return the total number bytes that are addressed by a single address. For instance, an address space that uses 32-bit addresses where each address can indicate a single byte in that address space will have a data width of one byte. Although a processor may be limited to reading and writing on boundaries on which the addressing may occur, e.g. "four-byte boundaries," the data width will still be one byte even though there is a processor limitation. However, if the individual size of a datum referred to by an address is a larger value, such as 32-bit words, the data width would be 32-bits; in this case pointers refer to 32-bits words, and not individual bytes.

The ordering of addresses vary across processors. Some processors place their addresses in "big endian" order, such as the Motorola M68000 family of microprocessors which specifies that a target address found in a target address space would be in the order most-significant bit through least-significant bit. In "little endian" order, as found in the Intel x86 family of microprocessors, the least significant byte is followed by the next-most significant byte, etc., followed by the most significant byte. Some processors support a mixed mode, such as the Motorola/IBM PowerPC MPC601 processor, which allows mixed addressing depending on a processor register. In this case, the debugger address class can support mixed modes of addressing dynamically, using a single debugger for both purposes. The ByteOrder enumeration defines two different ordering, kBigEndian, and kLittleEndian.

The GetSegmentation function returns the type of segmentation being used in the target address space; either the memory is kLinear (flat, uniform addressing), or kSegmented. Other enumerations can be added.

To test the pointer to determine it is NIL (address refers to a well-known NIL pointer), the IsNil and IsntNil functions can be called; boolean values of true or false are returned.

Conversion operators are provided for convenience. In many cases it is necessary to convert an abstract class into simple scalar values. For instance, the value for the length of functions may be defined by a compiler and runtime system to be limited to 32 bits. In this case, a subclass may use this additional information to turn the length of a function into a value that is a primitive scalar type. The conversion operators operator Bits16 and operator Bits32 can be called, and the result returned are values of the according 16- and 32-bit data types.

Assignment results in the return value when using the operator= function. Because the class is designed to be used as a monomorphic class, direct assignment from object to object affords a direct copy using a fixed object size. The underlying implementation is a polymorphic class, which will copied polymorphically.

Addition and subtraction of addresses are frequent operations in a debugger. The operator+= and operator−= functions allow lvalue addition and subtraction, respectively. The parameter is added to the object whose member function is called. Operations can only occur in a manner whereby the underlying TuniversalAddress object can take an addition to its value without changing the original semantics. By checking using types, the operand as specified by the parameters to operator+= and operator−= are tested so that they will not cause overflow. For instance, if a TDebuggerAddress containing a 64-bit address is passed as an argument to TDebuggerAddress: :operator+= on an object which contains a 32-bit address, the operation will be invalid because of the potential for overflow. An example of this is found in the implementation for T32BitAddress: :operator+=:

```
TUniversalAddress&
T32BitAddress::operator+=(const TUniversalAddress& operand)
{
   if (operand.IsA(this)) {
      const T32BitAddress& operand32 = (const T32BitAddress&)
operand;
      fStorage += operand32.tStorage;
   }else {
      fail;
   }
}
```

Creating expressions composed of TDebuggerAddress objects and addition or subtraction operations is possible by calling the operator+ and operator− functions. An example of C++ code which might be used to determine the address of an instruction within which is calculated by adding an address and an offset is:

```
TDebuggerAddress functionStart = GetFunctionStart();
TDebuggerAddress functionOffset = GetFunctionOffset();
TDebuggerAddress instructionAddress = functionStart +
functionOffset;
```

The code to perform the above addition of the address and offset is abstract, expressive, and portable. It is abstract in that the TDebuggerAddress objects express the individual data elements being used; they represent individual addresses and also define a protocol for addition; the syntax allows a programmer to form an expression in the language which is identical to the syntax used with expressions of primitive types. It is expressive because of ability to concisely combine expressions formed by the addition of two operands and a single assignment within a program statement. Finally, it is portable in that the single line of code is not only compilable on different target platforms to execute with different processor address classes, but it can be compiled on platforms other than the target host platform for cross-development. In addition, because of the polymorphic nature of the underlying TUniversalAddress object, the single line of code is used for not just a single target execution environment, but for all target execution environments. This allows a single instance of a debugger program, i.e. a single process with a single set of code, to target multiple environments simultaneously.

The last public function, GetUniversalAddress is provided to return a pointer to the underlying TUniversalAddress object for future extension.

When developing without the CommonPoint system, the InstantiateByType function allows a standalone debugger to dynamically instantiate objects based on a streamed scalar value.

TUniversalAddress

Following is the C++ class interface to an embodiment of the TUniversalAddress abstract base class.

The concept of a universal address is that it can represent any possible processor address. The address itself can be unbounded in size, and of any byte ordering, and can refer to data of arbitrary size.

Although there are no size restrictions, the compiler used on all platforms must at least specify a type that is capable of storing 32 bits in a scalar datum. If this is not the case, operations which require the Bits32 address type will be truncated to the largest type.

The TUniversalAddress class exhibits polymorphism. As one well-versed in the art understands, a function call is made and then bound at runtime such that the called member function is determined by rules of the language such that the most derived definition of the member function in a class hierarchy will be called. The dynamic nature of the call allows a base framework to utilize code that was created by a different source than the original framework designer. It is in this capacity that allows the debugger framework—in this case, the debugger address abstraction—to be extended to function on target processor architectures beyond what was originally defined when the framework was first created.

addressed by the pointers in bytes (GetDataWidthInBytes), and the same in bits (GetDataWidthInBits). Further, the protocol is also identical for the hashing function (Hash), the equality testing function (IsEqual), streaming operators (operator>>= and operator<<=), lvalue addition and subtraction (operator+= and operator−=), and 16- and 32-bit conversion operators (operator Bits16 and operator Bits32).

The GetType function allows individual classes to return a value for its type, which is a scalar value. Each class is assigned a constant value for this. Two objects' types can be compared by comparing the results returned from the objects' GetType function. Although the Taligent CommonPoint type system provides this functionality, the explicit interface in this class allows the debugger to execute independent of the CommonPoint execution environment.

A function which provides a way of determining an objects' relative location in TUniversalAddress class hierarchy, is the IsA function. Each class defines its own IsA implementation which determines if the object is the same as another object, or a direct descendent of the object.

For example, the following lines of code show to determine whether one object is in a class that derives from another class, a T32BitAddress 92 is a base class for 32-bit address values. A subclass of this, TM68000Address 95,

```
class TUniversalAddress : public MDebuggerCollectible {
public:
        virtual int             GetWidthInBytes() const = 0;
        inline int              GetWidthInBits() const;
        virtual int             GetDataWidthInBytes() const = 0;
        inline int              GetDataWidthInBits() const;
        virtual ByteOrder       GetByteOrder() const = 0;
        virtual Segmentation    GetSegmentation() const = 0;
        virtual void*           GetStorage() const = 0;
        inline bool             IsntNil() const;
        virtual bool            IsNil() const = 0;
        virtual long            Hash() const = 0;
        virtual bool            IsEgual(const MDebuggerCollectible*) const = 0;
        virtual TDebuggerStream&  operator>>=(TDebuggerStream&) const = 0;
        virtual TDebuggerStream&  operator<<=(TDebuggerStream&) = 0;
        virtual                 operator Bits16() const = 0;
        virtual                 operator Bits32() const = 0;
        virtual TUniversalAddress&  operator+=(const TUniversalAddress& operand) = 0;
        virtual TUniversalAddress&  operator-=(const TUniversalAddress& operand) = 0;
        virtual bool            IsA(const TUniversalAddress*) const = 0;
        virtual int             GetType() const = 0;
};
```

The abstract base class TUniversalAddress defines the abstraction of an address. It does not contain any data, nor does it define implementation for many of the function. However, the interface defines a protocol in which a framework or client code can use the functions with polymorphic behavior; when a polymorphic function call (as labeled with the C++ keyword, virtual, before the type and member function name in the class declaration) is made, the runtime system will correctly bind the caller with the called function in an implementation subclass.

The class hierarchy, FIG. 9 shows the inheritance graph for sample classes.

As defined earlier in TDebuggerAddress, the interfaces defines the member function protocol for determining the size of address pointers in bytes (GetWidthInBytes), the size of address pointers in bits (GetWidthInBits), the size of data implements the functions which describe addresses on the Motorola M68000 family of microprocessors. The following lines show this example in the implementation of the TM68000Address::IsA function.

```
bool
TM68000Address::IsA(const TUniversalAddress* addr) const
{
        return (addr->GetType() == this->GetType()) ||
            T32BitAddress::IsA(addr);
}
```

TInvalidUniversalAddress

While TUniversalAddress subclasses generally represent real addresses on real microprocessors, they can represent values which don't exist at all. The TInvalidUniversalAddress 93 is one such class. This class allows a TDebuggerAddress to be defined as "invalid" meaning that it doesn't point to any memory. This is different from pointers using primitive types such as the C++ type, void*, which can only represent the address space as defined by the type; therefore it is not possible to represent all values in the data type and an invalid value as well. With TInvalidUniversalAddress, this class will not compare to any other address types.

T32BitAddress

A base class for 32-bit addresses 92 is provided. It contains the base functionality defining 32-bit address types. It defines a 32-bit address range with one-byte data sizes. By default, it defines a big-endian addressing mode (which is overridden in various subclasses).

```
class T32BitAddress : public TUniversalAddress {
public:
                                T32BitAddress();
                                T32BitAddress(const T32BitAddress& src);
                                T32BitAddress(Bits32 addr);
        const T32BitAddress&    operator=(Bits32);
        TUniversalAddress&      operator=(const TUniversalAddress& source);
        virtual TUniversalAddress&  operator+=(const TUniversalAddress& operand);
        virtual TUniversalAddress&  operator-=(const TUniversalAddress& operand);
        virtual TDebuggerStream&  operator>>=(TDebuggerStream&) const;
        virtual TDebuggerStream&  operator<<=(TDebuggerStream&);
        virtual long            Hash() const;
        virtual bool            IsEqual(const MDebuggerCollectible*) const;
        virtual bool            IsA(const TUniversalAddress*) const;
        virtual int             GetType() const;
        virtual int             GetWidthInBytes() const;
        virtual int             GetDataWidthInBytes() const;
        virtual ByteOrder       GetByteOrder() const = 0;
        virtual Segmentation    GetSegmentation() const = 0;
        virtual void*           GetStorage() const;
        virtual bool            IsNil() const;
        virtual                 operator Bits16() const;
        virtual                 operator Bits32() const;
public:
        static const int&       kType;
private:
        static const int        gType;
private:
        Bits32                  fStorage;
};
```

Because this class requires actual storage for a 32-bit value, it contains the fStorage data member which is defined as a 32-bit data type (Bits32).

TM68000Address

```
class TM68000Address : public T32BitAddress {
public:
                                TM68000Address();
                                TM68000Address(const T32BitAddress& src);
                                TM68000Address(Bits32 addr);
        virtual ByteOrder       GetByteOrder() const;
        virtual Segmentation    GetSegmentation() const;
        virtual bool            IsA(const TUniversalAddress*) const;
        virtual int             GetType() const;
public:
        static const int&       kType;
```

-continued

```
private:
        static const int        gType;
};
```

The TM68000Address 95 defines a subclass of T32BitAddress. It overrides the GetType function to return a unique scalar type, the GetByteOrder function to ensure that the kBigEndian ordering is returned, the GetSegmentation function to return kLinearSegmentation, and the IsA function to test the parameter's type for inheritance.

The static data members, kType, is used to define a reference to the constant value. An additional static data member contains the actual value for the datum. This indirect mechanism allows compilation of the class into a shared library and is implementation-specific.

TiAPX86Address

Another example of a 32-bit address is the TiAPX86Address 96 which is used to represent 32-bit addresses on the Intel 80x86 family of microprocessors.

TPowerPCAddress

Another example of a 32-bit address is the TPowerPCAddress 97 which is used to represent 32-bit addresses on the PowerPC family of microprocessors.

T64BitAddress

The address classes are not limited to 32-bit address sizes. The following class interfaces define a 64-bit class which can be used to represent addresses on 64-bit processors.

The first class, T64Bits,is just a storage type. Because some compilers may not be able to properly express a 32-bit scalar as a primitive type, this class defines storage and protocol for handling 64-bit values in a portable manner.

```
class T64Bits {
public:
                        T64Bits();
                        T64Bits(Bits32 ms, Bits32 ls);
    const T64Bits&      operator=(const T64Bits&);
    TDebuggerStream&    operator>>=(TDebuggerStream&) const;
    TDebuggerStream&    operator<<=(TDebuggerStream&);
    inline Bits32       GetMostSignificant() const;
    inline void         SetMostSignificant(Bits32 msw);
    inline Bits32       GetLeastSignificant() const;
    inline void         SetLeastSignificant(Bits32 lsw);
public
    Bits32              fStorageWords[2];
};
```

The two constructors can initialize an instance of the T64Bits class either by default or with two 32-bit values.

The operator= function allows assignment from one T64Bits object into another.

FIG. 10 shows the structure for a 64-bit address object. To access the 64-bit object as 32-bit low- and high-order parts, (also called least significant 1011 and most significant 1012), the members functions GetMostSignificant and GetLeastSignificant will return the respective portions of the 64-bit scalar. Likewise, the 64-bit value can be stored as two 32-bit halves using the SetMostSignificant and SetLeastSignificant member functions.

The T64BitAddress 94 subclass of TUniversalAddress provides an abstract base class for 64-bit addresses. Its C++ class declaration follows:

Note that the storage data member, fStorage, contains the datum representing the address bits.

TMIX64Address

The class TMIX64Address 98 shows an example implementation using the T64BitAddress class.

Lengths and Pointer Differences

Sizes of objects and differences between pointers are represented as TDebuggerAddress objects as well. Since the address object represents a scalar value, it can be used for these two purposes as well. To explicitly declare that the scalar is used for length, the following type is defined:

```
typedef    TDebuggerAddress    TDebuggerLength;
```

Names and Strings

Text strings are used in PDS to represent names of functions, libraries, processes, threads, and exceptions. The TPrimitiveString class provides functionality independent of other classes. It is able to encode a 16-bit Unicode strings of arbitrary length. The string can be converted to and from primitive 8-bit character strings.

The type called PSLength defines a length type:

```
typedef    unsigned    long    PSLength;
```

```
class T64BitAddress : public TUniversalAddress {
public:
                                T64BitAddress();
                                T64BitAddress(const T64BitAddress& src);
                                T64BitAddress(const T64Bits& addr);
    TUniversalAddress&          operator=(const TUniversalAddress& source);
    virtual TUniversalAddress&  operator+=(const TUniversalAddress& operand);
    virtual TUniversalAddress&  operator-=(const TUniversalAddress& operand);
    virtual TDebuggerStream&    operator>>=(TDebuggerStream&) const;
    virtual TDebuggerStream&    operator<<=(TDebuggerStream&);
    virtual long                Hash() const;
    virtual bool                IsEqual(const MDebuggerCollectible*) const;
    virtual bool                IsA(const TUniversalAddress*) const;
    virtual int                 GetType() const;
    virtual int                 GetWidthInBytes() const;
    virtual int                 GetDataWidthInBytes() const;
    virtual ByteOrder           GetByteOrder() const = 0;
    virtual Segmentation        GetSegmentation() Const = 0;
    virtual void*               GetStorage() const;
    virtual bool                IsNil() const;
    virtual                     operator Bits16() const;
    virtual                     operator Bits32() const;
public:
    static const int&           kType;
private:
    static const int            gType;
private:
    T64Bits                     fStorage;
};
``` and a 16-bit Unicode character type:

```
typedef    unsigned    short  10 UniChar;
```

TPrimitiveString
   The C++ class declaration follows:

```
class TPrimitiveString : MDebuggerCollectible {
public:
                              TPrimitiveString();
                              TPrimitiveString(const char* text);
                              TPrimitiveString(const Unichar* text,
                                   PSLength length);
                              TPrimitiveString (const
TPrimitiveString&);
      virtual                 ~TPrimitiveString();
      virtual TPrimitiveString&     operator=(const TPrimitiveString&);
      virtual TDebuggerStream&  operator>>=(TDebuggerStream& dstStream)
const;
      virtual TDebuggerStream&  operator<<=(TDebuggerStream&
srcStream);
      PSLength                Length() const;
      virtual PSLength        Extract(PSLength start, PSLength
length,
                                   char result[]) const;
      virtual PSLength        Extract(char result[]) const;
protected:
      virtual UniChar*        CreateUniCharBuffer(PSLength
resultLength) const;
      virtual UniChar*        CreateUniCharString(const char* text,
                                   PSLength& resultLength)
const;
      virtual UniChar*        CreateUniCharString(const UniChar*
text,
                                   const PSLength length,
                                   PsLength& resultLength)
const;
      virtual void            DeleteUniCharString(UniChar*) const;
private:
      UniChar*                fString;
      PSLength                fLength;
};
```

The TPrimitiveString class derives from MDebuggerCollectible. The default constructor creates an empty object. The constructor taking a const char* parameter will convert the argument, a zero-terminated C string, into the 16-bit storage. Each individual 8-bit character is extended into a 16-bit character. The third constructor will take a pointer to a UniChar* string array and a length; these will copied into the object's own storage. Finally, the fourth/last constructor will copy the contents of the argument, which is another TPrimitiveString.

The operator= function follows the convention of the C++ language. It will deep-copy the contents of the data stored within the object argument.

To provide monomorphic streaming, the length and 16-bit UniChar data are streamed out in the operator>>= function. The stream data are written into the TDebuggerStream argument provided. An example of this code is shown below.

```
TDebuggerStream&
TPrimitiveString: :operator>>=(TDebuggerStream& dstStream) const
{
    fLength >>= dstStream;
    dstStream.Write((void*) fString, (size_t) fLength * 2);
    return dstStream;
}
```

In the operator<<= function, the length is read, and the rest of the data is streamed into a buffer pointed to by the data member fString. An example of this is shown below.

```
TDebuggerStream&
TPrimitiveString: :operator<<=(TDebuggerStream& srcStream)
{
    fLength <<= srcStream;
    DeleteUniCharString(fString);
    fString = CreateUniCharBuffer(fLength);
    srcStream.Read((void*) fString, (size_t) fLength * 2);
    return srcStream;
}
```

The TPrimitiveString class provides functions to determine length (Length), and extract the contents of the string as primitive 8-bit char* types, or as 16-bit Unichar* types.

Internal allocation of data occurs using the CreateUniCharBuffer functions. Internal deallocation of data is provided via the DeleteUniCharString function. These two functions encapsulate the class' data storage needs.

Type definitions are provided for library names, function names, process names, and thread names. These are named TLibraryName, TFunctionName, TProcessName, and

```
typedef TPrimitiveString    TLibraryName;
typedef TPrimitiveString    TFunctionName;
typedef TPrimitiveString    TProcessName;
typedef TPrimitiveString    TThreadName;
```

Processes and Threads
TargetProcess

Process identification varies on different operating systems. Generally they are identified as scalar types such as 16-bit values, but they may also be represented by memory locations or by objects. The token of communication for representing processes on all operating systems is the TargetProcess identifier type:

```
typedef unsigned long    TargetProcess;    // ID type
```

This type will encode a process identifier that is unique to the debugger server that a client is registered with. The identifier is guaranteed uniqueness such that two processes on the same server will not use the same identifier. Use of a single TargetProcess type throughout the client-side debugger ensures portability and reuse of the PDS software. The defining type must meet the requirements of having sufficient T-stability for the defined needs of the debugger application. A compiler that defines a 32-bit value will ensure an extremely high T-stability if the C and C++ long type is used.

Uniqueness is not guaranteed across multiple servers. For instance, a debugger server may start allocating TargetProcess values starting at zero, incrementing them as programs are attached or started. Another debugger server on a different host may use the same allocation strategy. The TargetProcess values cannot be compared directly, therefore, to detect equality of target processes. Instead, an additional name qualification of the TargetHost would need to be compared first. An example of the TargetHost class is:

```
typedef unsigned long    TargetHost;
```

TTargetProcess

The TargetProcess type only defines an identifier for processes. The closely related TTargetProcess class defines a protocol which can be used by both debugger client and debugger server to further describe additional information about a target process.

The C++ class interface for TTargetProcess follows:

```
class TTargetProcess : public MDebuggerCollectible {
public:
                            TTargetProcess();
                            TTargetProcess(TargetProcess
                                processID);
                            TTargetProcess(const
TTargetProcess&
                                targetProcess);
    virtual                 ~TTargetProcess ();
    virtual TDebuggerStream& operator>>=(TDebuggerStream&
                                dstStream) const;
    virtual TDebuggerStream& operator<<=(TDebuggerStream&
                                srcStream);
    virtual long            Hash() const;
    virtual bool            IsEqual(const
MDebuggerCollectible*) const;
    //
    // Process Information
    //
    TargetProcess           GetProcessID() const;
    void                    SetProcessID(TargetProcess);
    virtual void            GetName(TProcessName&) const;
    virtual void            SetName(const TProcessName&);
    virtual void            GetThreadList (TTargetThreadList&
                                resultList);
    virtual void            GetAddressSpace(
                                TTargetAddressSpace&);
private:
    TargetProcess           fProcessID;
    TProcessName            fName;
};
```

The TTargetProcess class can be constructed using the default constructed, or from a TargetProcess. It can be copied using the copy constructor.

The operator>>= streaming function allows the object to stream itself out into the provided stream parameter. Likewise, the operator<<= streaming function allows the object to stream itself in from the provided stream parameter.

The Hash member function allows the object to describe itself in terms of a scalar hash value. This is used when storing the addresses in collection classes which use the hashing function. The hash function returns the TargetProcess scalar value.

The IsEqual function allows comparison of objects. The test will return true if equal and false if not.

To get or set the process identifier, the GetProcessID and SetProcessID functions are provided.

The name of the process being executed may be stored and retrieved from within the TTargetProcess. This storage provides a simple mechanism by which to transfer the name between the server and client. Its use is explained in detail in the methods for accessing program name.

The base class only provides a simple identification protocol, but it can be further extended within the debugger server through subclassing by using inheritance.
TTargetProcessList and TTargetProcessListIterator Collections of process objects may be stored within a list. These lists are used in enumerating a list of processes. The primitive TPDSet class is parameterized with the TTargetProcess class; likewise, the TPDSetIterator class is parameterized to return TTargetprocess objects when iterating through the list. Type definitions are declared for use of these classes:

```
typedef TPDSet<TTargetProcess>         TTargetProcessList;
typedef TPDSetIterator<TTargetProcess> TTargetProcessListIterator;
```

TargetThread

```
typedef unsigned long    TargetThread;    // ID type
```

This type will encode a thread identifier that is unique to the debugger server that a client is registered with. The identifier is guaranteed uniqueness such that two threads on the same server will not use the same identifier. Use of a single TargetThread type throughout the client-side debugger ensures portability and reuse of the PDS software. The defining type must meet the requirements of having sufficient T-stability for the defined needs of the debugger application. A compiler that defines a 32-bit value will ensure an extremely high T-stability if the C and C++ long type is used.

Uniqueness is not guaranteed across multiple servers. For instance, a debugger server may start allocating TargetThread values starting at zero, incrementing them as threads are attached, started, or discovered. Another debugger server on a different host may use the same allocation strategy. The TargetThread values cannot be compared directly, therefore, to detect equality of target threads. Instead, an additional qualification of the TargetHost and TargetProcess would need to be compared first.

Two constants are defined to describe undefined threads and to name all threads within a process:

| | |
|---|---|
| const TargetThread | kUndefinedThread = 0; |
| const TargetThread | kAllThreads = −2; |

TTargetThread

The TargetThread type only defines an identifier for thread. The closely related TTargetThread class defines a protocol which can be used by both debugger client and debugger server to further describe additional information about a target thread.

The C++ class interface for TTargetThread follows:

The TTargetThread class can be constructed using the default constructed; from a TargetProcess process identifier and TargetThread thread identifier; and also from a TargetProcess process identifier, TargetThread thread identifier and a name. It can be copied using the copy constructor.

The operator>>= streaming function allows the object to stream itself out into the provided stream parameter. Likewise, the operator<<= streaming function allows the object to stream itself in from the provided stream parameter.

The Hash member function allows the object to describe itself in terms of a scalar hash value. This is used when storing the addresses in collection classes which use the hashing function. The hash function returns the TargetThread scalar value.

The IsEqual function allows comparison of objects. The test will return true if equal and false if not.

To get or set the process identifier, the GetProcessID and SetProcessID functions are provided. Similarly, to get or set the thread identifier, the GetThreadID and SetThreadID functions are provided.

The name of the process being executed may be stored and retrieved from within the TTargetThread. This storage provides a simple mechanism by which to transfer the name between the server and client. Its use is explained in detail in the methods for accessing a thread name.

The base class only provides a simple identification protocol, but it can be further extended within the debugger server through subclassing by using inheritance.

TTargetThreadList and TTargetThreadListIterator

Collections of process objects may be stored within a list. These lists are used in enumerating a list of threads. The

```
class TTargetThread : public MDebuggerCollectible {
public:
                              TTargetThread();
                              TTargetThread(const TTargetProcess&,
                                     const TargetThread&
threadID);
                              TTargetThread(const TTargetProcess&,
                                     const TargetThread&
threadID,
                                     const TThreadName&
threadName);
                              TTargetThread(const TTargetThread&);
       virtual                ~TTargetThread();
       virtual void           PrintDebugInfo(bool verbose =
false)                               const;
       virtual TDebuggerStream&  operator>>=(TDebuggerStream&
dstStream)
                                     const;
       virtual TDebuggerStream&  operator<<=(TDebuggerStream&
stream);
       virtual long           Hash() const;
       virtual bool           IsEqual(const MDebuggerCollectible*)
                                     const;
       //
       // Thread information
       //
       TargetProcess          GetProcessID() const;
       void                   SetProcessID(TargetProcess);
       TargetThread           GetThreadID()const;
       void                   SetThreadID(TargetThread);
       virtual void           GetName(TThreadName& threadName);
private:
       TargetProcess          fProcessID;
       TargetThread           fThreadID;
       TThreadName            fName;
};
``` primitive TPDSet class is parameterized with the TTargetThread class; likewise, the TPDSetIterator class is parameterized to return TTargetThread objects when iterating through the list. Type definitions are declared for use of these classes:

```
typedef TPDSet<TTargetThread>         TTargetThreadList;
typedef TPDSetIterator<TTargetThread> TTargetThreadListIterator;
```

Breakpoints

Breakpoints are specified by process, thread, and address. They can have several conditions which describe what causes a program to stop, and they can describe what kind of behavior should occur to individual threads and threads in a process when the breakpoint is reached.

Breakpoints are identified uniquely through an identifier called TargetBreakpoint. The identifier can be used to indicate individual logical breakpoints.

Logical breakpoints may be composed of single or multiple breakpoints at one or more addresses. A logical breakpoint may be stored in more than one physical location.

Each address may have more than one logical breakpoint associated with it.

TargetBreakpoint

```
typedef long    TargetBreakpoint;    // breakpoint ID
```

The TargetBreakpoint type definition is used to identify logical breakpoints. Logical breakpoints are unique within a host. The breakpoint IDs are assigned by the debugger server.

TPrimitiveBreakpoint

A primitive breakpoint class allows the client to specify individual breakpoints. The C++ class declaration for this class follows:

```
class TPrimitiveBreakpoint : public MDebuggerCollectible {
public:
    enum BreakType {
        kSpuriousBreak,            // breakpoint wasn't in a table
        kTemporaryBreak,           // one-shot breakpoint
        kUnconditionalBreak,       // unconditional breakpoint
        kConditionalBreak,         // conditional breakpoint
        kProgramStartBreak         // start of program breakpoint
    };
    enum BreakStopType {           // ordering is important for union function
        kNonStoppingBreak,         // breakpoint was nonstopping kind
                                   // (reported only)
        kStoppingBreakSingleThread, // breakpoint caused thread to stop
                                   // (suspend on thread)
        kStoppingBreak             // breakpoint caused thread to stop
                                   // (suspend all threads)
    };
public:
                                   TPrimitiveBreakpoint();
                                   TPrimitiveBreakpoint(const
                                       TPrimitiveBreakpoint&);
                                   TPrimitiveBreakpoint
                                       const TargetProcess&
    process,                       const TargetThread& thread,
                                   const TDebuggerAddress&
    address,
                                   BreakType breakType =
                                       kUnconditionalBreak,
                                   BreakStopType breakStopType
    =
                                       kStoppingBreak);
    virtual                        ~TPrimitiveBreakpoint();
    virtual long                   Hash() const;
    virtual bool                   IsEqual(const
    MDebuggerCollectible*)
                                   const;
    virtual TDebuggerStream&       operator>>=(TDebuggerStream&)
    const;
    virtual TDebuggerStream&       operator<<=(TDebuggerStream&);
    TPrimitiveBreakpoint&          operator=(const
                                       TPrimitiveBreakpoint&);
    BreakType                      GetBreakType() const;
    void                           SetBreakType(BreakType);
    BreakStopType                  GetBreakStopType() const;
    void                           SetBreakStopType(BreakStopType);
    TDebuggerAddress               GetAddress() const;
    void                           SetAddress(const
    TDebuggerAddress&);
    TargetProcess                  GetProcessID() const;
    void                           SetProcessID(TargetProcess);
    TargetThread                   GetThreadID() const;
    void                           SetThreadID(TargetThread);
```

-continued

```
private:
    TargetProcess          fProcessID;
    TargetThread           fThreadID;
    TDebuggerAddress       fAddress;
    BreakType              fBreakType;
    BreakStopType          fBreakStopType;
};
```

Figure 16:
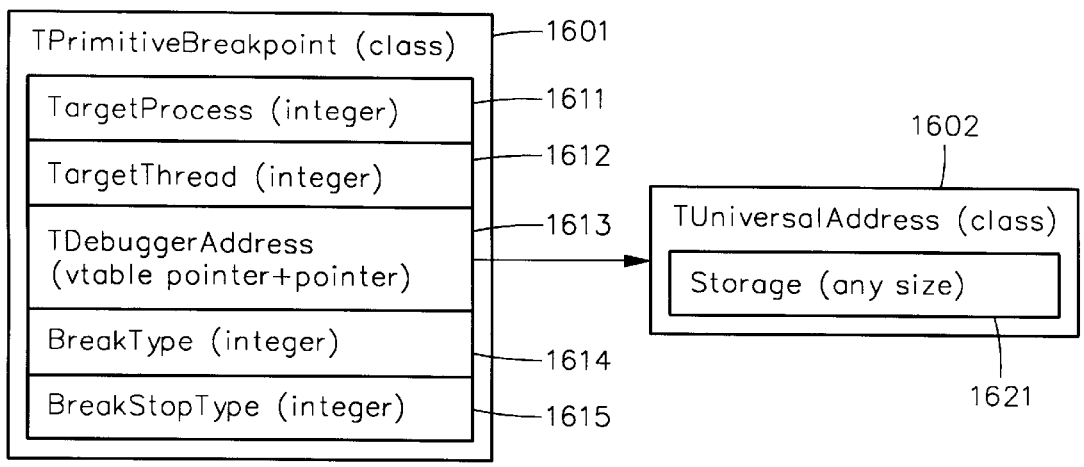
FIG. 16 illustrates the memory layout for a breakpoint class in accordance with a preferred embodiment.

FIG. 16 illustrates the memory layout for the object for the TPrimitiveBreakpoint class.

Breakpoint types are broken down into two different dimensions, the BreakType and the BreakStopType. The BreakType defines what kind of breakpoint to set, or what kind of breakpoint occurred. The different enumerated constants have the following meanings:

kSpuriousBreak is reported as part of a notification if a breakpoint was detected as a spurious breakpoint, indicating the debugger server did not expect for a breakpoint to be reached.

kTemporaryBreak can be specified when a breakpoint is to be removed when it is reached.

kUnconditionalBreak indicates a breakpoint which should always cause the thread or process to stop when the breakpoint is reached.

kConditionalBreak indicates a breakpoint which has a condition associated with it and should only stop when the condition has been met.

kProgramStartBreak is a special type of breakpoint which is reached as a program just starts to execute. The debugger server gains control and notifies debugger clients that the process has been started but in a suspended state until the user determines to continue.

The other dimension in which breakpoints can differ is specified by the BreakStopType type. When a breakpoint is reached by a thread, the thread does not stop when the kNonStoppingBreak type is specified. This is used for notifying the client asynchronously when a thread has reached a program location without requiring that the program stop execution.

Another type is the kStoppingBreakSingleThread which is a thread-specific breakpoint. When this kind of breakpoint is reached, only one thread is suspended while other threads continue executing. Operating system restrictions may prevent this from functioning on all systems.

Finally, another type of breakpoint is the kStoppingBreak which indicates that when one thread stops, all threads stop in the target process.

The breakpoint can be constructed in three ways: the default constructor, the copy constructor, and a constructor which has parameters specifying the process, thread, breakpoint address, the type of breakpoint, and the stopping behavior.

Standard protocol is used for the hashing function (Hash), the equality testing function (IsEqual), streaming operators (operator>>= and operator<<=), and assignment operator (operator=).

To set or determine the BreakType 1614 for the primitive breakpoint, call the GetBreakType and SetBreakType functions, respectively.

To set or determine the BreakStopType 1615 for the primitive breakpoint, call the GetBreakStopType and SetBreakStopType functions, respectively.

To set or determine the address 1613 associated with the primitive breakpoint, call the GetAddress and SetAddress functions, respectively. The address 1613 contains a pointer to a (polymorphic) TUniversalAddress object 1602 which contains the target processor-specific address data 1621.

To set or determine the process 1611 associated with the primitive breakpoint, call the GetProcessID and SetProcessID functions, respectively.

To set or determine the thread 1612 associated with the primitive breakpoint, call the GetThreadID and SetThreadID functions, respectively. When the thread specified in these functions or as a parameter to the constructor is the kAllThreads constant, a breakpoint will stop when any of the threads in a process reach the location indicated by the breakpoint address.

TTargetBreakpoint

In a manner similar to the TTargetProcess and TTargetThread class, the breakpoint identifier, TargetBreakpoint, is encapsulated within a class called TTargetBreakpoint. This class has one data member, the fBreakpointID scalar which identifies a logical breakpoint.

```
class TTargetBreakpoint : public MDebuggerCollectible {
public:
                           TTargetBreakpoint();
    TTargetBreakpoint(TargetBreakpoint);
                           TTargetBreakpoint(const
TTargetBreakpoint&);
    virtual                ~TTargetBreakpoint ();
    virtual long           Hash() const;
    virtual bool           IsEqual(const
MDebuggerCollectible*)
                           const;
    virtual TDebuggerStream&  operator>>=(TDebuggerStream&)
const;
    virtual TDebuggerStream&  operator<<=(TDebuggerStream&);
    TTargetBreakpoint&     operator=(const
TTargetBreakpoint&);
    TargetBreakpoint       GetTargetBreakpoint();
private:
    TargetBreakpoint       fBreakpointId;
};
```

All base class protocol is implemented. A GetTargetBreakpoint allows a client to determine the breakpoint identifier. Streaming operations will cause the object to write itself into and read itself out of the specified stream.

TTargetBreakpointPair

Breakpoints are stored in lists using the templatized TStreamableScalarKeyValuePair. These objects are created as a pair of the TargetBreakpoint identifier and the TPrimitiveBreakpoint. The class combining these two objects is called TTargetBreakpointPair. The C++ type definition is declared as:

```
typedef  TStreamableScalarKeyValuePair<TargetBreakpoint,
    TPrimitiveBreakpoint>    TTargetBreakpointPair;
```

TTargetBreakpointTable

A breakpoint table is used to store breakpoints internally in the debugger server framework. The entries contained within the table uses TargetBreakpointPair classes for storage and generates unique TargetBreakpoint identifiers in its MintID function. Their C++ type definition is declared as:

```
typedef TPDIDCollection<TTargetBreakpointPair, TargetBreakpoint>
    TTargetBreakpointTable;
```

TTargetBreakpointTableIterator

The object used for iterating through all breakpoints stored in the TTargetBreakpointTable is the TTargetBreakpointTableIterator class.

```
typedef TPDSetIterator<TTargetBreakpointPair>
    TTargetBreakpointTableIterator;
```

TTargetBreakpointList

When breakpoints are returned as notification between the server and client, a set of breakpoints are sent to signal which breakpoints were reached. Since more than one logical breakpoint may be reached at a single location, all logical breakpoints are added to the list. A list of primitive breakpoints can also be added to a list to the specify a single logical breakpoint. The C++ type definition for TTargetBreakpointList is declared as:

```
typedef TPDSet<TTargetBreakpoint>
    TTargetBreakpointList;
```

TTargetBreakpointListIter

The object used for iterating through all breakpoints stored in the TTargetBreakpointList is the TTargetBreakpointListIter class.

```
typedef TPDSetIterator<TTargetBreakpoint>
    TargetBreakpointListIter;
```

Watchpoints

Programs can also be stopped when data access occurs. This can happen from a data reference or a data write in a thread.

TPrimitiveWatchpoint

The class interface for TPrimitiveWatchpoint is nearly identical to the TPrimitiveBreakpoint class. It represents an abstraction for a data location or locations that will be monitored for access by the target process.

```
class TPrimitiveWatchpoint : public MDebuggerCollectible {
public
    enum WatchType {
        kReadWatchBreak,
        kReadWriteWatchBreak,
        kWriteWatchBreak
    };
    enum WatchStopType {        // ordering is important for union
function
        kNonStoppingBreak,      // breakpoint was nonstopping kind
                                // (reported only)
        kStoppingBreakSingleThread, // breakpoint caused thread to
stop
                                // (suspend on thread)
        kStoppingBreak          // breakpoint caused thread to stop
                                // (suspend all threads)
    };
public:
                                    TPrimitiveWatchpoint();
                                    TPrimitiveWatchpoint(const
                                        TPrimitiveWatchpoint&);
                                    TPrimitiveWatchpoint(
                                        const TargetProcess&
process,
                                        const TargetThread& thread,
                                        const TDebuggerAddress&
address,
                                        const TDebuggerAddress&
length,
                                        WatchType watchType =
                                            kReadWriteWatchBreak,
                                        WatchStopType watchStopType
=
                                            kStoppingBreak);
    virtual                     ~TPrimitiveWatchpoint();
    virtual long                Hash() const;
    virtual bool                IsEqual(const
MDebuggerCollectible*)
                                    const;
    virtual TDebuggerStream&    operator>>=(TDebuggerStream&)
const;
    virtual TDebuggerStream&    operator<<=(TDebuggerStream&);
    TPrimitiveWatchpoint&       operator=(const
                                    TPrimitiveWatchpoint&);
    WatchType                   GetWatchType() const;
```

-continued

```
    void                    SetWatchType(WatchType );
    WatchStopType           GetWatchStopType() const;
    void                    SetWatchStopType(WatchStopType
};
    TDebuggerAddress        GetAddress() const;
    void                    SetAddress(const
TDebuggerAddress&);
    TDebuggerAddress        GetLength() const;
    void                    SetLength(const
TDebuggerAddress&);
    TargetProcess           GetProcessID() const;
    void                    SetProcessID(TargetProcess);
    TargetThread            GetThreadID() const;
    void                    SetThreadID(TargetThread);
private:
    TargetProcess           fProcessID;
    TargetThread            fThreadID;
    TDebuggerAddress        fAddress;
    TDebuggerAddress        fLength;
    WatchType               fWatchType;
    WatchStopType           fWatchStopType;
};
```

Figure 17:
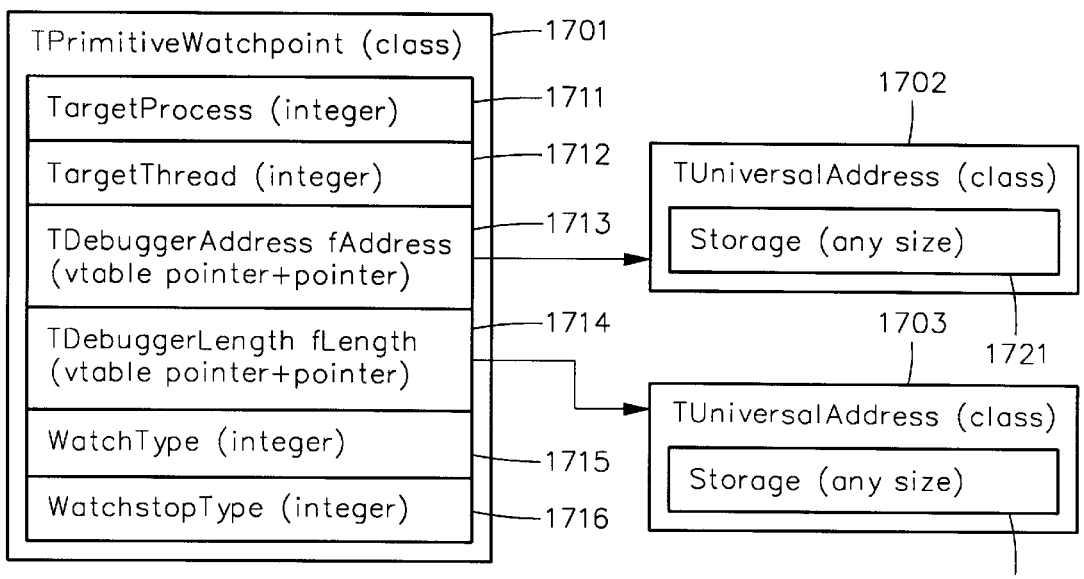
FIG. 17 illustrates the memory layout of the TPrimitive-Watchpoint object in accordance with a preferred embodiment.

FIG. 17 illustrates the memory layout of the TPrimitiveWatchpoint object. The process identifier 1711, and thread identifier 1712 name the target execution environment the watchpoint applies to. The address start 1713 and length 1714 indicate the range of memory to be monitoring.

The only real difference between TPrimitiveBreakpoint and TPrimitiveWatchpoint is in the WatchType and WatchStopType classes. Watchpoint types are broken down into two different dimensions, the WatchType and the WatchStopType. The WatchType defines what kind of watchpoint to set, or what kind of watchpoint occurred, stored in data member 1715. The different enumerated constants have the following meanings:

kReadWatchBreak is used for read-only watchpoints, i.e. the address which is being monitored is only read from and not written to.

kReadWriteWatchBreak is used for both read and write watchpoints, meaning that a watchpoint can occur when a memory location is accessed for reading and writing.

kWriteWatchBreak specifies that the watchpoint is to stop when only writing occurs.

The other dimension in which breakpoints can differ is specified by the WatchStopType type stored in data member 1716. When a breakpoint is reached by a thread, the thread does not stop when the kNonStoppingBreak type is specified. This is used for notifying the client asynchronously when a thread has reached a program location without requiring that the program stop execution.

Another type is the kStoppingBreakSingleThread which is a thread-specific breakpoint. When this kind of breakpoint is reached, only one thread is suspended while other threads continue executing. Operating system restrictions may prevent this from functioning on all systems.

Finally, another type of breakpoint is the kStoppingBreak which indicates that when one thread stops, all threads stop in the target process.

The other difference between TPrimitiveBreakpoint and TPrimitiveWatchpoint is that a range of memory may be monitored and not just a single address.

TTargetWatchpointTable

A watchpoint table is used to store watchpoints internally in the debugger server framework. The entries contained within the table uses TargetWatchpointPair classes for storage and generates unique TargetWatchpoint identifiers in its MintID function. Their C++ type definition is declared as:

```
typedef  TPDIDCollection<TTargetWatchpointPair, TargetWatchpoint>
    TTargetWatchpointTable;
```

TTargetWatchpointTableIterator

The object used for iterating through all watchpoints stored in the TTargetWatchpointTable is the TTargetWatchpointTableIterator class.

```
typedef  TPDSetIterator<TTargetWatchpointPair>
    TTargetWatchpointTableIterator;
```

TTargetWatchpointList

When watchpoints are returned as notification between the server and client, a set of watchpoints are sent to signal which watchpoints were reached. Since more than one logical watchpoint may be reached at a single location, all logical watchpoints are added to the list. A list of primitive watchpoints can also be added to a list to the specify a single logical watchpoint. The C++ type definition for TTargetwatchpointList is declared as:

```
typedef  TPDSet<TTargetWatchpoint>
    TTargetWatchpointList;
```

TTargetWatchpointListIter

The object used for iterating through all watchpoints stored in the TTargetWatchpointList is the TTargetWatchpointListIter class.

```
typedef  TPDSetIterator<TTargetWatchpoint>
    TTargetWatchpointListIter;
```

Notifications

The debugger server is designed to respond to asynchronous events in the target process. These events can occur at any time the server is attached to a process, i.e. the process is being debugged. A multitasking computer environment can produce many events including:

- hardware interrupts
- hardware exceptions
- software exceptions
- floating point exceptions
- breakpoints
- process initialization and termination
- thread initialization and termination
- process context switching
- thread context switching
- library loading and initialization
- interprocess communication
- memory allocation and deallocation
- process migration Events of this nature can occur at arbitrary points of execution in the program. Some are synchronous with respect to the thread of the process, such as floating point exceptions, and some are asynchronous, such as hardware interrupts. While a debugger server is attached to a target process, all target process events are generated and handled asynchronously with respect to the debugger server; the servicing thread does not participate in blocking while the target process is executing.

TTargetNotification

The class that encapsulates the notion of a "notification message" is called TTargetNotification. This implementation class contains various selectors and data to describe asynchronous events that occur in a target process. The notification is created in the server and then sent to the clients that are registered for notification.

The C++ class declaration of the preferred embodiment for the notification is as follows:

```
class TTargetNotification : public MDebuggerCollectible {
public:
    enum TargetNotificationKind {
        kUndefinedKind = 0,
        kThreadCreated,
        kThreadStopped,
        kThreadStopFailed,
        kProcessCreated,
        kProcessDied,
        kLibraryLoaded,
        kTargetNotificationMax = kLibraryLoaded
    };
    enum TargetExceptionCause {
        kUndefinedException = 0,
        kBreakpointOccurred,
        kWatchpointOccurred,
        kInstructionStepCompleted,
        kNonSeqInstructionStepCompleted,
        kNonSeqInstructionStepInComplete,
        kProgramStart,
        kSoftwareExceptionThrow,
        kSoftwareExceptionReThrow,
        kSoftwareExceptionTryMatch,
        kSoftwareExceptionHandled,
        kSystemException,
        kUserStopRequest
    };
    enum {
        kUndefinedBreakpoint = -1
    };
                                                TTargetNotification();
                                                TTargetNotitication(
                                                    const TTargetThread&,
                                                    TargetNotificationKind,
                                                    TargetExceptionCause =
                                                        kUndefinedException);
                                                TTargetNotification(
                                                    TargetNotificationKind,
                                                    TargetExceptionCause =
                                                        kUndefinedException);
                                                TTargetNotification
                                                    const TTargetNotification&);
    virtual                                     ~TTargetNotification();
    TTargetNotification&                        operator=(
                                                    const TTargetNotification&);
    virtual TDebuggerStream&                    operator>>=(TDebuggerStream&)
        const;
    virtual TDebuggerStream&                    operator<<=(TDebuggerStream&);
    TargetNotificationKind                      GetNotificationKind()
    void                                        SetNotificationKind(
                                                    TargetNotificationKind);
    const TTargetBreakpointList*                GetTargetBreakpointList() const;
    void                                        AdoptTargetBreakpointList(
                                                    TTargetBreakpointList*);
    const TTargetWatchpointList*                GetTargetWatchpointList() const;
```

-continued

```
    void                          AdoptTargetWatchpointList(
                                      TTargetWatchpointList*);
    void                          SetTargetExceptionCause(
                                      TargetExceptionCause);
    TargetExceptionCause          GetTargetExceptionCause() const;
    const TPrimitiveString&       GetExceptionName() const;
    void                          SetExceptionName(
                                      const TPrimitiveString&);
    TDebuggerAddress              GetExceptionPC() const;
    void                          SetExceptionPC(
                                      const TDebuggerAddress&);
    TSystemExceptionID            GetSystemExceptionID() const;
    void                          SetSystemExceptionID(
                                      TSystemExceptionID);
    TTargetThread                 GetTargetThread() const;
    void                          SetTargetThread(
                                      const TTargetThread&);
    TPrimitiveBreakpoint: :BreakStopType  GetBreakStopType() const;
    void                          SetBreakStopType(
                                      TPrimitiveBreakpoint::
                                      BreakStopType);
    TPrimitiveWatchpoint: :WatchStopType  GetWatchStopType() const;
    void                          SetWatchStopType(
                                      TPrimitiveWatchpoint::
                                      WatchStopType);
private:
    TTargetThread                          fTargetThread;
    TargetNotificationKind                 fNotificationKind;
    TargetExceptionCause                   fCause;
    TTargetBreakpointList*                 fBreakpointList;
    TTargetWatchpointList*                 fWatchpointList;
    TPrimitiveBreakpoint: :BreakStopType   fBreakStopType;
    TPrimitiveWatchpoint: :WatchStopType   fWatchStopType;
    TPrimitiveString                       fExceptionName;
    TDebuggerAddress                       fExceptionPC;
    TSystemExceptionID                     fSystemExceptionID;
};
```

TargetNotificationKind

The target notification is broken down into seven categories:

- kUndefinedKind, which is use describe an uninitialized state of the object or an error condition
- kThreadCreated, when a thread is first created within a process
- kThreadStopped, when a thread stops for any reason including stopping at a breakpoint
- kThreadStopFailed, when the debugger server detects that it is not able to stop a thread
- kProcessCreated, when a process is first created and before any instructions are executed in the target process
- kProcessDied, when a targeted process terminates normally or abnormally
- kLibraryLoaded, when a library is loaded into the target process's address space The notification categories are extendible, but these are the primitive operations necessary for general functionality as required by the PDS architecture. Extension is achieved by defining new, target-specific enumerations in a subclass.

The methods for using these constants are described below.

TargetExceptionCause

When a thread stops, an exception may have caused the exception. Although these are called "exceptions," the mechanism by which the event was generated is completely target-specific. The following enumerations describe the type of exception that occurred:

- kUndefinedException when a thread stopped and the server is unable to describe the condition or an error has occurred.
- kBreakpointOccurred when a thread (or threads) stopped at a breakpoint
- kWatchpointOccurred when a thread (or threads) stopped due to a watchpoint
- kInstructionStepCompleted when a thread completed stepping a single instruction
- kNonSeqInstructionStepCompleted when a thread completed stepping until a non-sequential instruction (e.g. branch) executes and returns.
- kNonSeqInstructionStepInComplete when a thread completed stepping until a non-sequential instruction (e.g. branch) executes and stops on the first instruction.
- kProgramStart when a process is started.
- kSoftwareExceptionThrow when a software exception is generated in a target thread.
- kSoftwareExceptionReThrow when a software exception has been generated, caught, and then rethrown.
- kSoftwareExceptionTryMatch when a thread has matched an exception object with a handler.
- kSoftwareExceptionHandled when a thread has completed handling an exception
- kSystemException when a hardware system exception occurs, e.g. invalid addressing or dereferencing of pointers to undefined virtual memory addresses.
- kUserStopRequest when a thread has stopped due to a previous client's asynchronous request.

Data members of the class are described below:

fTargetThread

The target thread that was associated with the event. If no single thread was associated, then kAllThreads is used.

fNotificationKind

The kind of the exception, as described above.
fCause
The cause of the exception, as described above.
fBreakpointList
The list of breakpoints associated with the exception. The pointer is NIL if there are no breakpoints.
fBreakStopType
The type of breakpoint that occurred
fWatchpointList
The list of watchpoints associated with the exception. The pointer is NIL of there are no watchpoints.
fBreakStopType
The type of watchpoint that occurred.
fExceptionName
A user-readable string for the exception that occurred. This contains the software exception name if the fCause field is kSoftwareExceptionThrow.
fExceptionPC
The address of the current program counter (PC) at which the exception occurred.
fSystemExceptionID
A system-identified exception identifier.
Client Identification
PrimitiveClientID

```
typedef long          PrimitiveClientID;
const PrimitiveClientID   kUndefinedClient = -1;
```

A client is identified by a server using a PrimitiveClientID identifier. Each client that is registered with a server has a unique identifier for that server.

The kUndefinedClient constant can be used to test if the client identifier is not valid.
TPrimitiveServerControlRequest The TPrimitiveServerControlRequest class contains a selector identifier necessary to control a debugger server. The C++ class declaration for this class is as follows:

```
class TPrimitiveServerControlRequest {
public:
    enum ERequest {
        kNullRequest,        // empty (but valid) request
        kShutdown,           // shut down the server
        kOutputQuiet,        // quiet output except errors
        kOutputRequestNames, // only output server request names
        kOutputVerbose
    };
    TPrimitiveServerControlRequest();
                              TPrimitiveServerControlRequest(
                                  ERequest);
    virtual
    ~TPrimitiveServerControlRequest();
    TDebuggerStream&          operator>>=(TDebuggerStream&) const;
    TDebuggerStream&          operator<<=(TDebuggerStream&);
    ERequest                  GetControlRequest() const;
    void                      SetControlRequest(ERequest);
private:
    ERequest                  fRequest;
};
``` kNullRequest

The kNullRequest function is used to ping the server. If the client request completes, then the server is known to be capable of responding to requests.
kShutdown The server can be stopped remotely by setting the kShutdown constant in the request object kOutputQuiet The kOutputQuiet request indicates that the server should turn off its output to the console.
kOutputRequestNames The kOutputRequestNames request indicates that the server should turn on output of the names of individual server requests.
kOutputVerbose The kOutputVerbose request indicates that the server should turn on verbose output for debugging the debugger server.

Stack and Thread State

The client and server communicate using a stack class. The TTargetStack class defines a protocol which can be used to describe individual stack frames. When streaming, however, the type of stack frames used are statically defined. The abstract base class does not define storage for the stack frames themselves since the size of the frames are defined by the subclasses.

The TTargetStack class consists of stack frames, as defined by the TTargetStackFrame class. Each frame is related to a subroutine call where additional memory is allocated on the stack. The stack frame consists of at least:

a program counter (PC), a stack pointer (SP), and a frame pointer.

It may also contain a copy of all of the registers at the point the subroutine call was made. The current register set is defined as a subset of information found in the topmost stack frame.

Each thread will be associated with only one stack and vice versa.

TTargetStack

The abstraction for program stacks is the TTargetStack class. The stack contains a finite number of stack frames, as defined by FrameIndex. The frames are numbered from zero for the topmost frame, to the total number of frames. The C++ class interface for the preferred embodiment is as follows:

```
class TTargetStack : public MDebuggerCollectible {
public:
    typedef unsigned long    FrameIndex;
                             TTargetStack();
                             TTargetStack(const
TTargetThread&);
    virtual                  ~TTargetStack();
    virtual long             Hash() const;
    virtual bool             IsEqual(const
MDebuggerCollectible*)
                                     const;
    virtual TDebuggerStream& operator>>=(TDebuggerStream&)
const;
    virtual TDebuggerStream& operator<<=(TDebuggerStream&);
    TTargetStack&            operator=(TTargetStack&);
    virtual void             ResetFrames();
    virtual void             AdoptFrame(TTargetStackFrame*
frame,
                                        FrameIndex fromTOS) =
0;
    FrameIndex               GetFrameCount() const;
    virtual TTargetStackFrame* GetFrame(FrameIndex) const = 0;
    TTargetThread            GetThread() const;
    void                     SetThread(const TTargetThread&);
protected:
    void                     SetFrameCount(FrameIndex);
```

-continued

```
private:
    TTargetThread      fThread;
    FrameIndex         fFrameCount;
};
```

The standard constructors (default and copy) and destructor are defined. The Hash function is used for storage in a collection class. IsEqual is used for testing equality of two stack objects; it iterates through all frames using the GetFrame function for each frame from zero to the value returned by GetFrameCount. Streaming operators (operator>>= and operator<<=) are defined for the data members in the base class. Finally, the operator= function is defined for copying.

The thread identifier is stored within the object; to retrieve the thread, call GetThread. To set the thread identifier, call SetThread.

To reset the number of frames in the stack, call ResetFrames. To add a new frame to the stack, call AdoptFrame with a pointer to a stack frame object and an index at the location in the stack to store the adopted frame.

The SetFrameCount function is provided for derived classes to allow them to set the frame count directly.

TTargetStackFrame

Each TTargetStackFrame object represents a stack frame in a target thread. It encapsulates the state within a single subroutine, including the program counter, stack pointer, and frame pointer. Subclass implementations of this abstract base class will contain partial or complete register sets that are saved in the stack frame when the next function call is made.

The C++ class interface for the preferred embodiment is as follows:

```
class TTargetStackFrame : public MDebuggerCollectible {
public:
                              TTargetStackFrame();
    virtual                   ~TTargetStackFrame();
    virtual long              Hash() const;
    virtual bool              IsEqual(const
MDebuggerCollectible*)
                                  const;
    virtual TDebuggerStream&  operator>>=(TDebuggerStream&)
const
                                  = 0;
    virtual TDebuggerStream&  operator<<=(TDebuggerStream&) =
0;
    virtual TDebuggerAddress  GetPC() const = 0;
    virtual void              SetPC(const TDebuggerAddress&) =
0;
    virtual TDebuggerAddress  GetSP() const = 0;
    virtual void              SetSP(const TDebuggerAddress&) =
0;
    virtual TDebuggerAddress  GetFP() const = 0;
    virtual void              SetFP(const TDebuggerAddress&) =
0;
};
```

The TTargetStackFrame class is default-constructed using no data for initialization.

The operator>>= streaming function allows the object to stream itself out into the provided stream parameter. Likewise, the operator<<= streaming function allows the object to stream itself in from the provided stream parameter.

The Hash member function allows the object to describe itself in terms of a scalar hash value. This is used when storing the addresses in collection classes which use the hashing function. The hash function returns a 32-bit value, usually the stack pointer.

To get the program counter, stack pointer, and frame pointer, call GetPC, GetSP, and GetFP, respectively. These values are of the portable type, TDebuggerAddress. Conversely, to set the program counter, stack pointer, frame, pointer, and frame pointer, call SetPC, SetSP, and SetFP, respectively.

TTargetThreadState

The thread state consists of the resources that are available to a thread. The abstract base class only defines protocol for the execution state, in the following states:

kInvalid, for a thread whose state is unknown or in an error state;

kRunning, for a thread that is running or scheduled for execution;

kStopped, for a thread that is stopped by the operating system, including hardware exceptions;

kBlocked, for a thread that is blocked, usually due to a synchronization primitive such as a semaphore or monitor;

```
class TTargetThreadState : public MDebuggerCollectible {
public:
    enum ExecutionState {
        kInvaiid,
        kRunning,
        kStopped,
        kBlocked
    };
                              TTargetThreadstate();
                              TTargetThreadstate(const
                                  TTargetThreadState&);
    virtual                   ~TTargetThreadState();
    virtual TDebuggerStream&  operator>>=(TDebuggerStream&)
const;
    virtual TDebuggerStream&  operator<<=(TDebuggerStream&);
    virtual bool              IsEqual(const
MDebuggerCollectible*)
                                  const;
    virtual long              Hash() const;
    TTargetThreadState&       operator=(const
                                  TTargetThreadState&);
    // Thread execution states
    ExecutionState            GetExecutionState() const;
    void                      SetExecutionState(ExecutionState
state);
private:
    ExecutionState            fThreadExecutionState;
};
```

The standard constructors (default and copy) and destructor are defined. The Hash function is used for storage in a collection class. IsEqual is used for testing equality. Streaming operators (operator>>= and operator<<=) are defined for the data member in the base class. Finally, the operator= function is defined for copying.

The execution state is stored within the object; to retrieve the thread, call GetExecutionState. To set the thread identifier, call SetExecutionState with the new state.

Client Class Descriptions

Streaming Model

The PDS streams provide a simple abstraction that allows objects to be moved from the writer of the stream to the reader of the stream. Depending on the implementation, the stream can be written by any thread and read by any other thread; these can be the same thread, different threads in the same process, or different threads in different processes. The communication used in the server uses the latter of these.

The implementation of the debugger stream classes are understood by those familiar with the art. Stream classes exist on many object-oriented systems which provide the abstraction of communicating objects. The invention does not depend on the implementation; however, certain key features are required:

TDebuggerStream Features

Streams provide the ability to let objects write themselves into a stream, to let objects read their contents out of a stream, to copy one stream into another stream, to read and write primitive types, and in some cases, to have sizes. Of the complete streaming protocol, the features used by the debugger server are:

construction and destruction of streams flushing (immediate write) (Flush)

getting the current stream position (GetPosition)

getting the logical length of the stream (GetLogicalEndOfStream)

getting the physical length of the stream (GetPhysicalEndOfStream)

reading and writing primitive scalar types (Read, Write)

reading and writing char* strings (Read, Write)

reading and writing an arbitrary number of bytes (Read, Write)

portable streaming format

Construction and Destruction

Construction and destruction of the streams should be obvious to the object designer.

Flushing

Flushing is a useful operation to ensure that buffered streaming is written to the underlying communication transport/medium immediately.

Position, Logical and Physical End of Stream

Streams are sequences of data, e.g. bytes, whose length may not be known. For instance, data sent and received over a serial line may not be bounded. In this case, there may not be any "length" per se, except as implied by the information contained within a request between the client and server. The state of the stream contains a position that indicates the current location at which the next piece of data is to be written. In addition, for those streams which are bounded, the logical end of stream is a length of the data that has been written. Similarly, the physical end of stream indicates the physical size of the stream, which is typically the size of memory which the stream has been allocated.

Reading and Writing

Objects and data are written into and read out of streams.

Portable Streaming

The TDebuggerStream uses a streaming format whereby byte ordering is preserved. Streams written on one platform are interpretable on another platform; a canonical stream format is used.

Compiler primitive types may define various sizes for scalars. The scalar types long, short, char, signed char, unsigned long, unsigned short, unsigned char, long double, float, and double are read and written transparently, ensuring that the reader and writer use the same type. Arbitrary blocks of memory and char strings are transported correctly.

TDebuggerMemoryStream Features

In addition to the basic TDebuggerStream class, a buffered streaming class is provided for easier implementation (TDebuggerMemoryStream). This class provides the additional functionality:

setting the position to an arbitrary location (Seek)

resizing the buffer (GrowBy, ShrinkBy)

Reading and Writing Streams

The most basic features used in streams are reading and writing. Conceptually, the streaming model is represented in the following figure:

Streamable Objects

Following the same CommonPoint conventions for streaming, objects streamed between the client and server use the same functions for writing themselves into a stream.

Connections

Communication between client and server are handled using TPrimitiveConnection objects. These connections allow a client to:

bind to a server send to the server receive a reply from the server

The connections are also used on the receiver (server) side. They allow the server to:

establish a service for clients to connect to receive a client's request reply to the client's request Subclass implementations of TPrimitiveConnection can be implemented using Unix sockets, Unix pipes Windows winsock sockets, Mach ports, shared memory, or any other byte- or block-oriented communication mechanism.

TPrimitiveConnection

The abstract base class, TPrimitiveConnection, defines a protocol which allows clients and servers to send and receive.

```
class TPrimitiveConnection : public MDebuggerCollectible {
public:
    enum ResetStream {
        kCurrent,
        kReset
    };
                                    TPrimitiveConnection();
    virtual                         ~TPrimitiveConnection();
    // SEND
    virtual TDebuggerStream*        ResetSend();
    virtual TDebuggerStream*        Send();
    virtual void                    OneWaySend();
    virtual void                    EndSend();
    // RECEIVE
    virtual TDebuggerStream*        Receive();
    // REPLY
    virtual TDebuggerStream*        ResetReply();
    virtual void                    Reply();
protected:
    virtual void                    HandleSend(TDebuggerStream*
                                        senderStream,
                                        TDebuggerStream*
                                        receiverStream) = 0;
    virtual bool
        HandleOneWaySend(TDebuggerStream*
                                        senderStream) = 0;
    virtual void                    HandleReceive(TDebuggerStream*
                                        receiverStream) = 0;
    virtual void                    HandleReply(TDebuggerStream*
                                        replyStream) = 0;
    virtual TDebuggerStream*        GetSendStream(ResetStream
                                        reset = kCurrent) = 0;
    virtual TDebuggerStream*        GetSendReplyStream(ResetStream
                                        reset = kCurrent) = 0;
    virtual TDebuggerStream*        GetReceiveStream(ResetStream
                                        reset = kCurrent) = 0;
    virtual TDebuggerStream*        GetReplyStream(ResetStream
                                        reset = kCurrent) = 0;
private:
    enum ConnectionState {
        kUninitialized,
```

```
            -continued
    kReady,
    kPreSend,
    kPostSend,
    kPostReceive,
    kPreReply
  };
  ConnectionState      fConnectionState;
};
```

The base class default constructor and destructor are defined.

Four functions are used on the sender side. These are: ResetSend, which is used to reset the connection's stream before streaming and data into the sending stream that is returned to the caller; Send, which causes the data in the stream to be sent to the receiver and the stream containing the data that was sent by the server; OneWaySend, which is used for an asynchronous send (e.g. send without a reply); and EndSend, which, when called, indicates to the connection that the transaction has been completed.

Three functions are used on the receiver side. These are: Receive, which is a blocking call until the sender has completed its call to Send; ResetReply, which indicates that the server/receiver is ready to send back the reply; and Reply, which indicates to the connection that the sender side of the transaction has been completed.

For each of Send, OneWaySend, Receive, and Reply, there are corresponding functions HandleSend, HandleOneWaySend, HandleReceive, and HandleReply which must be overridden by the inherited classes; these overriding functions implement the functionality of sending, receiving, and replying.

Correspondingly, GetSendStream, GetSendReplyStream, GetReceiveStream, and GetReplyStream functions must be overridden to provide the connection framework with streams that can be used by their corresponding callers. When the kReset parameter is passed in, then the stream needs to reset its current pointer to the beginning; conversely, when kCurrent is passed in, the stream should not move its pointer.

The internal state of the connection is maintained using a state variable to ensure consistency. When each of the ResetSend, Send, OneWaySend, Receive, and ResetReply, and Reply functions are called, the fConnectionState data member is changed to reflect the current state of the connection. This ensures that the connection follows the prescribed pattern of sends and receives.

Figure 11:
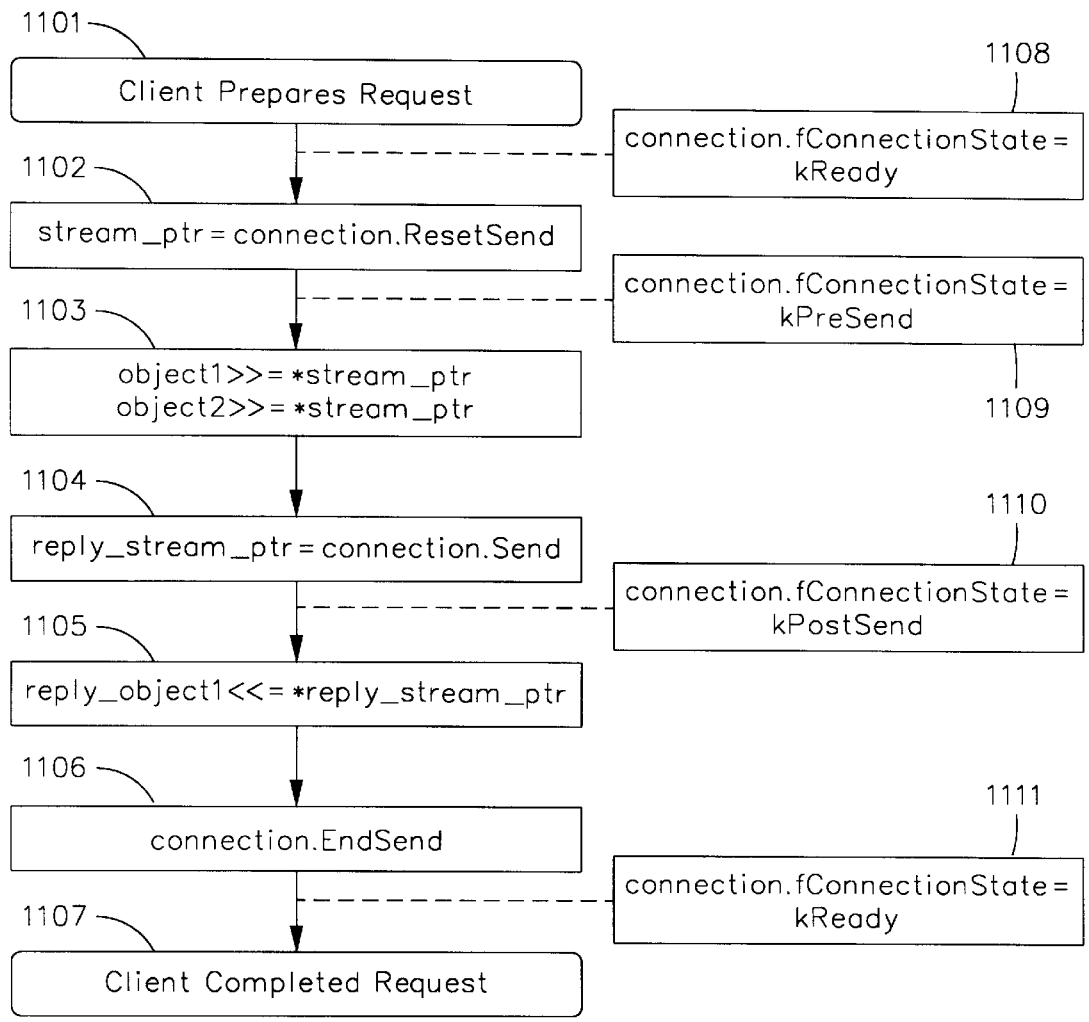
FIG. 11 shows the logic associated with preparing a client request in accordance with a preferred embodiment.

In FIG. 11 the client prepares the request in 1101. After calling ResetSend 1102, a pointer to a TDebuggerStream is returned. Two objects, object1, and object2 are written into the stream in 1103. The contents of the stream are sent in 1104; a stream pointer to the reply stream is returned. In 1105, the contents of the reply stream are read out of the reply_stream_ptr, and in 1106, the EndSend function is called. The request is completed in 1107.

The different states during send are: 1108, the internal connection state is set to kReady, indicating the stream is ready to be used for sending or receiving; 1109, the stream for the send has been prepared; 1110, the send has been completed and is now waiting for the reply, and back to 1111, the transaction is complete.

Figure 12:
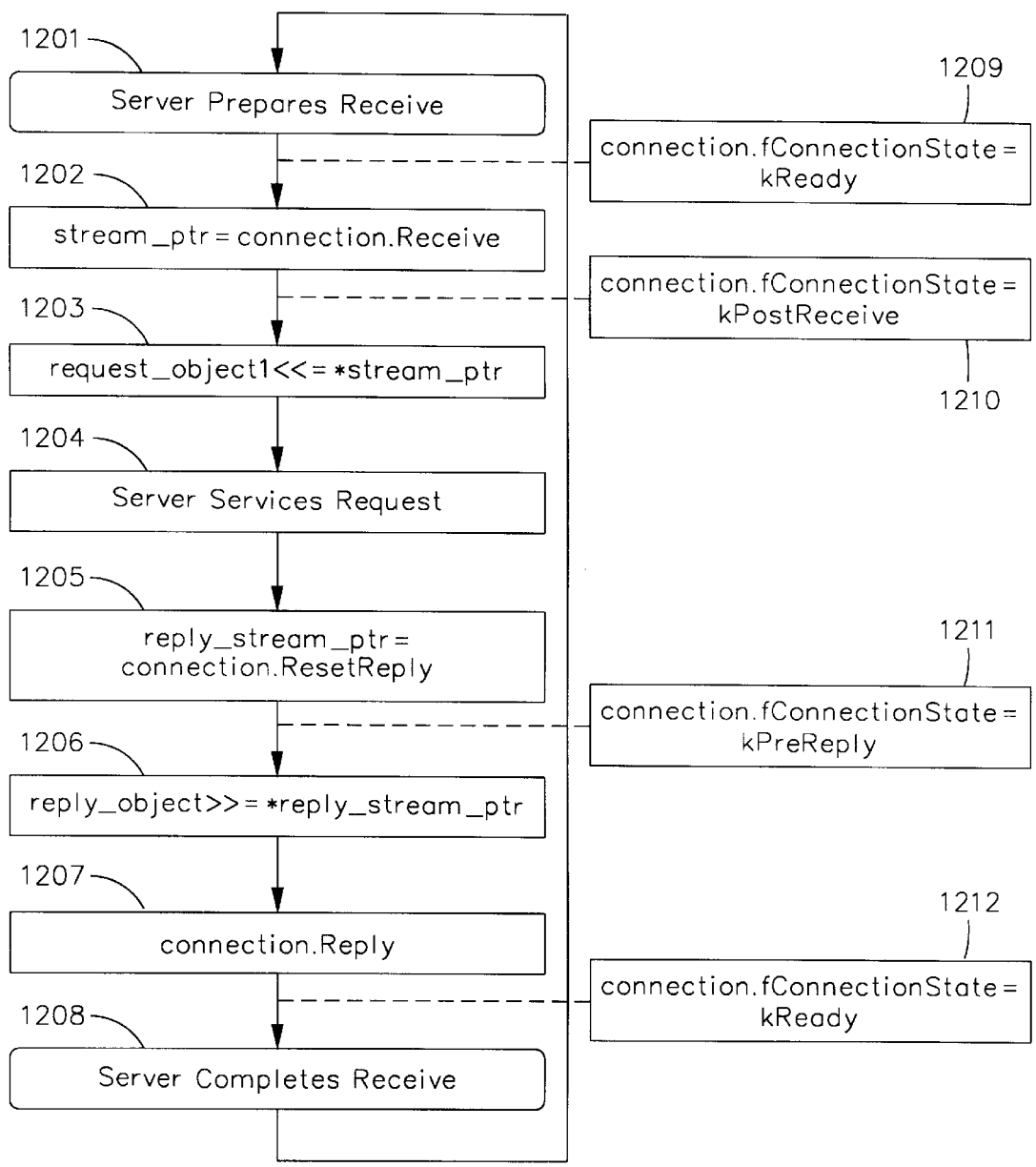
FIG. 12 shows the logic associated with request processing in accordance with a preferred embodiment.

The receiver side is similar. In FIG. 12, the server side is in a loop; the terminal 1201 is when the server is ready to accept requests from any client. Once the Receive function is called in 1202, the server is blocked until the Send from a client has been completed. If a stream's contents have already been sent, the server returns immediately, with the pointer to a stream with the sender's contents. The server reads out the contents of the request in 1203; the request_object1 presumably contains request information on which the server will dispatch its service. During stage 1204, the server handles the request. A reply is needed to close out the transaction between the client and server; in stage 1205, the server calls ResetReply which returns a pointer to a stream for use in streaming the reply. The object (or no object at all) that represents the reply from the server is streamed into the reply stream in 1206. The server completes its part of the transaction by calling Reply in block 1207, thus completing the act of servicing the request 1208.

The different states during receive are: 1209, the internal connection state is set to kReady, indicating the stream is ready to be used for sending or receiving; 1210, the receive has been completed; 1211, the reply stream has been prepared and now the connection is ready to send the reply back; 1212, the reply has been sent and the connection is now ready to handle another transaction.

Client Objects

TDebuggerPrimitiveClient

The client debugger creates, owns, and uses an object that derives from the TDebuggerPrimitiveClient class. This class is intended to be a single point for making requests to the server. The client object can be established with a connection which makes a binding to a server and subsequently makes requests. A client debugger may also create a separate thread and a separate return connection, on which the server sends asynchronous debugger notification.

The C++ class interface for the preferred embodiment of the debugger client interface is as follows:

```
class TDebuggerPrimitiveClient {
public:
    enum EDebuggerCallerRequest {
        kRequestPing,
        kRequestServerControl,
        kRequestGestalt,
        kRequestRegister,
        kRequestUnregister,
        kRequestGetProcessList,
        kRequestStartProcess,
        kRequestKillProcess,
        kRequestAttachProcess,
        kRequestDetachProcess,
        kRequestRead,
        kRequestWrite,
```

-continued

```
            kRequetGetThreadList,
            kRequestStartThread,
            kRequestKillThread,
            kRequestRunThread,
            kRequestStopThread,
            kRequestStepThread,
            kRequestNonSeqStepThread,
            kRequestGetThreadState,
            kRequestSetThreadState,
            kRequestGetStack,
            kRequestSetStack,
            kRequestGetStackFrame,
            kRequestSetStackFrame,
            kRequestSetBreakpoint,
            kRequestSetBreakpoints,
            kRequestClearBreakpoint,
            kRequestGetBreakpointList,
            kRequestSetWatchpoint,
            kRequestSetWatchpoints,
            kRequestClearWatchpoint,
            kRequesGetWatchpointList,
            kRequestGetFunctionName,
            kReguestGetFunctionAddress,
            kRequestGetLibraryName,
            kRequestGetLibraryAddress,
            kRequestGetSystemExceptionPolicy,
            kRequestSetSystemExceptionPolicy,
            kRequestSetSoftwareExceptionPolicy,
            kEnd,
            kMaxRequest        = kEnd
    };
public:
                                    TDebuggerPrimitiveClient();
        virtual                     ~TDebuggerPrimitiveClient();
        TPrimitiveConnection*       GetConnection() const;
        void                        SetConnection(
                                        TPrimitiveConnection*);
        TPrimitiveConnection*       RemoveConnection();
protected:
        virtual TDebuggerStream*    PrepareToSend(ServerRequest);
public:
        // general client requests
        virtual void                Ping();
        virtual void                Control(const
        TPrimitiveServerControlRequest&);
        virtual void                Shutdown();
        virtual void                Gestalt(TTargetGestalt&);
        virtual void                Register(TPrimitiveConnection&);
        virtual void                Unregister();
        // process-based calls
        virtual TTargetProcessList* GetProcessList(
                                        bool targeted = true);
        virtual TTargetProcess*     StartProcess(const
TProcessName&);
        virtual void                KillProcess(const
TTargetProcess&);
        virtual void                AttachProcess(
                                        const TTargetProcess&);
        virtual void                DetachProcess(
                                        const TTargetProcess&);
        virtual void                Read(const TTargetProcess&,
                                        void* buffer,
                                        const TDebuggerAddress&
addr,
                                        const TDebuggerLength&
length);
        virtual void                Write(const TTargetProcess&,
                                        const void* buffer,
                                        const TDebuggerAddress&
addr,
                                        const TDebuggerLength&
length);
        //
        // Thread-based calls
        //
        virtual TTargetThreadList*  GetThreadList(
                                        const TTargetProcess&);
        virtual TTargetThread*      StartThread(
                                        const TTargetProcess&,
```

-continued

```
                                const TThreadName&);
    virtual void            KillThread(const
TTargetThread&);
    virtual void            RunThread(const TTargetThread&);
    virtual void            StopThread(const
TTargetThread&);
    virtual void            StepThread(const
TTargetThread&);
    virtual void            StepNonSeqThread(
                                const TTargetThread&);
    virtual TTargetThreadState*  GetThreadState(
                                const TTargetThread&);
    virtual void            SetThreadState(
                                const TTargetThread&,,
                                const TTargetThreadState&);
//
// Runtime-based calls (symbolic calls)
//
    virtual void            GetFunctionName(TTargetProcess
targetProcess,
                                const TDebuggerAddress& address,
                                TDebuggerAddress& offset,
                                TLibraryName& libraryName,
                                TFunctionName& functionName,
                                TDebuggerLength&
functionLength);
    virtual void            GetFunctionAddress(
                                TTargetProcess targetProcess,
                                const TLibraryName& libraryName,
                                const TFunctionName&
functionName,
                                TDebuggerAddress&
functionAddress,
                                TDebuggerLength&
functionLength);
    virtual void            GetLibraryName (
                                TTargetProcess targetProcess,
                                const TDebuggerAddress& address,
                                TDebuggerAddress& codeAddress,
                                TDebuggerAddress& dataAddress,
                                TDebuggerAddress& offset,
                                TLibraryName& libraryName,
                                bool& isCode);
    virtual void            GetLibraryAddress(
                                TTargetProcess targetProcess,
                                const TLibraryName& libraryName,
                                TDebuggerAddress& codeAddress,
                                TDebuggerAddress& dataAddress);
    virtual void            GetThreadName(
                                TargetThread targetThread,
                                TThreadName& threadName);
    virtual void            GetStack(TTargetThread targetThread,
                                TTargetStack& Stack);
    virtual TTargetStack*   CopyStack(
                                TTargetThread targetThread);
    virtual void            SetStack(const TTargetThread& targetThread,
                                const TTargetStack& stack);
    virtual void            GetStackFrame(TTargetThread targetThread,
                                TTargetStackFrame& stackFrame);
    virtual void            SetStackFrame(TTargetThread targetThread,
                                const TTargetStackFrame& frame);
//
// Breakpoint-based calls
//
    virtual TargetBreakpoint
SetBreakpoint(TPrimitiveBreakpoint&);
    virtual TargetBreakpoint   SetBreakpoints(
                                const TTargeBreakpointList&);
    virtual void            ClearBreakpoint(TargetProcess
procID,
                                TargetBreakpoint breakpointID);
    virtual void            GetBreakpointList(TargetProcess
procID,
                                TTargetBreakpointTable& list);
    virtual TargetWatchpoint
SetWatchpoint(TPrimitiveWatchpoint&);
    virtual TargetWatchpoint   SetWatchpoints(
                                const TTargetWatchpointList&);
    virtual void            ClearWatchpoint(TargetProcess
```

```
                                      -continued procID,
                                      TargetWatchpoint watchpointID);
        virtual void                  GetWatchpointList(TargetProcess
procID,
                                      TTargetWatchpointTable& list);
        virtual void                  GetSystemExceptionPolicy(
                                          const TTargetProcess&
targetProcess,
                                      TSystemExceptionpolicy& policy);
        virtual void                  SetSystemExceptionpolicy(
                                          const TTargetProcess&
targetProcess,
                                          const TSystemExceptionPolicy&
                                              policy);
        virtual void                  SetSoftwareExceptionPolicy(const
TTargetProcess& targetProcess,
                                          bool catchExceptions);
protected:
        virtual void                  SetClientID(PrimitiveClientID);
        virtual PrimitiveClientID     GetClientID() const;
        virtual void                  HandleErrors(TDebuggerStream&
                                          resultStream);
private:
        TPrimitiveConnection*         fConnection;
        PrimitiveClientID             fClientID;
        TTargetProcess                *fCurrentProcess;
};
```

The requests are enumerated as constants in the EDebuggerCallerRequest definition. This comprises the initial set of constants. Each of the individual request constants (also called selectors) are defined below by the individual member functions that provide the client with the remote procedure call facility.

Client Management

The TDebuggerPrimitiveClient class has a default constructor and virtual destructor. Subclasses will probably override this and provide initialization to the client object.

To indicate to the TDebuggerPrimitiveClient object that the connection has been established to the server, call SetConnection, passing a pointer to the object. To get the current connection associated with the sending stream for the client, call GetConnection. Once the connection is no longer in use, before destructing the TDebuggerPrimitiveClient object, call RemoveConnection.

The PrepareToSend function is provided for inherited classes to call so that they can receive a pointer to a stream in which to send objects to the sender.

Server Management

A useful client function which does nothing except exercise the send-receive-reply transaction is the Ping function. This will force the client to send data to the server; the server must service the request and reply back to the client. Although this function does not do anything useful in the way of debugging, it exercises the connection mechanism.

Another function provides the client with control of the server's functions, is the Control function. The requests are specified by the TPrimitiveServerControlRequest object, which can modulate the output generated by the server.

When a server needs to be terminated, the Shutdown function can be called. This halts all debugging immediately, terminating any targeted processes, and terminates.

The client must first Register with a server before it can receive asynchronous notification of target process events. First a reverse connection object is created, and then it is passed into the Register function. The registration of the function causes the reverse connection object to be streamed to the server, where the server establishes itself as a client in a reversed client-server mode. When the client debugger no longer requires notification from the server, it calls the Unregister function.

Process Based Calls

The TDebuggerPrimitiveClient object provides several functions which are directed at accessing or controlling information about individual processes.

To enumerate a list of the processes that are attached, the client debugger calls GetProcessList which returns a list of TTargetProcess objects in a list. To enumerate a similar list for processes that are not targeted, the client debugger calls the same function, but specifying "false" instead.

StartProcess will take a process name and start the process on the target host. If the process requires additional information beyond what is capable of being expressed in a TProcessName, (e.g. objects must be streamed to the server-instead of a string), then the platform-specific implementation can define a separate StartProcess function which provides the additional, custom, functionality. Processes that are created in this manner will be attached by the debugger server.

The client may terminate a process using KillProcess by specifying a target identifier.

The client debugger may attempt to attach to a process by calling the AttachProcess function, which will cause the debugger server to receive all target process events thereafter.

The DetachProcess function allows the client debugger to stop debugging a target process without terminating it.

Memory operations are uniform for both reading and writing; the Read operation takes a process, a buffer in which to read, a start address, and a length; the Write operation is identical, except the specified buffer contains the data in which to write.

Thread Based Calls

The TDebuggerPrimitiveClient object provides several functions with which to inspect and control individual threads in a targeted process.

A list of threads that currently exist in the target process are returned in GetThreadList. The target process identifier is passed in as an argument.

To start a new thread with a given name, the StartThread function is called. For threads to be executable in this form, they must take on a name.

To kill a thread that is currently executing, the client debugger calls KillThread.

Restarting a stopped thread is achieved by calling RunThread. The thread must already exist for this to function correctly.

When a thread is executing, the client debugger can call StopThread to stop a single thread. If the kAllThreads thread identifier is used, then all threads will stop. If the thread is not stoppable, then the server will return notification to the client asynchronously that the thread could not be stopped.

A primitive operation offered by the server is StepThread which will execute a single instruction; if the instruction is at a branch, the single branch instruction will be taken. The StepNonSeqThread function will continue execution through all instructions until after a non-sequential control flow instruction is executed, i.e. a branch.

To get the state of the thread, including the current execution state, the client debugger can call GetThreadState. Note that this may be almost identical to getting the first stack frame after calling GetStack.

To set the state of the thread, call the function SetThreadState.

Runtime Based Functions

A combination of the statically-generated and compiled code and the dynamically-generated information exists in the runtime. The TDebuggerPrimitiveClient object defines several functions to aid in determining library and function placement.

The GetFunctionName provides the debugger client with the ability to determine a function name from an address in the target process' address space. The address passed in contains a location to an arbitrary code location. The debugger determines the library, function name, length, and the offset from the start of the function based on this address.

The reverse operation of GetFunctionName is GetFunctionAddress. Given the combination of a process, library name, and function name, the address and function length are returned.

Similar functions are provided for libraries. To get the name of a library from an address, the debugger client calls GetLibraryName. The function will also determine whether or not the address exists in code or is in a non-code segment of memory.

The reverse operation of GetLibraryName is GetLibraryAddress. This member function will return the code and data locations used by the library.

Some threading models are identified by names. The GetThreadName function will return a name as specified by the operating system or runtime.

When a thread is stopped, it will be executing with a program stack. This stack, containing the current register set and saved registers in the individual frames, is returned when GetStack is called with the thread identifier. The CopyStack function is identical except that it makes a copy based on the target machine type. To inspect an individual stack frame, call Get StackFrame. The stack can be written back to the target process using the SetStack and SetStackFrame functions.

Breakpoint and Watchpoint Management

To set an individual breakpoint, call SetBreakpoint, using a primitive breakpoint object as an argument. The unique breakpoint identifier will be returned. To clear the breakpoint, call ClearBreakpoint with the identifier.

To set multiple breakpoints using a single logical breakpoint identifier, call Set Breakpoints, which specify the multiple breakpoints to be assigned a single identifier which is returned.

To get a list of all breakpoints set for a particular process, call GetBreakpointList.

To set an individual watchpoint, call SetWatchpoint, using a primitive watchpoint object as an argument. The unique watchpoint identifier will be returned. To clear the watchpoint, call ClearWatchpoint with the identifier.

To set multiple watchpoints using a single logical watchpoint identifier, call SetWatchpoints, which specify the multiple watchpoints to be assigned a single identifier which is returned.

To get a list of all watchpoints set for a particular process, call GetWatchpointList.

A single hardware exception policy object is sent to the server; this is an object whose implementation is completely target-specific; there is no defined protocol.

Gestalt

The "gestalt" of the server describes the current state of the server as well as a self-description. From this object, the client can dynamically instantiate the objects which correspond to the target architecture of the machine.

TTargetGestalt

The gestalt can describe various aspects of the target machine; the following examples shows the name of the class and library that are used on the client side to construct an object corresponding to the target host. It also describes the operating system names and processor architecture names.

```
const int                    buffersize = 64;
class TTargetGestalt : public MDebuggerCollectible {
public:
    typedef unsigned long TargetGestaltSignature;
                                 TTargetGestalt();
                                 ~TTargetGestalt();
    virtual TDebuggerStream&   operator>>=(TDebuggerStream&)
const;
    virtual TDebuggerStream&   operator<<=(TDebuggerStream&);
    TargetGestaltSignature     GetSignature() const;
    void                       SetSignature(
                                     TargetGestaltSignature
sgntr);
    const char*                GetHostClassName() const;
    const char*                GetHostClassLibrary() const;
    void                       SetHostClassName(const char*
name);
    void                       SetHostClassLibrary(
                                     const char* name);
    const char*                GetOSName() const;
    void                       SetOSName(const char* osName);
    const char*                GetProcessorArchitecture() const
    void                       SetProcessorArchitecture
                                     const char*)
private:
    TargetGestaltSignature     fSignature;
    char                       fHostClassName[buffersize];
    char                       fHostClassLibrary[buffersize];
    char                       fOSName[buffersize];
    char
    fProcessorArchitecture[buffersize];
};
```

Server Class Descriptions

Server Framework

The server framework is designed around a set of classes which provide a reusable set of classes from which to build a platform-specific set of debugging services. The framework itself is portable to the extent that the base classes do not associate themselves with any one processor architecture, operating system model, or runtime model.

Server

Server Dispatching

Figure 13:
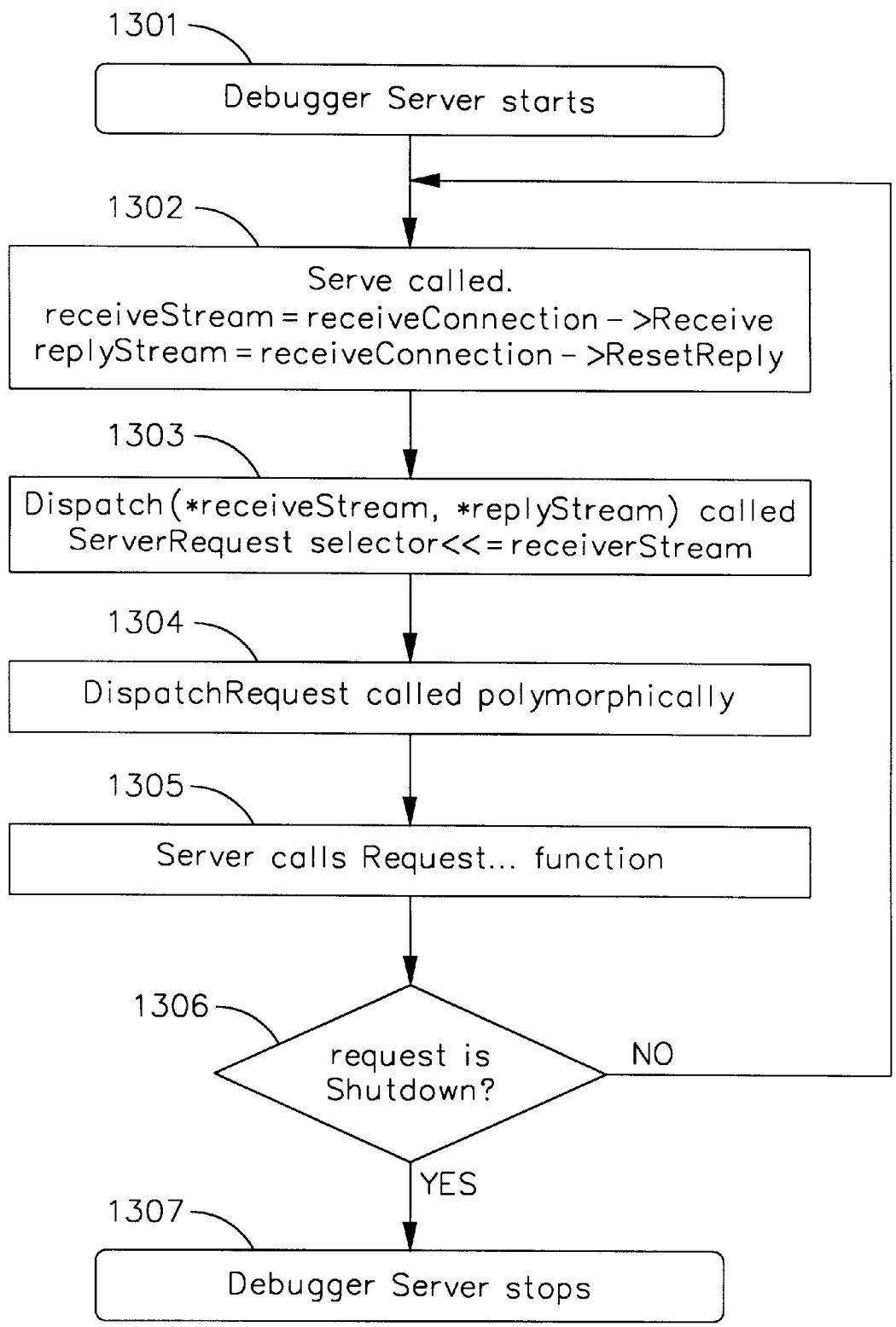
FIG. 13 shows the logic associated with the main server dispatch loop in accordance with a preferred embodiment.

The server starts in FIG. 13, which describes the main server dispatch loop. The server starts execution in 1301. The server waits until a message is received in block 1302 in the Serve function. The Dispatch function is called to identify the client selector in 1303. Depending on the selector that was sent to the server from the client, the server will dispatch the message by calling a handler function in DispatchRequest as a subroutine in 1304. This function is handled as a polymorphic call to a derived, platform-specific class of TDebuggerServer. The call is made in 1305.

If the handler function is the control handler and the request is a Shutdown request in decision block 1306, then the server exists in block 1307.

Server Threads

Figure 14:
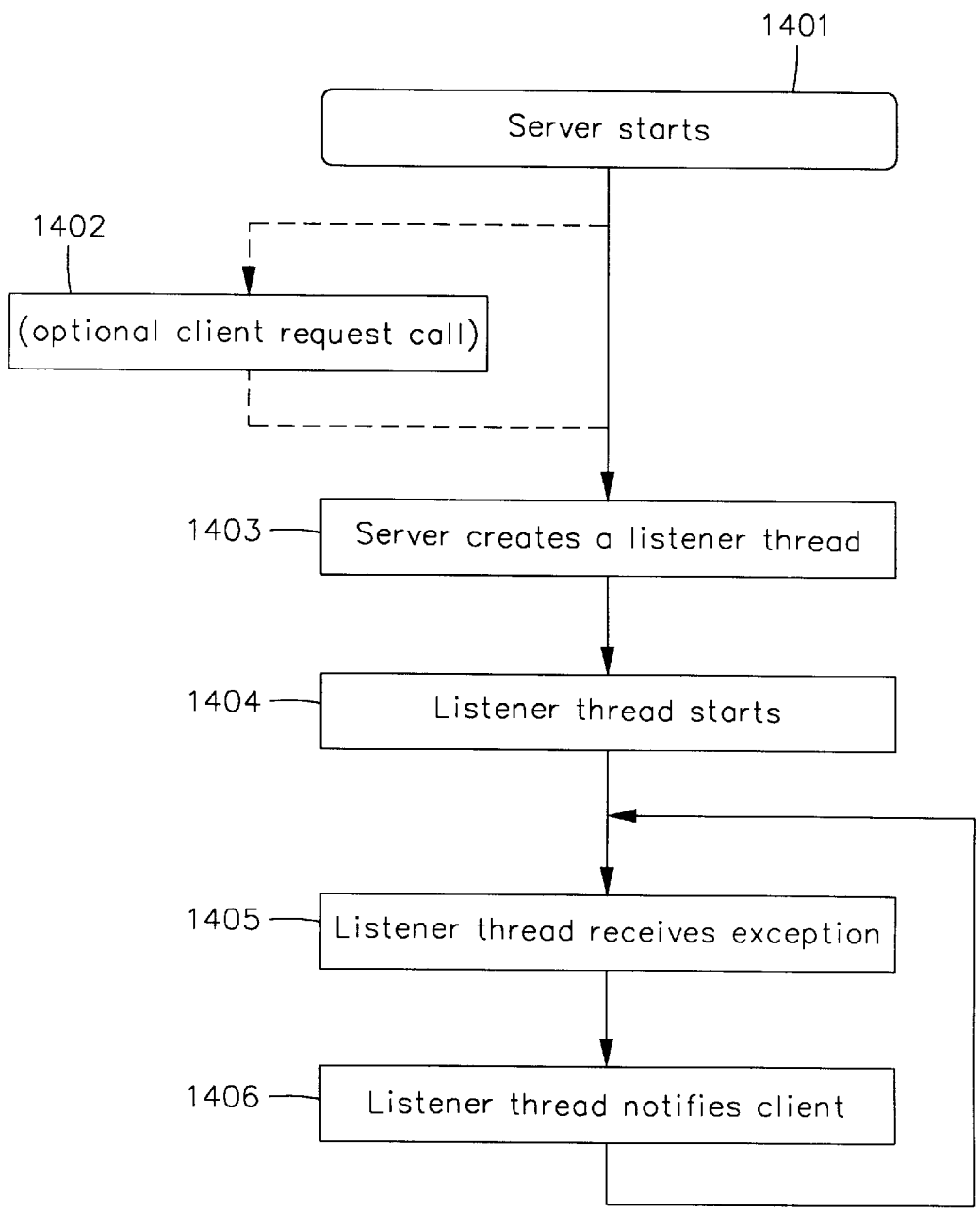
FIG. 14 illustrates the logic associated with event server processing in accordance with a preferred embodiment.

When the server is started, it will create one or more threads to receive events from the operating system which, in turn, become asynchronous notification which is sent to the debugger client. This is illustrated in FIG. 14. The initial block of the server starts at 1401. A client may make a request which causes the creation of a thread as in block 1402, or it may be created once at the beginning when the server is initialized. In block 1403, the server creates a new thread. The thread starts processing in block 1404, preparing itself to handle incoming asynchronous events generated by a target process. The message is received in block 1405 and the client is notified via a reverse connection in 1406. This process is repeated until the thread is destroyed by the server.

Debugger Server

```
class TPrimitiveDebuggerServer {
public:
                                        TPrimitiveDebuggerServer();
    virtual                             ~TPrimitiveDebuggerServer();
    virtual bool                        Serve() = 0;
    virtual PrimitiveClientID           AdoptClient(TPrimitiveConnection*);
    virtual void                        DeleteClient(PrimitiveClientID);
    virtual TargetProcess               AdoptProcess(TTargetProcess*,
                                            PrimitiveClientID
                                                clientID =
kUndefinedClient);
    virtual void                        DeleteProcess(TargetProcess);
    virtual TargetBreakpoint
AdoptBreakpoint(TPrimitiveBreakpoint*);
    virtual void                        DeleteBreakpoint(TargetProcess,
                                            TargetBreakpoint);
    virtual TargetWatcpoint
AdoptWatchpoint(TPrimitiveWatchpoint*);
    virtual void                        DeleteWatchpoint(TargetProcess,
                                            TargetWatchpoint);
    // output control
    enum OutputMode {
        kOutputQuiet,
        kOutputRequestNames,
        kOutputVerbose
    }
    OutputMode                          GetOutputMode() const;
    void                                SetOutputMode(OutputMode);
protected:
    bool                                GetStopFlag() const;
    TClientTable*                       GetClientTable();
    TTargetProcessTable*                GetProcessTable();
    //
    // Convenience functions for server-based state
    //
    TServerProcess*                     GetServerProcess(TargetProcess);
    TTargetProcess*                     GetProcess(TargetProcess);
    TServerProcessBreakpointTable*
GetBreakpointTable(TargetProcess);
    TServerBreakpointTableEntry*
GetBreakpointTableEntry(TargetProcess,
                                            const TDebuggerAddress&
address);
    virtual TServerProcessBreakpointTable*
                                        CreateBreakpointTable(TargetProcess)
                                            const = 0;
    //
    // Notification functions
    //
    virtual void                        NotifyClients(
                                            const TTargetNotification&);
    //
    // Required server requests
    //
    virtual void    RequestPing(TDebuggerStream&, TDebuggerStream&);
    virtual void    RequestControl(TDebuggerStream&,
TDebuggerStream&);
    virtual void    RequestGestalt(TDebuggerStream&,
```

-continued

```
                                    TDebuggerStream&) = 0;
    virtual void    RequestRegister(TDebuggerStream&,
                                    TDebuggerStream&) = 0;
    virtual void    RequestUnregister(TDebuggerStream&,
                                    TDebuggerStream&) = 0;
    virtual void    RequestRead(TDebuggerStream&,
                                    TDebuggerStream&) = 0;
    virtual void    RequestWrite(TDebuggerStream&,
                                    TDebuggerStream&) = 0;
    virtual void    RequestGetProcessList(TDebuggerStream&,
                                    TDebuggerStream&) = 0;
    virtual void    RequestStartProcess(TDebuggerStream&,
                                    TDebuggerStream&) = 0;
    virtual void    RequestKillProcess(TDebuggerStream&,
                                    TDebuggerStream&) = 0;
    virtual void    RequestAttachProcess(TDebuggerStream&,
                                    TDebuggerStream&) = 0;
    virtual void    RequestDetachProcess(TDebuggerStream&,
                                    TDebuggerStream&) = 0;
    virtual void    RequestGetThreadList(TDebuggerStream&,
                                    TDebuggerStream&) = 0;
    virtual void    RequestStartThread(TDebuggerStream&,
                                    TDebuggerStream&) = 0;
    virtual void    RequestKillThread(TDebuggerStream&,
                                    TDebuggerStream&) = 0;
    virtual void    RequestRunThread(TDebuggerStream&,
                                    TDebuggerStream&) = 0;
    virtual void    RequestStopThread(TDebuggerStream&,
                                    TDebuggerStream&) = 0;
    virtual void    RequestNonSeqStepThread(TDebuggerStream&,
                                    TDebuggerStream&) = 0;
    virtual void    RequestStepThread(TDebuggerStream&,
                                    TDebuggerStream&) = 0;
    virtual void    RequestGetThreadState(TDebuggerStream&,
                                    TDebuggerStream&) = 0;
    virtual void    RequestSetThreadState(TDebuggerStream&,
                                    TDebuggerStream&) = 0;
    virtual void    RequestGetStack(TDebuggerStream&,
                                    TDebuggerStream&) = 0;
    virtual void    RequestGetStackFrame(TDebuggerStream&,
                                    TDebuggerStream&) = 0;
    virtual void    RequestSetBreakpoint(TDebuggerStream&,
                                    TDebuggerStream&) = 0;
    virtual void    RequestSetBreakpoints(TDebuggerStream&,
                                    TDebuggerStream&) = 0;
    virtual void    RequestClearBreakpoint(TDebuggerStream&,
                                    TDebuggerStream&) = 0;
    virtual void    RequestGetBreakpointList(TDebuggerStream&,
                                    TDebuggerStream&) = 0;
    virtual void    RequestSetWatchpoint(TDebuggerStream&,
                                    TDebuggerStream&) = 0;
    virtual void    RequestSetWatchpoints(TDebuggerStream&,
                                    TDebuggerStream&) = 0;
    virtual void    RequestClearWatchpoint(TDebuggerStream&,
                                    TDebuggerStream&) = 0;
    virtual void    RequestGetWatchpointList(TDebuggerStream&,
                                    TDebuggerStream&) = 0;
    virtual void    RequestGetFunctionName(TDebuggerStream&,
                                    TDebuggerStream&) = 0;
    virtual void    RequestGetFunctionAddress(TDebuggerStream&,
                                    TDebuggerStream&) = 0;
    virtual void    RequestGetLibraryName(TDebuggerStream&,
                                    TDebuggerStream&) = 0;
    virtual void    RequestGetLibraryAddress(TDebuggerStream&,
                                    TDebuggerStream&) = 0;
    virtual void
    RequestGetSystemExceptionPolicy(TDebuggerStream&,TDebuggerStream
&) = 0;
    virtual void
    RequestSetSystemExceptionPolicy(TDebuggerStream&,TDebuggerStream
&) = 0;
    virtual void
RequestSetSoftwareExceptionPolicy(TDebuggerStream&,TDebuggerStream&)
= 0;
protected:
    virtual void                    PrintRequestName(const char*)
const;
    virtual TServerProcess*
CreateServerProcess(TTargetProcess* process,
```

```
        TServerProcessBreakpointTable* bpTable,
        TTargetThreadTable* adoptedTable);
public:
        virtual void            Dispatch(TDebuggerStream&,
TDebuggerStream&);
protected:
        virtual void            DispatchRequest(ServerRequest
selector,
                                TDebuggerStream&,
TDebuggerStream&);
private:
                                TPrimitiveDebuggerServer(const
TPrimitiveDebuggerServer&);
                                // not intended to be copied
        TPrimitiveDebuggerServer&    operator=(const
TPrimitiveDebuggerServer&);
private:
        bool                    fStopFlag;
        OutputMode              fOutputMode;
        TClientTable            fClientTable;
        TTargetProcessTable     fProcessTable;
};
```

The server has a default constructor and destructor.

The Serve function is called each time a new request is generated.

The server maintains a list of clients in its fClientTable object. When a new client is recognized, the server calls its AdoptClient function; when the client is no longer connected because it has called the detach request or the communications have failed, the DeleteClient function is called to remove the client from the table.

Similarly, when new processes are attached by the server, the AdoptProcess is called; the DeleteProcess is called when the server no longer is attached to the target process.

The CreateBreakpointTable is called when the server is initialized to allow a platform-specific table to be created; this function call is pure virtual and must be overridden by a subclass.

When an asynchronous target process event occurs, the NotifyClients function is called on the server, causing notification to be sent out to the clients registered for the notification.

All of the request functions are listed in order. These start with the name Request . . . and take two stream parameters. The first is the stream containing contents from the sender. The second is the stream into which the server function puts its reply.

The Dispatch function will stream out a selector of the stream, then calling DispatchRequest. This function will call the appropriate Request . . . function based on the selector in the message.

Figure 15:
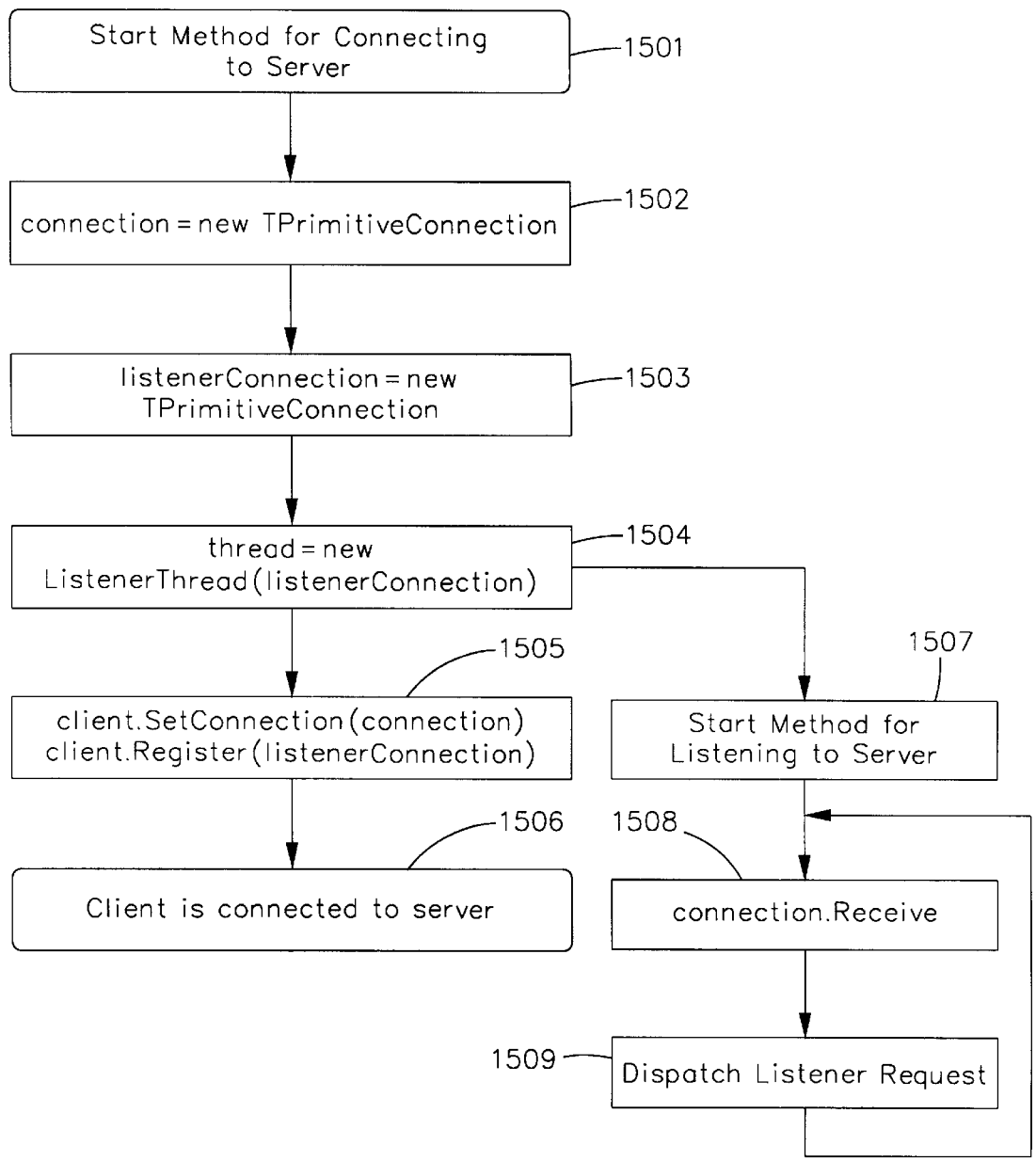
FIG. 15 shows the detailed logic associated with a client connecting to a debugger in accordance with a preferred embodiment.

Client-Initiated Actions: Server State and Control
Method for Connecting to a Server The process of connecting to a server starts with 1501 of FIG. 15 which illustrates the method for a client connecting to a debugger server.

A client debugger first creates a connection object in 1502. The connection object binds to the server's receiver connection object using the connection class implementation.

A client creates a listener connection in 1503, which represents the reverse connection on which the server will send notification.

In step 1504, A client creates a separate thread. The separate thread starts execution in step 1507, and will wait on the listener connection by calling the Receive function on the reverse connection object in step 1508. This step repeats until the thread is terminated.

The client.SetConnection function is called in step 1505. To establish the reverse connection, the client.Register function is called (also in step 1505), forcing the server to bind to the client's listener connection.

The client completes its connection to the server in step 1506.

Method for Detaching From a Server

The client debugger calls TDebuggerPrimitiveClient::Unregister. The server removes its connection for the client. The client dismantles the connection by first calling TDeubggerPrimitiveClient::RemoveConnection. The connection object and client object are deleted.

Method for Verifying Connection to a Server

The client debugger calls TDebuggerPrimitiveClient-::Ping. If the member function call returns successfully, the connection is operational. If a TPrimitiveDebuggerException is raised, the connection has failed.

Method for Determining Target Operating System

When a client first connects to a server, it can query the server for various aspects of the server configuration, including its operating system type.

The named operating system type is returned from the TTargetGestalt class, which indicates a character string.

This string name can be used to instantiate client debugger-related objects that are specific to the target architecture being used. In addition, a target-specific instance of the TDebuggerPrimitiveClient object can be created to work directly with the features of the target operating system.

Method for Determining Target Processor Architecture

The method for determining the target processor architecture is nearly identical to determining the target operating system. The above example is modified to give the following example:

```
GetProcessorType(TDebuggerPrimitiveClient* client,
        char* processorName, int processorNameLimit)
{
    TTargetGestalt gestalt;
    client->Gestalt (gestalt);
    strncpy(processorName,
```

-continued

```
        gestalt.GetProcessorArchitecture(),
        processorNameLimit);
}
```

Design and Method for Extending the Determination of Target-Host Specific Parameters Although this method to indicate the configuration parameters should be adequate to determine most target execution environments, it should be possible to determine more details about the target architecture.

After determining the client that is used, a new client object can be created which is designed to be used with a particular implementation of the debugger server. This parallel class provides additional functionality beyond those presented as the base set of server requests.

Take for example, the client that executes on any machine but used to connect to an AIX-specific client to an AIX target server. (AIX is an IBM version of the Unix operating system.)

Because of polymorphism, when the client functions are now called, the derived class functions are called instead of the base class functions. The underlined additions, kAIXGestalt indicate the usage of the additional AIX-based service.

Method for Controlling Server Actions

The method for controlling the debugger server's actions are described below.

An example for using the control classes to set verbose output using the PDS classes is as follows:

```
SetServerOutputVerbose(TDebuggerPrimitiveClient* client)
{
    TPrimitiveServerControlRequest
        verbose(TPrimitiveServerControlRequest: : kOutputVerbose);
    client->Control(verbose);
}
```

Design and Method for Extending Client-Initiated Action Functions

There are two methods for extending client-initiated action functions.

```
class TAIXPrimitiveClient : public TDebuggerPrimitiveClient {
public:
    enum EAIXDebuggerCallerRequest {
        kAIXGestalt = TDebuggerPrimitiveClient: :kMaxRequest+1,
        kAIXRequestAsynchronousStop,
        kAIXRequestGetProcessID,
        kAIXMaxRequest = kAIXRequestGetProcessID
    };
                                TAIXPrimitiveClient();
    virtual                     ~TAIXPrimitiveClient();
public:
    // general client requests
    virtual void                Register(
                                    TPrimitiveConnection&
                                        returnConnection) = 0;
    virtual TTargetThreadState* GetThreadState(
                                    const TTargetThread&);
    virtual void                SetThreadState (const
TTargetThread&,
                                    const TTargetThreadState&);
    virtual void                GetStack( TTargetThread,
                                        TTargetStack&);
    virtual TTargetStack*       CopyStack( TTargetThread);
    virtual void                GetStackFrame(TTargetThread,
                                        TTargetStackFrame&);
    void                        GetSystemExceptionPolicy(
                                    const TTargetProcess&,
                                    TSystemExceptionPolicy&) ;
    void                        SetSystemExceptionPolicy(
                                    const TTargetProcess&,
                                    const
TSystemExceptionPolicy&);
    void                        SetSoftwareExceptionPolicy(
                                    const TTargetProcess&,
                                    bool catchExceptions);
    // for the AIX version of the
server
    virtual void                AIXGestalt(TAIXTargetGestalt&);
    virtual void                AsynchronousStop(pid_t pid,
                                    const TTargetNotification&
                                        notification);
    virtual TargetProcess       GetProcessID(pid_t pid);
};
```

Note the addition of new enumerations declared under EAIXDebuggerCallerRequest which extend the base functionality. These requests are server requests which augment the base server functionality.

1. Override the base class client- and server request functions, providing new functionality.

2. Add new requests which are not part of the basic set of debugging services requests.

The steps for an implementor who is extending client-initiate action functions are the following:
- create a new enumeration in the target-specific class
- create a new function that corresponds to the new request function
- modify the server's DispatchRequest function, adding handling the new customized selectors, otherwise deferring control to the base class implementation of DispatchRequest.

```
void
TAIXDebuggerServer::DispatchRequest(ServerRequest selector,
        TDebuggerStream& senderStream,
        TDebuggerStream& receiverStream)
{
    int temp = selector;
    typedef TAIXPrimitiveClient TClient;
    switch (selector) {
        case TClient::kAIXGestalt:
            RequestAIXGestalt(senderStream, receiverStream);
            ReplyToClient();
            break;
        case TClient::kAIXRequestAsynchronousStop:
            RequestAsynchronousStop(senderStream, receiverStream);
            break;
        case TClient::kAIXReguestGetProcessID:
            RequestGetprocessID(senderStream, receiverStream);
            ReplyToClient();
            break;
        default:
            TPrimitiveDebuggerServer::DispatchRequest (selector,
                    senderStream, receiverStream);
            ReplyToClient();
            break;
    }
}
```

Client-Initiated Actions: Host State and Control
Method for Enumerating Processes The client debugger can enumerate processes over a process list. The client debugger overrides the GetProcessList to understand the target process types

```
PrintUntargetedProcessList(TDebuggerPrimitiveClient* client)
{
    TTargetProcessList* list = client->GetProcessList(false);
    TTargetProcessListIterator* iter = list->CreateIterator();
    TTargetProcess* process;
    for (process = iter->First(); process; process = iter->Next()) {
        TargetProcess id = process->GetProcessID();
        TProcessName name;
        process->GetName(name);
    }
}
```

First the process list is returned from the client object. Next, the iterator is created from the list. The loop iterates over the individual process objects that are returned.

Client-Initiated Actions: Process State and Control
Method for Starting Programs The client debugger calls the function with the program name to be started. An example of this code follows:

```
StartProcess(TDebuggerPrimitiveClient* client,
        const TProcessName& name)
```

```
{
    TTargetProcess* process = client->StartProcess(name);
    printf("Process ID = %d\n", process->GetProcessID());
}
```

Method for Attaching to Processes

After enumerating the individual processes (See Method for Enumerating Processes), the debugger can attach to a single process for debugging:

```
AttachDebuggerToProcess(TDebuggerPrimitiveClient* client,
        const TTargetProcess& process)
{
    client->AttachProcess(process);
}
```

Method for Detaching From Processes

When a client debugger has completed its session debugging a target, it indicates to the debugger server that it should detach itself from debugging the target process.

```
DetachDebuggerToProcess(TDebuggerPrimitiveClient* client,
        const TTargetProcess& process)
{
    client->DetachProcess(process);
}
```

Method for Terminating Processes

The client debugger may terminate programs that are being debugged. This also indicates to the debugger server to no longer target the process.

```
KillProcess(TDebuggerPrimitiveClient* client,
        const TTargetProcess& process)
{
    client->KillProcess(process);
}
```

On the client's second thread used for listening to asynchronous events, an event will be received indicating the termination of the process. The notification received will contain the following data:

```
HandleNotification(const TTargetNotification& notification)
{
    if (notification.GetNotificationKind() == kProcessDied)
    {
        printf("process died\n");
    }
}
```

Method for Reading Memory

An arbitrary sized block of memory may be read from the target address space. Typically, this will be limited to the client debugger's own memory allocation limitations.

The client can express arbitrary addresses using the TDebuggerAddress object. For instance, this can allow a client running on a 32-bit processor to get the memory from a target machine running on a 64-bit address space.

An example of code to read memory is:

```
const int kBufferSize = 1024;
TTargetProcess process = GetProcessToRead();
TDebuggerAddress startAddress (TPowerPCAddress(0xD0001280));
TDebuggerLength length(T32BitAddress(kBufferSize)); // read 1K Bytes
char localBuffer[kBufferSize];
client->Read(process, localBuffer, addr, length);
```

Breakpoints are treated transparently; they will not be visible in the memory that is read regardless of the execution state of the process. For each memory location that contains a breakpoint instruction, the server maintains a copy of the original instruction; when the Read function is called, the original instruction is read (and not the breakpoint instruction).

Method for Writing Memory

An arbitrary sized block of memory may be written to the target address space. Typically, this will be limited to the client debugger's own memory allocation limitations.

```
const int kBufferSize = 1024;
TTargetProcess process = GetProcessToWrite();
TDebuggerAddress startAddress (TPowerPCAddress(0xD0001280));
TDebuggerLength length(T32BitAddress(kBufferSize)); // read 1K Bytes
char localBuffer[kBufferSize];
FillBuffer(localBuffer);
client->Write(process, localBuffer, addr, length);
```

As with reading memory, breakpoints are treated transparently. When memory is written into, the breakpoint will not be erased, and when a thread executes through memory that has been written into, the breakpoint is hit.

Method for Setting Process-Wide Breakpoints

To set a breakpoint at a single address, applied to all threads in a process, the kAllThreads thread identifier is used. A TPrimitiveBreakpoint object is created and passed to the client, which in turn makes a request to the server. The server returns the logical ID corresponding to the breakpoint.

```
TargetBreakpoint
SetBreakpoint(TDebuggerPrimitiveClient& client,
              const TDebuggerAddress& address)
{
    TargetProcess      processID = GetProcessToSetBreakpoint();
    TargetThread       threadID = kAllThreads;
    TPrimitiveBreakpoint bp(processID,
                            threadID,
                            address,
        TPrimitiveBreakpoint: :kUnconditionalBreak);   TargetBreakpoint
breakpointID = client.SetBreakpoint(bp);
    return breakpointID;
}
```

Method for Setting Process-Wide Watchpoints

The method for setting watchpoints is almost identical to setting breakpoints, except a range of memory is specified.

Method for Clearing Process-Wide Breakpoints

The breakpoint ID is passed to the client, causing the server to remove a logical breakpoint. If there are multiple logical breakpoints at the indicated location, they will continue to exist.

```
void
ClearBreakpoint(TDebuggerPrimitiveClient& client, TargetBreakpoint
bpID)
{
    TargetProcess    processID =
                            GetProcessToClearBreakpoint();
    client.ClearBreakpoint(processID, breakpointID);
}
```

Method for Setting and Clearing Multiple-Location/Single-Logical Process-Wide Breakpoints A single logical breakpoint can consist of multiple physical locations. This is useful when notification is required when a thread or threads reaches any of a number of locations, but to simplify decoding, only a single logical breakpoint identifier is desired.

```
TargetBreakpoint
SetBreakpoints(TDebuggerPrimitiveClient& client,
               const TDebuggerAddress& address1,
               const TDebuggerAddress& address2)
```

```
-continued

{
    TargetProcess              processID = GetProcessToSetBreakpoint();
    TargetThread               threadID = kAllThreads;
    TPrimitiveBreakpoint       bp1 (processID,
                                    threadID,
                                    address1,
    TPrimitiveBreakpoint:      :kUnconditionalBreak);
    TPrimitiveBreakpoint       bp2(processID,
                                    threadID,
                                    address2,
    TPrimitiveBreakpoint:      :kUnconditionalBreak);
    TTargetBreakpointTList     bpList;
    bpList.Add(bp1);
    bpList.Add(bp2);
    TargetBreakpoint breakpointID = client.SetBreakpoints(bpList);
    return breakpointID;
}
```

To clear a multiple-location breakpoint, use the Method for Clearing Process-Wide Breakpoints. Note that temporary breakpoints do not need to be cleared since they are automatically removed by the server.

Method for Enumerating Threads

Getting a list of threads is achieved by calling the client with the process identifier (TTargetProcess):

```
TTargetThreadList*
GetThreadList(TDebuggerPrimitiveClient& client)
{
    TargetProcess processID = GetProcessID();
    TTargetProcess  process(processID);
    return client.GetThreadList(process);
}
```

Individual thread identifiers can be used to get the thread state, including program counter, stack pointer, and any other thread-specific information.

Method for Determining the Name of a Process

To get the name of a process, a client must first enumerate over the processes using the Method for Enumerating Processes. In it, the client can compare TargetProcess process identifiers with the ones found in the list.

Design and Method for Extending the Access to Process-Specific State and Control As mentioned in Design and Method for Extending Client-Initiated Action Functions, there are two ways to extend the functionality of the client interface. Overriding a member function such as the Start Process request function is necessary because the target operating system will have a different mechanism for starting processes. These functions need to be overridden directly in the server.

New process-based requests can be added in the manner described in Design and Method for Extending Client-Initiated Action Functions, by adding new member functions and assigning new request IDs.

Client-Initiated Actions: Thread State

Callers of the client object can determine the processor type by using the Gestalt client function to determine which client subclass is used to communicate with the particular server. Once the client object type has been determined, the client will use both processor- and OS-specific subclasses of the client classes.

Method for Reading Thread Execution State

Using a target thread identifier object, TTargetThread, the call to GetThreadState will return a pointer to a thread state object. The base class object, TTargetThreadState, only contains the execution state of the thread. Derived classes will contain additional information that is specific to the target processor architecture.

```
TTargetThread thread = GetAThreadToExamine();
TTargetThreadState* threadState =
client.GetThreadState(thread);
TTargetThreadState::ExecutionState execState = threadState-
>GetExecutionState();   // stopped, running, etc.
// processor specific:
TPowerPCTargetThreadState* ppcThreadState =
(TPowerPCTargetThreadState*) threadState;
pc = ppcThreadState->GetPC();
```

Method for Writing Thread Execution State

Once a client has changed the state of a thread, the state can be changed in the stopped target thread. Continuing from the Method for Reading Thread Execution State.

```
pc = pc + 4;      // move pc value past the current instruction.
client->SetThreadState(thread, *threadState);
```

Method for Reading a Thread Stack

The entire contents of a stack can be read by calling the GetStack function. Similarly, to create a copy of the stack, the CopyStack function provides the same data, but returning it via a pointer to dynamically-allocated storage.

```
TTargetThread thread = GetAThreadToExamine();
TTargetStack*  stack;
stack = client.CopyStack(thread);
```

Method for Writing a Thread Stack

The entire contents of a stack can be written by calling the SetStack function.

```
TTargetStack*  stack;
client.SetStack(thread, *stack);
```

Method for Reading a Thread Stack Frame

There are two ways for reading a stack frame. The first is to read the entire stack using the Method for Reading a Thread Stack, and the second is to read an individual stack frame

```
The first method is:
TTargetThread thread = GetAThreadToExamine();
TTargetStack*       stack;
stack = client.CopyStack(thread);
TTargetStackFrame*   frame = stack->GetFrame(0);
    The second is:
TTargetThread thread = GetAThreadToExamine();
TTargetStack*       stack;
TPowerPCTargetStackFrame frame;
stack = client.GetStackFrame(thread, frame);
```

Method for Writing a Thread Stack Frame

A single stack frame can be written back into the target thread with the SetStackFrame function.

```
TPowerPCTargetStackFrame frame;
// modify the frame here
client.SetStackFrame(thread, frame);
```

Method for Reading a Thread Program Counter, Stack Pointer, and Frame Pointer

Thread state for the program is a subset of the combined state of the thread that includes memory, registers, and the stack. Since the stack will contain saved register values which can be recovered upon stackwalking and during the return from function calls, the current register set is viewed as a special case of the register sets for all stack frames.

Thus, the current program counter, stack pointer, and frame pointer are read out of the topmost (most current) stack frame within a thread's stack:

```
TTargetStack*       stack;
stack = client.CopyStack(thread);
```

-continued

```
TTargetStackFrame*   frame = stack->GetFrame(0);
TDebuggerAddress     pc = frame->GetPC(),
```

Method for Writing a Thread Program Counter, Stack Pointer, and Frame Pointer

Once a thread program counter is read, it can be modified and then written back to the target frame.

```
TTargetStack*       stack;
stack = client.CopyStack(thread);
TTargetStackFrame*   frame = stack->GetFrame(0);
TDebuggerAddress     pc = frame->GetPC();
pc += 4;
frame->SetPC();
client.SetStack(thread, *stack);
```

Design and Method for Extending the Access to Thread-Specific State

Thread state can be extended through the use of additional subclassing of the TTargetThreadState class. Data items which are particular to the target processor and target operating system can be stored as members of this new derived class.

Method for Reading a Thread Register Set

The abstract base classes do not attempt to describe the contents of register sets. These are strictly architecture dependent and are presented in the derived classes.

One such derived class for the thread state may look like the following example:

```
class TPowerPCTargetThreadState : public TTargetThreadState {
public:
                                    TPowerPCTargetThreadState();
                                    TPowerPCTargetThreadState (
                                        const TPowerPCTargetThreadState&);
    virtual                         ~TPowerPCTargetThreadState();
    virtual TDebuggerStream&        operator>>=(
                                        TDebuggerStream& dstStream) const;
    virtual TDebuggerStream&        operator<<=(
                                        TDebuggerStream& srcStream);
    virtual bool                    IsEqual(const MDebuggerCollectible*)
const;
    virtual long                    Hash() const;
    TPowerPCTargetThreadState&          operator=(
                                            const
TPowerPCTargetThreadState&);
    virtual Bits32                  GetPC() const;
    virtual void                    SetPC(Bits32 pc);
    virtual Bits32                  GetSP() const;
    virtual void                    SetSP(Bits32);
    virtual void                    Zero();          // wipe out state
public:
    TMPC601GPRSet                   fThreadGPRSet;
    TMPC601FPRSet                   fThreadFPRSet;
    TMPC601ExceptionLongState       fThreadExceptionState;
};
```

The sample code used to get the thread register set is then:

```
TTargetThread thread = GetThreadToExamine();
TPowerPCTargetThreadState* threadState =
```

-continued

```
(TPowerPCTargetThreadState*) client.GetThreadState(thread);
```

After reading the register set, individual registers may be modified.

```
//
// now look at general purpose registers:
//
threadState->fThreadGPRSet.fGPR[ePC];
// where fGPR is a nested struct and
// ePC is an index into a register set.
```

Method for Writing a Thread Register Set

Once a register set has been modified (usually after using the Method for Reading a Thread Register Set), it is written back into the target thread. The local thread state objects do not update the state in the target thread until the SetThreadState client request is called.

```
TTargetThread thread = GetThreadToExamine();
TPowerPCTargetThreadState*      threadState =
(TPowerPCTargetThreadState*)    client.GetThreadState(thread);
```

Design and Method for Extending the Reading and Writing of Processor-Specific Thread-Specific Registers The design of the thread state classes is extensible to be created for any target processor architecture, as shown in the Method for Reading a Thread Register Set. Generally speaking, all thread state can be encapsulated in one or more thread state classes associated with the TTargetThreadState classes. If further thread-specific data or operations cannot be expressed using the GetThreadState and SetThreadState calls, additional client request functions can be added in the target-specific client objects.

Client-Initiated Actions: Thread Control

Method for Determining the Name of a Thread

When debugging processes on operating systems which allow programmers to describe individual threads with names, it is possible for the debugger server to return the name of the thread to better allow the programmer to more easily understand the dynamic operation of the target program.

```
TargetThread       thread = GetTargetThreadWithName();
TThreadName        threadName;
client.GetThreadName(thread, threadName);
```

The thread name class (typically defined to be same type as TPrimitiveString) is capable of expressing both 8-bit and 16-bit (Unicode) character strings.

Method for Stopping Threads at the User's Request

To stop individual threads, the client call, StopThread is used.

```
TargetThread thread = GetTargetThreadToStop();
```

-continued

```
client.StopThread(thread);
```

This function operates synchronously. Once the thread is stopped, the server notifies the client debugger using the separate asynchronous listener thread.

Method for Continuing Stopped Threads

To restart a thread that has been stopped due to an breakpoint, hardware exception, or if the client debugger has requested for a thread to stop, it can be continued or restarted from its stopped state.

```
TargetThread thread = GetTargetThreadToContinue();
client.RunThread(thread);
```

Note that depending on the target operating system, different behavior may occur. For instance, on Unix-based environments, it may be necessary to restart the thread by passing the received signal back to the target thread. On Mach-based system, the exception message may need to be sent back to the thread that was being executed. In each of these cases, the debugger server handles its own case individually, performing actions such as saving the exception state upon receipt of the stopping exception and then restoring this state within the RunThread server request.

Method for Executing Single Instructions in a Thread

The "instruction stepping" primitive is also provided as a function of the debugger framework. The StepThread function accomplishes this task.

```
TargetThread thread = GetThreadToStep();
client.StepThread(thread);
```

When the thread has completed stepping, notification of the step completion is reported on the client's listener thread.

The implementation of this is dependent on the underlying operating system. On some microprocessors, such as the Motorola 68000 family, a single instruction can be traced by setting a "trace bit" in the processor state. On other processors, the single step instruction must be simulated by setting a breakpoint so as to allow only one instruction to execute.

The pseudo-code for achieving this latter mode of stepping (implemented in the debugger server) is as follows:
1. Let pc=the current program counter.
2. Let pc_dest={set of all instructions which can be executed following the current instruction}
3. Set temporary thread-based breakpoints on the set of pc_dest instructions.
4. Restart the thread.
5. Handle the breakpoint, removing temporary breakpoints.
   Typically the cardinality of pc_dest is one or two.

Method for Executing Multiple Sequential Instructions in a Thread

The debugging services also provides execution of programs, stopping at instructions at which a change of control flow is made, i.e. only those instructions which cause branches. This "non-sequential stepping" allows a client debugger to optimize its monitoring of the target thread or process by only detecting changes in the program state that would cause changes from branching, such as would be seen when function calls are made and also when function calls are completed.

```
TargetThread thread = GetThreadToStep();
client.StepNonSeqThread(thread);
```

As with stepping, the server indicates completion with the delivery of the notification that a thread has stopped.

The implementation of this is dependent on the underlying operating system. Some processors support this type of stepping, and others do not.

The pseudo-code for achieving this latter mode of stepping is as follows:
1. Let pc=the current program counter.
2. Let pc_dest={set of all instructions which will cause the change of control flow}
3. Set temporary thread-based breakpoints on the set of pc_dest instructions.
4. Restart the thread.
5. Handle the breakpoint, removing temporary breakpoints.

Method for Setting Thread-Specific Breakpoints

The method for setting thread-specific breakpoints, is identical to the Method for Setting Process-Wide Breakpoints except that a thread that is specified is not kAllThreads but the thread identifier which is to be stopped.

Method for Setting Multiple-Location/Single-Logical Thread-Specific Breakpoints

The method for setting multiple-location/single-logical thread-specific breakpoints is identical to the Method for Setting Multiple-Location/Single-Logical Process-Wide Breakpoints except that a thread that is specified is not kAllThreads but the thread identifier which is to be stopped.

Method for Clearing Thread-Specific Breakpoints

Clearing thread-specific breakpoints is identical to clearing process-wide breakpoints: the breakpoint identifier is used to specify the breakpoint for the ClearBreakpoint client request function.

Client-Initiated Actions: Runtime Information

Method for Determining a Function Name From a Program Address

When a program counter or any arbitrary program address is known but the name of the function isn't, the GetFunctionName client request function provides the conversion. An example of this is:

```
TTargetProcess       process = GetAProcess();
TDebuggerAddress     address = GetACodeAddress(); // e.g. PC
TLibraryName         libName;
TFunctionName        fnName;
TDebuggerLength      fnLength;
client.GetFunctionName(process, address, libName, fnName, fnLength);
```

At this point, the functionName will contain a string with the complete function name (typically the unmangled name. The libName parameter is returned with the full library name. Typically, this will be unique within the address space. Finally, the length of the function is returned in fnLength in bytes.

The implementation in the debugger server depends on the method used to map functions within libraries. Typically, this will depend on the runtime system. An implementation for this on a Unix based system may require that the debugger server load a library into its own address space, and then searching for a library symbol (function name) using the address as a starting point.

Method for Determining a Function Address From a Program and a Library Name

Another situation which requires mapping addresses and names is in the opposite direction. The GetFunctionAddress client request function will convert an address in the target address space to a program symbol.

```
TTargetProcess       process = GetAProcess();
TLibraryName         libName = GetANameOfLibraryWithFunctionToFind();
TFunctionName        fnName = GetANameOfFunctionToFind();
TDebuggerAddress     fnAddress;
TDebuggerLength      fnLength;
client.GetFunctionAddess(libName, fnName, fnAddress, fnLength);
```

The library name is used to identify the range in which to search for the functions; this resolves ambiguity when multiple functions with the same name can be found in multiple libraries.

Client-Initiated Actions: Exception Management

Method for Setting Software Exception Handling Policy

The software exception handling policy can be changed to allow the program to stop once a software exception has occurred. The software exception turns into a hardware exception (a breakpoint), and the target program stops, transferring control to the debugger server.) This software exception policy is set on a per-process basis.

Method for Getting Hardware Exception Handling Policy

The debugger server catches all hardware exceptions that are generated by the target program. Because the number of exceptions generated is potentially large, the server can be directed to handle or ignore certain exceptions. For instance on the Unix system, there are typically a number of exceptions that should be handled and others which should be ignored. The SIGALRM signal—which is generated as a timer interrupted—is one example of a signal that may be seen by the server but otherwise should just be sent back to the target process immediately.

A target-specific class that describes the exception handling behavior is TSystemExceptionPolicy. A call to GetSystemExceptionPolicy returns the current exception handling policy:

```
TTargetProcess process;
TAIXSystemExceptionPolicy  exceptPolicy;
client.GetSystemExceptionPolicy(process, exceptPolicy);
```

One the exception policy is determined it can be modified and changed.

Method for Setting Hardware Exception Handling Policy

An object containing the exception policy can be passed to the server to modify the exception handling behavior for a single process:

```
TTargetProcess  process;
TAIXSystemExceptionPolicy   exceptPolicy;
//
// modify the policy to suit new exception handling needs
//
client.SetSystemExceptionPolicy(process, exceptPolicy);
```

Design and Method for Extending the Hardware Exception Handling Policy

The hardware exception handling policy can be set up for individual types of exceptions or exception kinds. For instance, the class TAIXSystemExceptionPolicy, which derives from TSystemExceptionPolicy, contains a set of signals and the corresponding behaviors which are to be applied when one of the signals are generated:

```
class TAIXSystemExceptionPolicy : public TSystemExceptionPolicy {
public:
                                TAIXSystemExceptionPolicy();
    virtual                     ~TAIXSystemExceptionPolicy();
    virtual TDebuggerStream&    operator>>=(TDebuggerStream&
                                    dstStream) const;
    virtual TDebuggerStream&    operator<<=(TDebuggerStream&
                                    srcStream);
    virtual void                GetPolicy(TSystemExceptionID id,
                                    bool&
propagateException,
                                    bool& catchException);
    virtual void                SetPolicy(TSystemExceptionID id,
                                    bool
propagateException,
                                    bool catchException);
    static int                  GetExceptionCount();
private:
    class TExceptionPolicy {
    public
        bool catchException;
        bool propagateException;
    };
    TExceptionPolicy            fPolicy[SIGMAX + 1];
};
```

Client-Initiated Action: Dynamic Programming
Method for Calling Functions in a Target Process Using the primitives found in this document, it is possible to save the execution environment within a stopped thread, preserving its contents, and then set up a new execution context to make a new function call to a target function. The runtime function calling convention is nonportable, therefore the operations of saving and restoring execution contexts will vary.

A pseudocode program for making function calls is:
1. Save execution context in a stopped thread.
2. Adjust execution context by setting registers and stack to prepare for a function call.
3. Change program counter to point to the function to be called.
4. Set breakpoint at a return location.
5. Restart the stopped thread.
6. When breakpoint is reached, restore execution context.

Error Handling in Client-Initiated Actions
Method for Catching Software Exceptions A client debugger will generally bracket calls to the TDebuggerPrimitiveClient object by catching exceptions. For instance,

```
TDebuggerPrimitiveClient* client = GetClient();
try {
    client->Ping();
} catch (const TPrimitiveDebuggerException& exception) {
    printf("Attempted to call Ping. Client call failed.");
}
```

All client calls will potentially generate software exceptions which reflect an error in the debugger server. Classes of hardware exceptions deriving from TPrimitiveDebuggerException will contain error strings or identifiers to indicate the nature of the error.

Server-Initiated Actions

When the server detects an event that should be reported to a registered client, it will create a TTargetNotification object and then send this object to the listener thread in the client.

Client Notification: Process Control
Program Started

Upon creation of a process, the TTargetNotification::GetNotificationKind will return the kProcessCreated constant.

This indicates that the process (address space and at least one thread) has been created and a breakpoint was hit at the point where the program is about to begin execution.

Library Loaded

When a library is loaded into the target, the kLibraryLoaded constant is returned by GetNotificationKind. This does not indicate that library references have been resolved at this point, only that a new file has been mapped into (or loaded) into memory.

Program Terminated

Finally, when a process terminates normally or abnormally, the kProcessDied constant is returned by the GetNotificationKind.

kThreadCreated,
kThreadStopped,
kThreadStopFailed,

Client Notification: Thread Control
Breakpoint Hit

After a breakpoint is reached, the TTargetNotification::GetNotificationKind will return the kThreadStopped constant, and the TTargetNotification::GetTargetExceptionCause function returns the kBreakpointOccurred value. Further decoding may be necessary to determine the manner in which to process this breakpoint.

Step Completion

This is a special case of the breakpoint being hit. TTargetNotification::GetTargetExceptionCause function returns one of three values: kInstructionStepCompleted, kNonSeqInstructionStepCompleted, or kNonSeqInstructionStepInComplete. The first indicates that an instruction step (over) has completed. The second indicates that single stepping has reached a change of control flow instruction The last is that the branch at a change of flow control instruction was taken, i.e. executed.

User Request Stop

If the StopThread function is used, the thread will stop or not stop within a specified amount of time (determined by the debugger server). The GetNotificationKind function will return either kThreadStopped or kThreadStopFailed, respectively.

Hardware Exception Handled

When a hardware exception is handled (as indicated by the system hardware exception policy), such as from a hardware address fault or arithmetic error, the GetNotificationKind function will return kThreadStopped, and the TTargetNotification::GetTargetExceptionCause function returns the kSystemException value.

Client Notification: Software Exceptions

Software Exception Thrown

A thread can reach one of several locations when a software exception is thrown. At the beginning of the throw process, e.g. the throw statement in C++, if software exception handling is turned on, the debugger will stop a thread (indicated by the kThreadStopped value in the TTargetNotification), and the GetTargetExceptionCause will return kSoftwareExceptionThrow.

Software Exception Rethrown

Likewise, when a software exception is rethrown, the GetTargetExceptionCause will return kSoftwareExceptionReThrow.

Software Exception Matched

At the point a thrown object is matched with the appropriate handler, the thread is stopped and the GetTargetExceptionCause will return kSoftwareExceptionTryMatch.

Software Exception Caught

Finally, once the software exception handler starts is processing, the thread will stop, and the GetTargetExceptionCause will return kSoftwareExceptionHandled.

Method for Implementing Software Handling

Software exception handlers are typically functions which are called at the point where an exception is thrown. The server can establish a hook into these functions, or more simply, by setting a breakpoint on the handler functions.

Server Implementation

Extendibility of Debugging Services

Debugging services can be extended into the target process itself. Because of the added flexibility in reducing any dependence on the target process, it is possible to debug under a wider range of conditions. However, sometimes it is easier to gather information about the executing process by executing code within the address space of the target program. For instance, some memory heaps will provide statistics in the form of function calls which must be made within the target address space.

Therefore, additional runtime services can be added to the debugger server in the form of "debugger nubs" which are small programs that can service the needs of the debugger in the target address space. This mechanism can be created using the Method for Calling Functions in a Target Process, or a special thread can be created in the target process which the server communicates with.

Applications of the Primitive Debugging Services

Object-Oriented Environments
Non-Object Oriented Environments
Program Interpreters
Dynamic Runtime Environments
Non-Multithreaded Systems
Multiprocessing (MP) Systems
Distributed Systems
Remote Debugging
Compound Document Execution Environments

Having thus described our invention, what we claim as new, and desire to secure by Letters Patent is as follows:

1. An apparatus using object-oriented methods for transferring address references from a platform independent client debugger object operating on a first hardware platform to at least one platform dependent server debugger object operating on a second hardware platform, said apparatus allowing a single client debugger object to operate with server debugger objects running on different platforms and comprising:

(a) a plurality of polymorphic address objects, each of said polymorphic address objects containing address data in a different platform dependent address format, and platform dependent logic for manipulating said address data;

(b) a monomorphic address object including a reference to one of said polymorphic address objects and platform independent logic for executing platform dependent logic in said referenced one of said polymorphic address objects;

(c) logic in said client debugger object for executing said platform independent logic in said monomorphic address object; and (d) platform dependent logic in said server debugger object for generating platform dependent address data and storing said platform dependent address data in one of said polymorphic address objects.

2. The apparatus according to claim 1 wherein said monomorphic address object further includes address attributes, each of said address attributes indicating information about a platform.

3. The apparatus according to claim 1 wherein said monomorphic address object has a fixed size.

4. The apparatus according to claim 1 wherein each of said polymorphic addresses may have different sizes.

5. A method using object-oriented calls for transferring address references from a platform independent client debugger object operating on a first hardware platform to at least one platform dependent server debugger object operating on a second hardware platform, said method allowing a single client debugger object to operate with server debugger objects running on different platforms and comprising the steps of:

(a) constructing a plurality of polymorphic address objects, each of said polymorphic address objects containing address data in a different platform dependent address format, and platform dependent logic for manipulating said address data;

(b) constructing a monomorphic address object including a reference to one of said polymorphic address objects and platform independent logic for executing platform dependent logic in said referenced one of said polymorphic address objects;

(c) executing said platform independent logic in said monomorphic address object with logic in said client debugger object; and (d) generating platform dependent address data and storing said platform dependent address data in one of said polymorphic address objects with platform dependent logic in said server debugger object.

6. The method according to claim 5 wherein step (b) comprises the step of:

(b1) constructing said monomorphic address object with address attributes, each of said address attributes indicating information about a platform.

7. The method according to claim 5 wherein step (b) comprises the step of:

(b2) constructing said monomorphic address object with a fixed size.

8. The method according to claim 5 wherein step (a) comprises the step of:
- (a1) constructing each of said polymorphic addresses with different sizes.

9. A computer program product utilizing object-oriented methods for transferring address references from a platform independent client debugger object operating on a first hardware platform to at least one platform dependent server debugger object operating on a second hardware platform, said computer program product allowing a single client debugger object to operate with server debugger objects running on different platforms and comprising a computer usable medium having computer readable program code thereon including:
- (a) program code for constructing a plurality of polymorphic address objects, each of said polymorphic address objects containing address data in a different platform dependent address format, and platform dependent logic for manipulating said address data;
- (b) program code for constructing a monomorphic address object including a reference to one of said polymorphic address objects and platform independent logic for executing platform dependent logic in said referenced one of said polymorphic address objects;
- (c) program code for executing said platform independent logic in said monomorphic address object with logic in said client debugger object; and
- (d) program code for generating platform dependent address data and storing said platform dependent address data in one of said polymorphic address objects with platform dependent logic in said server debugger object.

10. The computer program product according to claim 9 wherein said monomorphic address object constructing code comprises program code for constructing said monomorphic address object with address attributes, each of said address attributes indicating information about a platform.

11. The computer program product according to claim 9 wherein said monomorphic address object constructing code comprises program code for constructing said monomorphic address object with a fixed size.

12. The computer program product according to claim 9 wherein said polymorphic address object constructing code comprises program code for constructing each of said polymorphic addresses with different sizes.

* * * * *